United States Patent
Rich et al.

(10) Patent No.: US 8,739,110 B2
(45) Date of Patent: May 27, 2014

(54) INTEGRATED SYSTEM, TOOLS, AND METHODS FOR DESIGNING AUTOMATED BUSINESS PROCESS APPLICATIONS

(75) Inventors: Alan Rich, Los Angeles, CA (US); Mark Goldin, Los Angeles, CA (US); Enrico Lombardino, Long Beach, CA (US); Gregory Scott Haga, Redondo Beach, CA (US); Niles Ritter, Long Beach, CA (US)

(73) Assignee: Thomson Reuters Global Resources, Baar (CH)

( * ) Notice: Subject to any disclaimer, the term of this patent is extended or adjusted under 35 U.S.C. 154(b) by 1260 days.

(21) Appl. No.: 11/368,370

(22) Filed: Mar. 3, 2006

(65) Prior Publication Data
US 2006/0271390 A1 Nov. 30, 2006

Related U.S. Application Data

(60) Provisional application No. 60/658,272, filed on Mar. 3, 2005.

(51) Int. Cl.
G06F 9/44 (2006.01)

(52) U.S. Cl.
USPC .......................................... 717/100; 717/108

(58) Field of Classification Search
USPC .................. 705/5–16; 717/100–146
See application file for complete search history.

(56) References Cited

U.S. PATENT DOCUMENTS

| | | | |
|---|---|---|---|
| 7,281,217 B2 * | 10/2007 | Choudhary et al. | 715/764 |
| 7,526,437 B1 * | 4/2009 | Cue et al. | 705/26 |
| 7,533,142 B2 * | 5/2009 | Ng et al. | 709/202 |
| 2002/0147763 A1 | 10/2002 | Lee et al. | |
| 2002/0169852 A1 * | 11/2002 | Schaeck | 709/218 |
| 2003/0009741 A1 | 1/2003 | Tu et al. | |
| 2003/0163513 A1 * | 8/2003 | Schaeck et al. | 709/201 |
| 2003/0222906 A1 * | 12/2003 | Fish et al. | 345/744 |
| 2004/0010598 A1 * | 1/2004 | Bales et al. | 709/228 |
| 2004/0068554 A1 * | 4/2004 | Bales et al. | 709/218 |
| 2004/0090969 A1 * | 5/2004 | Jerrard-Dunne et al. | 370/395.54 |
| 2004/0111424 A1 * | 6/2004 | Roman et al. | 707/100 |
| 2004/0187140 A1 | 9/2004 | Aigner et al. | |
| 2004/0230557 A1 * | 11/2004 | Bales et al. | 707/1 |
| 2004/0243577 A1 * | 12/2004 | Choudhary et al. | 707/6 |

(Continued)

FOREIGN PATENT DOCUMENTS

| | | |
|---|---|---|
| JP | 2002-259643 | 9/2002 |
| WO | WO-2006094208 A1 | 9/2006 |
| WO | WO-2006094208 C2 | 9/2006 |

OTHER PUBLICATIONS

"International Application Serial No. PCT/US2006/007646, International Search Report and Written Opinion mailed Jun. 22, 2006", 11 pgs.

(Continued)

*Primary Examiner* — Anna Deng
(74) *Attorney, Agent, or Firm* — Hoffmann & Baron, LLP

(57) ABSTRACT

According to aspects illustrated herein, a system, a method, and a machine-readable medium for designing business process applications is provided. The system includes: an application design interface and an object query language module. The application design interface provides an integrated development environment framework. The object query language module is operatively connected to the application design interface and a data source such that data flows between the application design interface and the data source.

13 Claims, 7 Drawing Sheets

(56) References Cited

U.S. PATENT DOCUMENTS

| | | | |
|---|---|---|---|
| 2005/0108258 A1* | 5/2005 | Olander et al. | 707/100 |
| 2005/0165829 A1* | 7/2005 | Varasano | 707/102 |
| 2006/0010390 A1* | 1/2006 | Guido et al. | 715/742 |
| 2006/0036734 A1* | 2/2006 | Breeden et al. | 709/225 |
| 2006/0064422 A1* | 3/2006 | Arthurs et al. | 707/10 |
| 2006/0085520 A1* | 4/2006 | Allamaraju et al. | 709/218 |
| 2006/0165123 A1* | 7/2006 | Jerrard-Dunne et al. | 370/468 |
| 2006/0174195 A1* | 8/2006 | White | 715/522 |
| 2006/0230062 A1* | 10/2006 | Roy-Chowdhury et al. | 707/103 X |
| 2006/0235935 A1* | 10/2006 | Ng | 709/208 |
| 2006/0242582 A1* | 10/2006 | Swanson et al. | 715/733 |
| 2007/0006083 A1* | 1/2007 | Daniels et al. | 715/742 |
| 2007/0067712 A1* | 3/2007 | Baker et al. | 715/506 |
| 2007/0112913 A1* | 5/2007 | Bales | 709/204 |
| 2007/0124506 A1* | 5/2007 | Brown et al. | 709/252 |
| 2007/0124688 A1* | 5/2007 | Nauerz et al. | 715/746 |
| 2007/0136329 A1* | 6/2007 | Kussmaul et al. | 707/100 |
| 2008/0086736 A1* | 4/2008 | Timmons | 719/314 |
| 2008/0183720 A1* | 7/2008 | Brown et al. | 707/10 |

OTHER PUBLICATIONS

International Application Serial No. PCT/US2009/007646, Preliminary Report on Patentability mailed Nov. 2, 2007, 7 pgs.

Official Action issued in Japanese Patent Application No. 2007-558277 on Apr. 17, 2012.

\* cited by examiner

FIG. 6

NEXTGEN

| | Sort By Date | Sort By Priority | Clear | Advanced |

- My DashBoard
- Find
- Customize

Welcome Back Bob Smith
While you were away you have received new Collaborations invitations

Notifications  Sort By Dates | Sort By Priority | Clear | Advanced

- ☐ Today at 3:37PM you were invited to Collaborate on Tkpr Greg
- ☑ Today at 4:12PM the Contact on Matter 1000-1234 change from Shaquille O'Neal to Kobe Bryant
- ☐ Today at 5:34PM you were invited to Collaborate on New Matter 2000-345
- ☑ On 08/24/2004 Invoice #1002034 is > 90 days old
- ☐ On 08/24/2004 Invoice #2345120 is > 90 days old

- Matter
- Client
- Timekeeper

Open Process  Icon View | List View | Advanced

Add Timekeeper   Add Matter   Modify Setup
08/25/2004 12:35 PM   08/25/2004 1:18 PM   08/27/2004 8:02 AM

- Time
- Costs
- Charges
- Proforma Edit

Team Metrics

| | Accounts Receivable | Unbilled Fees/Costs |
|---|---|---|
| 0-30 | 123.23 | 2243.23 |
| 31-60 | 456.45 | 4336.45 |
| 61-90 | 5534.32 | 234.32 |
| 91+ | 2134.44 | 6134.44 |
| Total | 13,453.33 | 15,2113.23 |

10,000
8000
6000

Fees    Costs

☐ Billed to Date
☐ Unbilled

INTEGRATED SYSTEM, TOOLS, AND METHODS FOR DESIGNING AUTOMATED BUSINESS PROCESS APPLICATIONS

RELATED APPLICATION

This application claims priority to U.S. Provisional Application 60/658,272, which was filed on Mar. 3, 2005 and which is incorporated herein by reference.

COPYRIGHT NOTICE AND PERMISSION

One or more portions of this patent document contain material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2004-2005, Thomson Elite.

TECHNICAL FIELD

Various embodiments disclosed herein concern software design environments methods, interfaces, and tools, particularly those that facilitate design of business process applications for professional service firms or organizations.

BACKGROUND

The vast majority of conventional business process applications, that is, software that facilitates business operations and administrative functions, have been developed for general industries, such as manufacturing, transportation, etc. And comparatively little has been done to facilitate the operations and administration of professional service industries, such as law, finance, medical, academic) which require more flexibility within administration environments.

Accordingly, the present inventors have recognized a need to develop applications as well as design infrastructures that support development and/or implementation such applications.

SUMMARY

To address one or more of these and/or other needs, the present inventors have devised, among other things, an application design interface and related tools that facilitates development of business process applications.

BRIEF DESCRIPTION OF THE DRAWINGS

FIGS. 2-6 are facsimiles of graphical user interfaces corresponding to one or more embodiments of the invention.

DESCRIPTION OF EXEMPLARY EMBODIMENT(S)

The following description, which incorporates the figures and the appended claims, describes and/or illustrates one or more exemplary embodiments of the invention. These embodiments, offered not to limit but only to exemplify and teach the invention, are shown and described in sufficient detail to enable those skilled in the art to make and use the invention. Thus, where appropriate to avoid obscuring the one or more inventions, the description may omit certain information known to those of skill in the relevant art.

Figure 1:
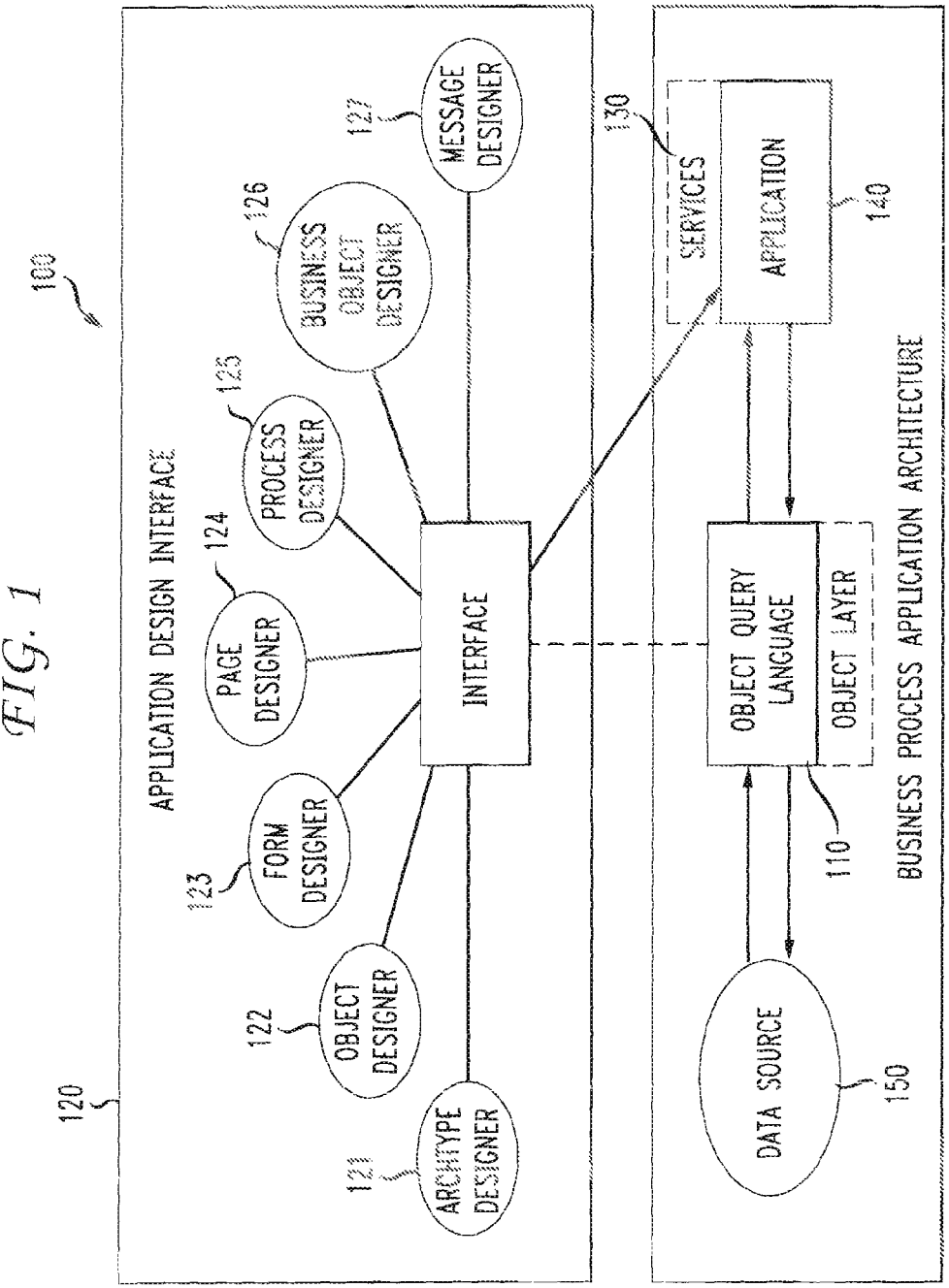
FIG. 1 is a block diagram of an exemplary system 100 corresponding to one or more embodiments of the invention.

FIG. 1 shows an exemplary design and implementation system or framework 100 for business process applications. Major components of the system include an object query language (OQL) module 110, an application design interface 120, a services module 130, application module 140, and a data store 150.

Object Query Language Module

OQL module 110, which is central to operation of the system, includes an expression language and an application program interface (API) to help users query a set of objects, navigate through an object graph, and get or set values on those objects. The OQL module is written abstractly at a "table" level. In this OQL (unlike standard programming languages), queries are defined with objects and object constructors, rather than strings. Generally, an object is a self-contained entity that consists of both data and procedures to manipulate the data, whereas a string is a series of characters manipulated as a group. Some objects are pre-constructed, while others can be constructed by invoking methods (functions) of other objects. In the exemplary embodiment, this object-based architecture eliminates the need for a new set of query instructions to be rewritten each time the query-to-database requirements change.

At application design time, the OQL module or layer effectively "floats" between the application design interface and the data store. And at application run time, the OQL layer provides the logic to process query requests from the application to the data source. The application is built using the designer components within the application design interface and is augmented by the services module, which allow the application end-users to work in a more integrated business environment, as further described herein.

Application Design Interface

Application design interface 120 provides an integrated development environment (IDE) "designer" framework, which may be available in a machine-readable medium, that allows users to choose the available query parameters and customize their application interface using a "pop-up menu" development interface. The exemplary embodiment provides specific IDEs for the design of application data objects, form interfaces, and business process automation. IDEs are traditionally integrated into a software application to provide elements such as a graphical user interface (GUI) builder, a text or code editor, a compiler, and/or interpreter and a debugger.

In some embodiments, the IDEs generate XML documents that conform to the particular XML schemas for an application framework. (Other embodiments use other forms of mark up languages.) The same IDE's are used both by developers and by the customer's information technology (IT) personnel. Each designer conforms to its specific base XML schema. These schemas are self-documenting representations of all rules and functionality that apply to each IDE. In the exemplary embodiment, they are core to the framework and are referenced directly by framework logic. Each IDE outputs a design XML document that conforms to the schema of that designer. The design XML documents fully describe the respective business process, form, or application logic component respectively.

Designers may produce a more granular XML document that describes the state of the process, form, or object, as displayed in the IDE. This document includes the display information from the IDE at the time that the item was saved. The framework translates and compiles the design XML documents and data objects into dynamic link libraries (DLLs) using operating system platform. (DLLs are a library of executable functions or data that can be used by an application. Typically, a DLL provides one or more particular functions and a program accesses the functions by creating either a static or dynamic link to the DLL. The operating system platform incorporates applications, a suite of tools and services, and a change in the infrastructure of the customer's web strategy.) Each XML document is saved in the database and file system. The database persistence allows the system to recover if the XML documents have been corrupted or are missing.

The exemplary application design interface includes the following designers: an archetype designer 121, a data-object designer 122, a form designer 123, a page designer 124, a business-process designer 125, a business object designer 126, and a message designer 127.

Figure 3:
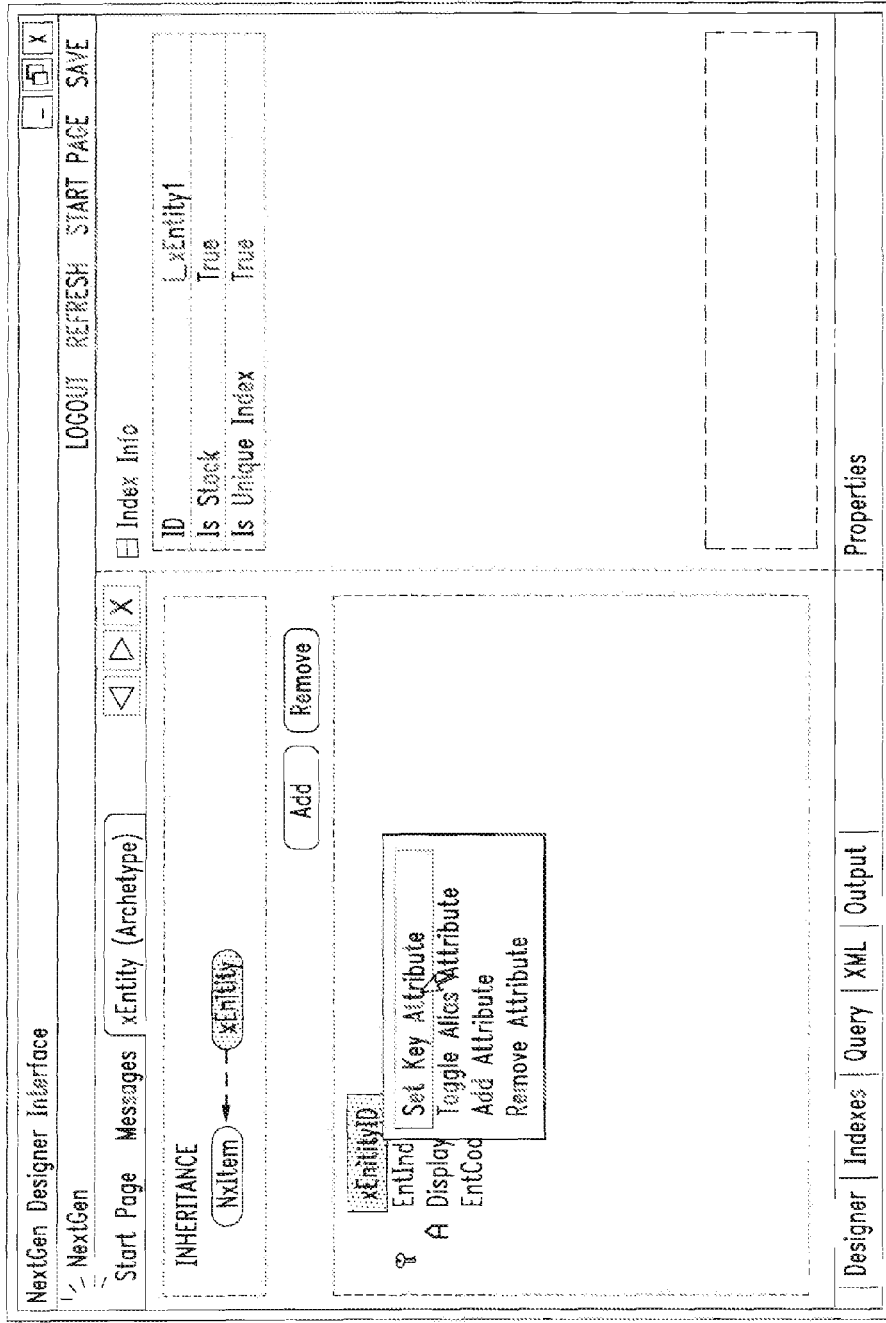
Figure 4:
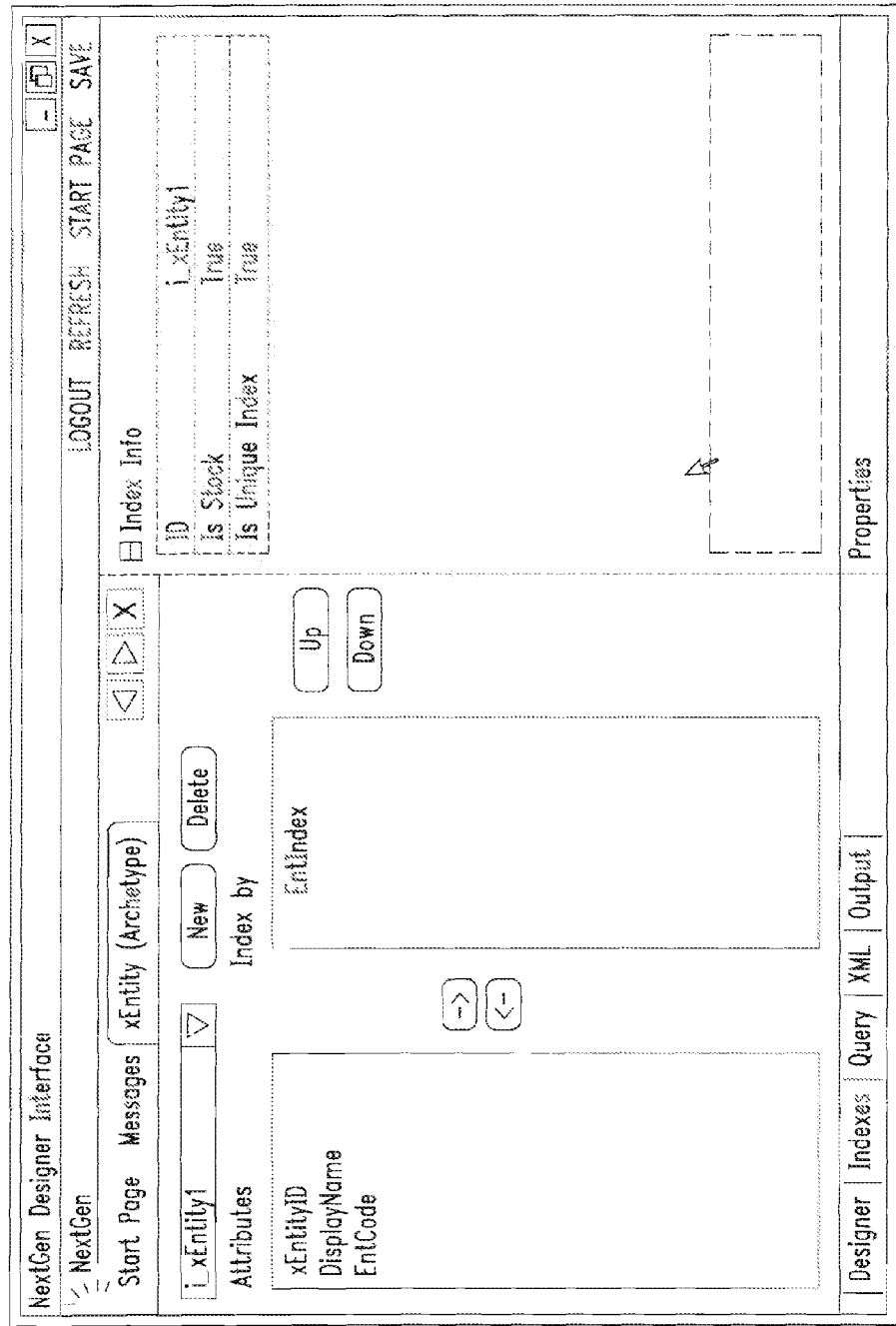

The archetype designer enables the user to define datatable and storage attributes. A user creates an archetype by defining the archetype's attributes, "look-up" capabilities, query properties, indexes, and "quick-find" definitions. The archetype designer allows the user to designate the amount of data in a query list, determine which archetype attributes must be indexed, and choose the default attributes that are displayed in a "query result grid" as a result of the archetype's query definition. The exemplary framework allows the user to add custom columns to defined tables or to define completely new custom tables. A utility is provided to import external tables into a database schema. The framework is aware of which tables are previously defined and which are customer-owned. The customer may not modify or delete a previously defined column. The object-relational mapping information for OQL is encapsulated in the "archetype" designer, which is described in more detail in other portions of this document. FIGS. 3 and 4 display the user-interface pages for the archetype designer.

This data-object designer IDE is used to define the data objects used by Exemplary as well as the underlying tables and columns. Data objects are application level data abstractions that contain metadata for table relationships, validation, and event-driven logic. Objects are mapped to existing database columns or to new columns created during object design.

The business-object designer allows the user to develop code that may be reused by other objects in the system and defines a business object that may be used throughout an application suite built using the exemplary system.

The form designer allows the user to design custom application interfaces using data elements designed in the object designer. Available user-interface (UI) controls are specified in the IDE's XML schema but the user always designs using data objects. The interfaces then may be used as a step of a business-process definition. Each form may contain only one data object reference. This means that complex interfaces are comprised of a parent form and a series of sub-forms. The framework allows sub forms to inherit the properties and arguments of their parents. This also allows users to add customization without comprising the upgrade path.

The page designer enables the user to define pages by associated existing objects with a page definition and then selecting the form(s) that must be displayed for each object included on the page. In the page design the user may include any number of forms that must be displayed for a given object on the page; therefore although page definitions may consist of the same objects, the interface created by each page definition may differ. By electing different forms (views) for each object the user has the ability to create different interfaces.

The process designer allows the user to design complete business processes (custom workflows) consisting of multiple "steps". A process requires a reference to at least one data object. The data object governs which forms and code modules are available to the process steps. A process step contains three components: a form or code module, an output, and a business rule. The output represents the process choices available to a participant at the subject step (e.g., approve/reject). The business rule contains data test and routing information for the next participant.

Figure 2:
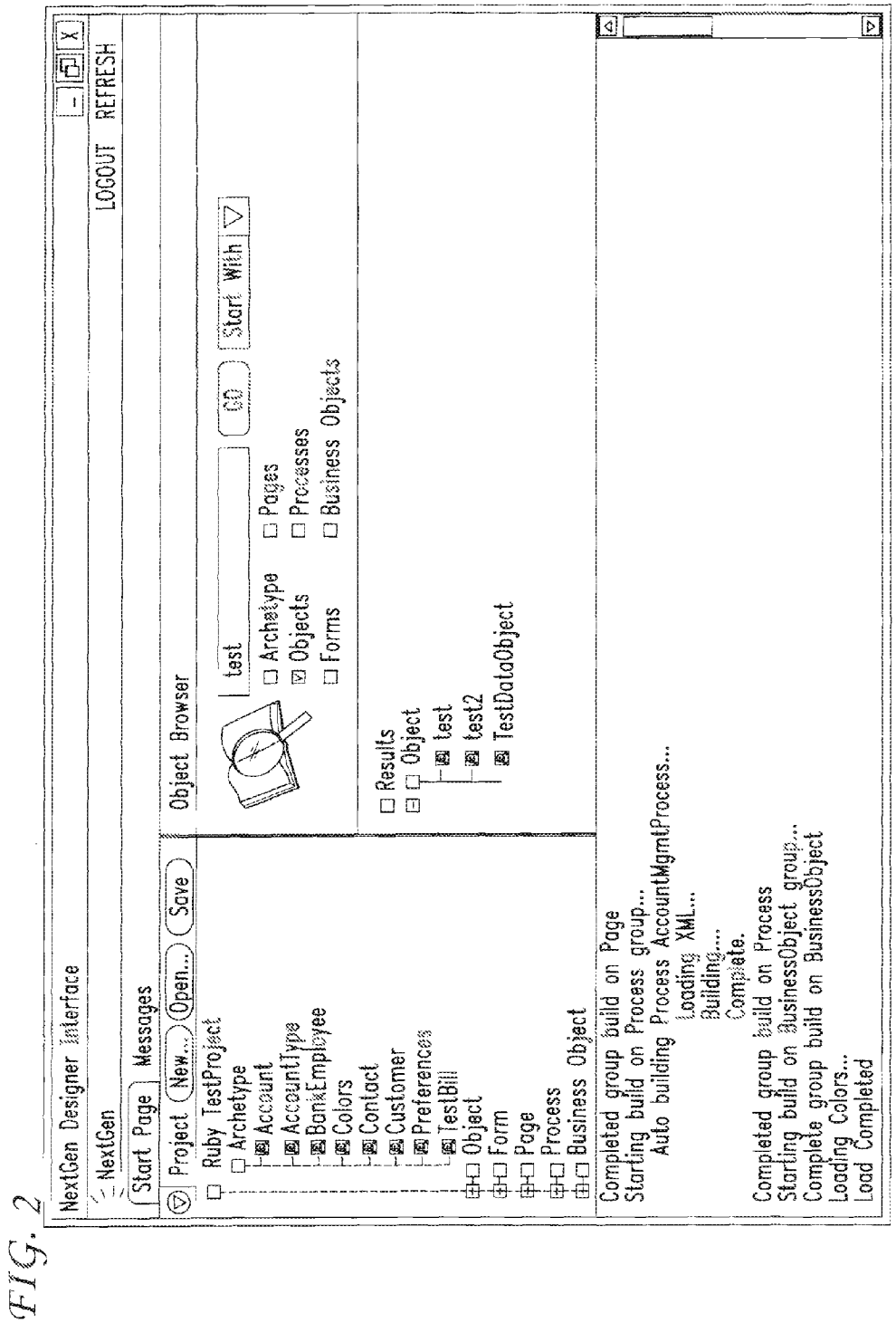

FIG. 2 displays an exemplary design-interface start page, with the individual designers listed on the right side of the page.

Services Module

As represented by services module 130 in FIG. 1, applications, such as application 140 may access one or more services for collaboration, notification, exceptions, security, work lists, workflow, and reporting. These services reside within the application and allow end users to integrate more fully with one another. For example, the workflow service is based on process "steps" that contains rules and associations with owners. When a step is complete, the next step appears on the next owner's Action List. A "watch list" allows users to observe processes they are interested in. More generally, the exemplary embodiment defines services as sets of functionality provided and available to all applications built using the design interface. These services have a designated display area—below the action menus and above the application display area—within every application page. The services include the following: Collaboration, WorkList, Workflow, Folder Maintenance and Inheritance.

Figure 5:
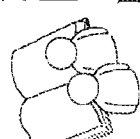

The collaboration service allows users to solicit and submit suggestions or comments on work products, leveraging the end-users' expertise and creating a synergistic work environment. An organizer initiates a collaboration session on a selected item from the application's worksheet and provides a subject/message for the collaboration session. The system sends the collaboration invitations to notify the invitees while the organizer continues to work. Invitees submit suggestions to the organizer, and these suggestions are reviewed. FIGS. 5 and 6 display application user-interface pages from the collaboration-service process.

Inheritance service is a service of the exemplary framework that allows the user to configure heavily used items to contain defaulted information. This feature is especially useful to users that perform a great deal of data entry. It allows many levels of inheritance for any inheritance item, which is essentially a "super template" and is stored in the draft database, therefore not displaying as a system entity in the true entity.

In addition to application-specific services, Exemplary provides a centralized routing service that provides Webservices access to all application processes. The routing service passes the request off the subject business process, thereby eliminating the need for a Web service for each application process.

Until transactions are finally committed to the database, all data is stored in "draft tables" (one table per data object). Draft tables are "aware" of what data was modified, when the data was modified, and by whom or what (e.g., another program). One use for draft tables is to monitor productivity, and this mechanism facilitates collaboration with other users.

Exemplary Methods of Operation

Figure 7:
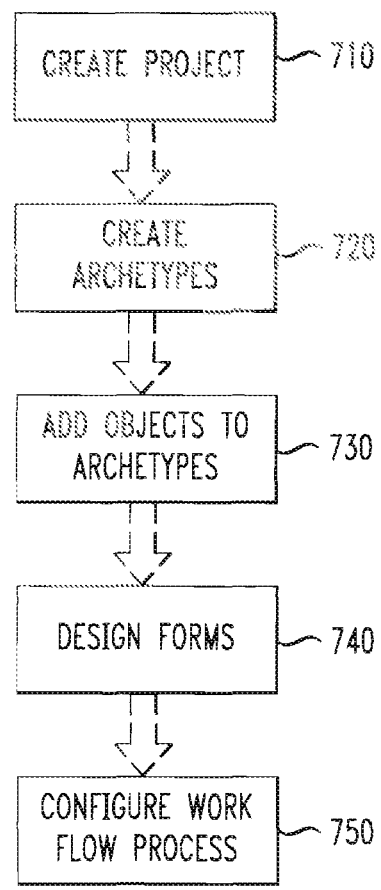
FIG. 7 is a flow chart of an exemplary method corresponding to one or more embodiments of the invention.

FIG. 7 shows a flow chart 700 of one or more exemplary methods of operating a system, such as system 100 to design a business process application, such as application 140. Flow chart 700 includes blocks 710-750, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

At block 710, the exemplary method begins with creation of a design project. In the exemplary embodiment, the project is to design an application that creates a timekeeper information window in which the timekeeper's name, description, type and timekeeper number can be maintained. In the exemplary embodiment, creating the project provides a way of grouping objects related to the project, and entail selecting the new button on the IDE start page, as shown in exemplary form in FIG. 2, and then entering a name in the Add New Project window, such as SampleProject and choosing OK. As a result, this name will be displayed in the project tree of the start page. Execution then continues at block 720.

Block 720 entails creating the archetypes using the archetype designer. In the exemplary embodiment, this entails creating one or more archetypes, such as a Folder Type archetype, Timekeeper archetype, and a folder archetype. Appendix A provides an example of the creation of a Folder Type Archetype.

Block 730 entails adding objects to one or more archetypes, such as those created in block 720, using the object designer. In the exemplary embodiment, based on the sample project, this entails adding objects to the Folder Type, Timekeeper and Folder archetypes. Appendix A shows the details for adding objects in the exemplary embodiment.

Block 740 entails design forms for each of the objects. In the exemplary embodiment, this entails designing a grid, form and worklist for each using the Form Designer. Appendix A shows an example of how the Form Designer may be used with the exemplary embodiment.

Block 750 entails defining different "views" using the page designer for each object defined for the page's base object. In the exemplary embodiment, this entails defining a Folder Page, a Folder Type Page, and a Timekeeper Page. After you define Folder and Folder Type pages, you will configure and deploy a business work flow process in the Process Designer. An example of how to define different views for the exemplary embodiment is found in Appendix A.

The embodiments described herein are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

APPENDIX A

Create a Folder Type Archetype, in the exemplary embodiment, entails

1. In the exemplary IDE Start Page, right-click Archetype and select Add New Archetype Item.
2. In the Add New Archetype window, enter FolderTypeArch and choose OK.

The Archetype Designer displays. Note that F.olderTypeArchID with the data type of GUID automatically displays as the default key attribute.

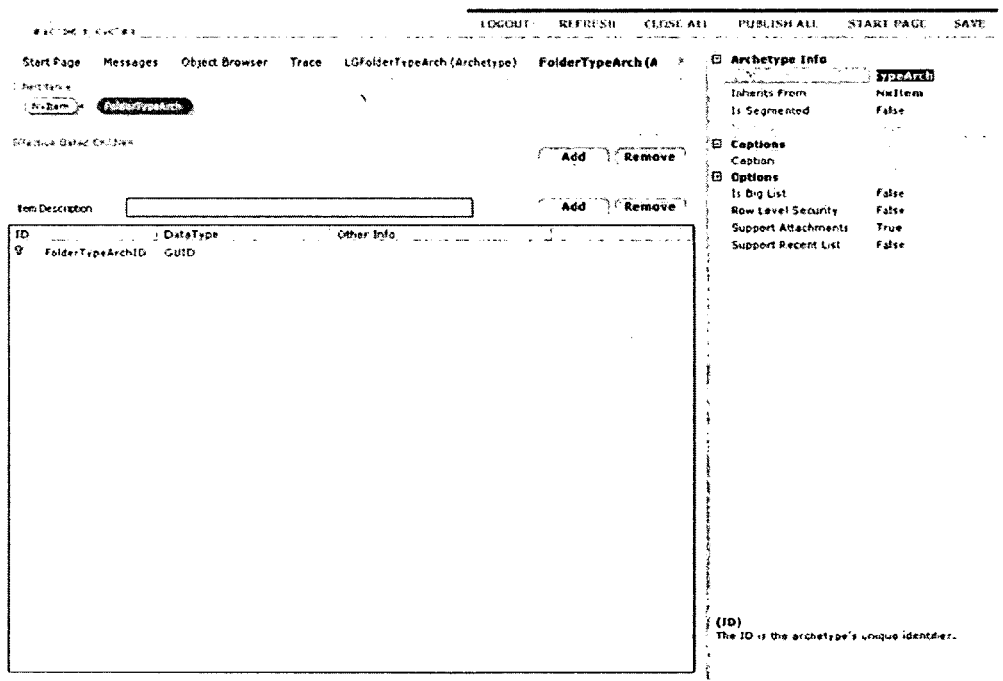

3. Add the alias attribute Code, which will display instead of the description in a drop-down list. Right-click FolderTypeArchID and select Add Attribute (or press CTRL-N). Note that NewAttribute1 with the data type of STRING displays below FolderTypeArchID.

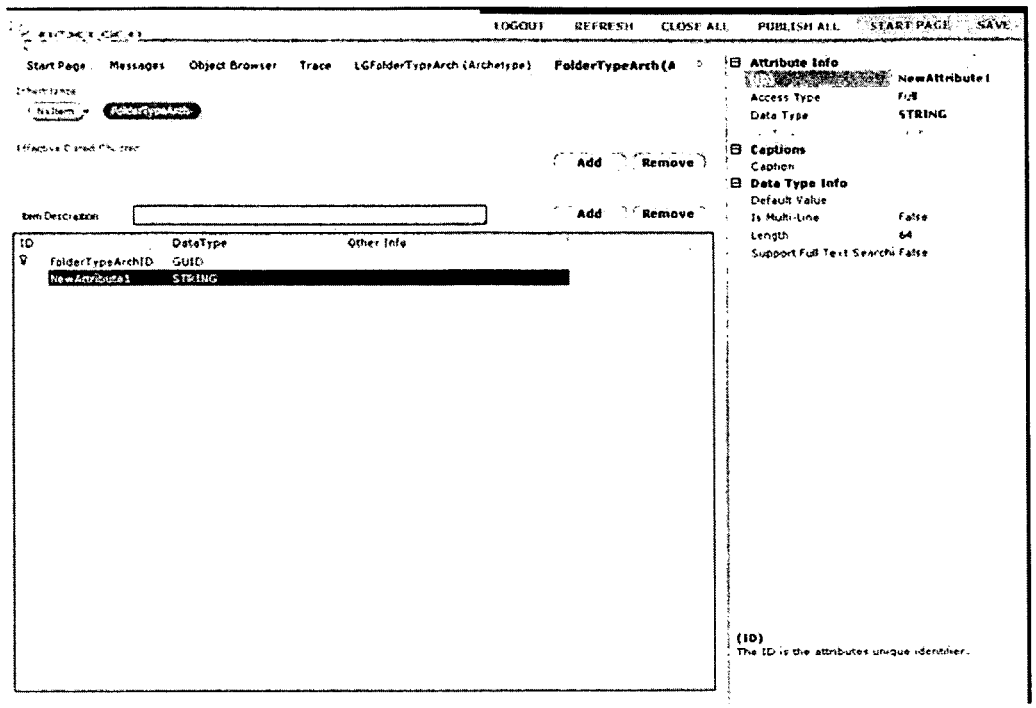

4. Enter the following information in the Properties tab:

- In the (ID) field under Archetype Info, enter Code. This overwrites the name NewAttribute1.

- In the Caption field, enter Code.

5. Set the Code attribute as an alias attribute by right-clicking Code (under FolderTypeArchID) and selecting Toggle Alias Attribute. An A displays to the left, indicating it is an alias attribute.

6. Add an attribute for the description to this archetype by right-clicking FolderTypeArchID and selecting Add Attribute (or press CTRL-N).

7. Enter the following information in the Properties tab:

- In the (ID) field under Archetype Info, enter Description.

- In the Caption field, enter Description.

8. The following information should now display in the Archetype Designer.

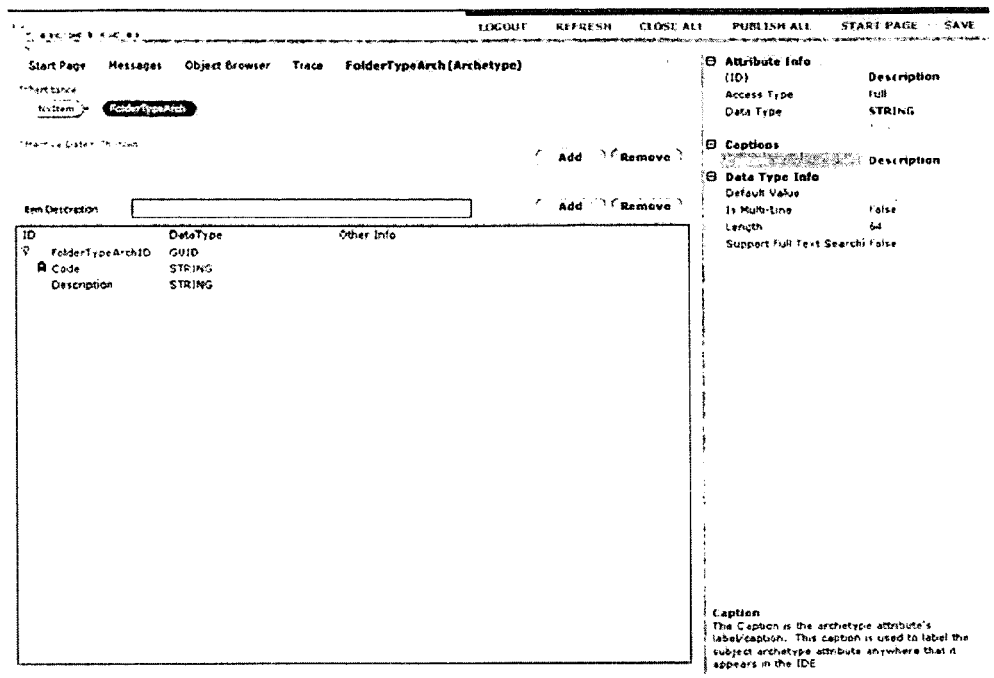

Choose the Save button in the upper right corner to save this information and return to the Start Page.

Next you will create a Timekeeper archetype.

After you've created a Folder Type archetype, create a Timekeeper archetype by doing the following.

1. In the Exemplary IDE Start Page, right-click Archetype and select Add New Archetype Item.

2. In the Add New Archetype window, enter TimekeeperArch and choose OK.

The Archetype Designer displays. Note that TimekeeperArchID with the data type of GUID automatically displays as the default key attribute.

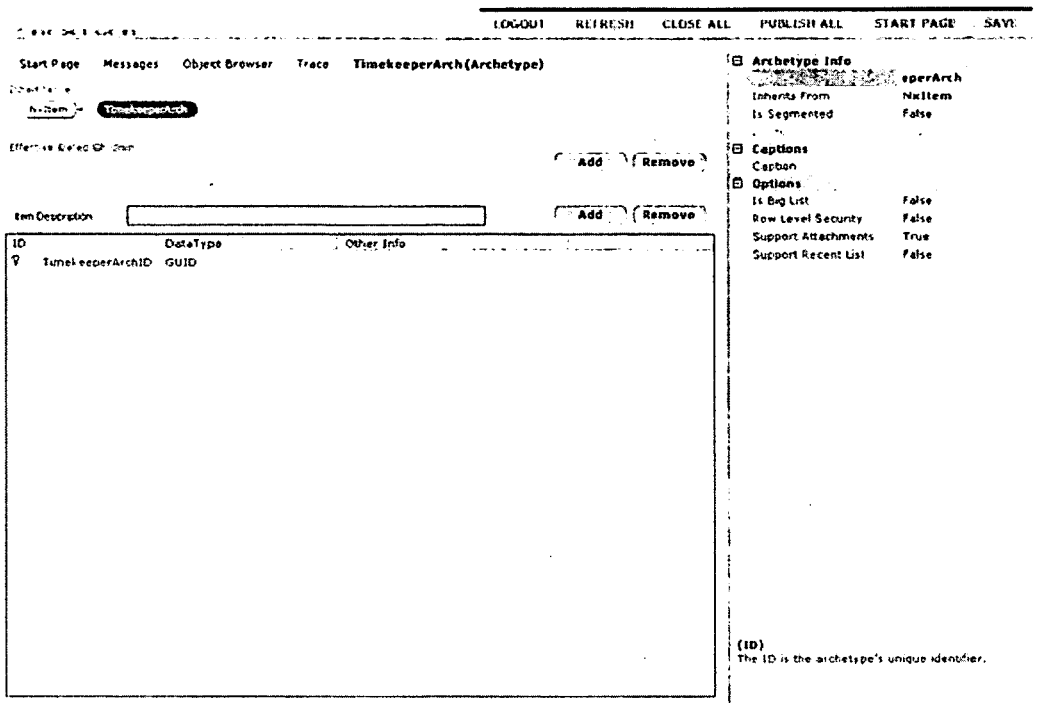
3. In the Caption field in the Properties tab, enter Timekeeper as the label for this archetype.
4. Add an attribute for the timekeeper number to this archetype by right-clicking FolderArchID and selecting Add Attribute (or press CTRL-N).

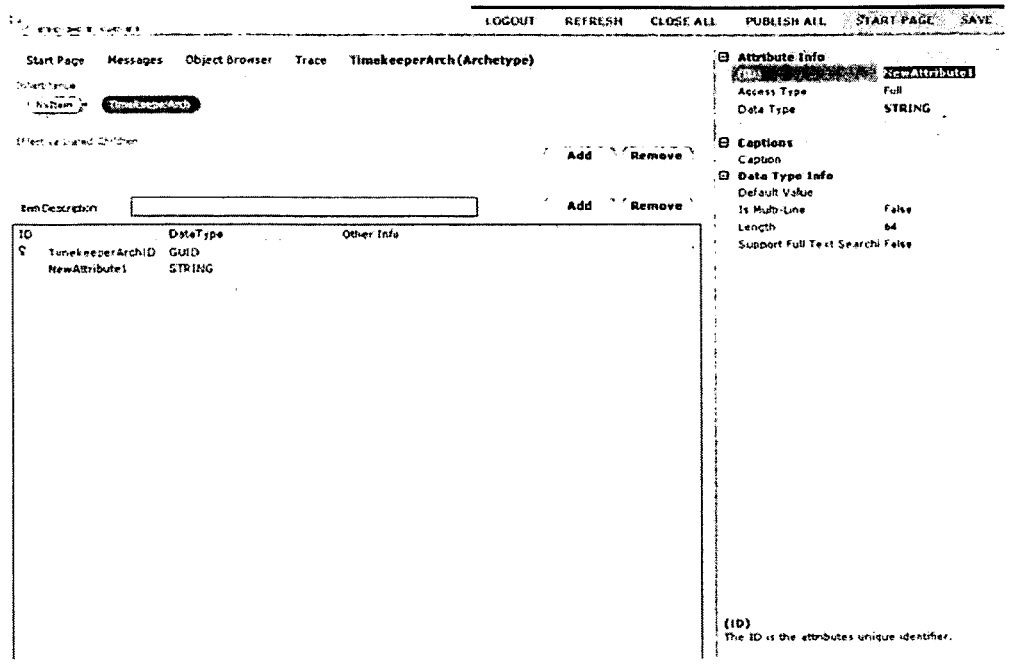

NewAttribute1 with the data type of STRING displays below TimekeeperArchID.

Enter the following information in the Properties tab:

- In the (ID) field under Archetype Info, enter Number. This overwrites the name NewAttribute1.

- In the Caption field, enter Tkpr Number.

5. Set the Number attribute as an alias attribute by right-clicking Number (under TimekeeperArchID) and selecting Toggle Alias Attribute. An A displays to the left, indicating it is an alias attribute.

6. Add an attribute for the timekeeper name to this archetype by right-clicking FolderArchID and selecting Add Attribute (or press CTRL-N).

Enter the following information in the Properties tab:

- In the (ID) field under Archetype Info, enter Name.

- In the Caption field, enter Timekeeper Name.

7. Add an attribute for the timekeeper department to this archetype by right-clicking FolderArchID and selecting Add Attribute (or press CTRL-N).

Enter the following information in the Properties tab:

- In the (ID) field under Archetype Info, enter Department.

- In the Caption field, enter Timekeeper Dept.

8. Add an attribute for the timekeeper description to this archetype by right-clicking FolderArchID and selecting Add Attribute (or press CTRL-N).

Enter the following information in the Properties tab:

- In the (ID) field under Archetype Info, enter Description.

- In the Caption field, enter Description.

- Click in the Is Multi-Line field under Data Type Info and select True from the drop-down list. This allows users to enter multiple lines of text in the Description field.

9. The following information should now display in the Archetype Designer.

Choose the Save button in the upper right corner to save this information and return to the Start Page.

After creating a Timekeeper archetype, create a Folder archetype by doing the following.

1. In the Exemplary IDE Start Page, right-click Archetype and select Add New Archetype Item.

2. In the Add New Archetype window, enter FolderArch and choose OK.

The Archetype Designer displays. Note that FolderArchID with the data type of GUID automatically displays as the default key attribute.

3. In the Caption field in the Properties tab, enter Folder as the label for this archetype.

4. Add an attribute for the timekeeper name to this archetype by right-clicking FolderArchID and selecting Add Attribute (or press CTRL-N).

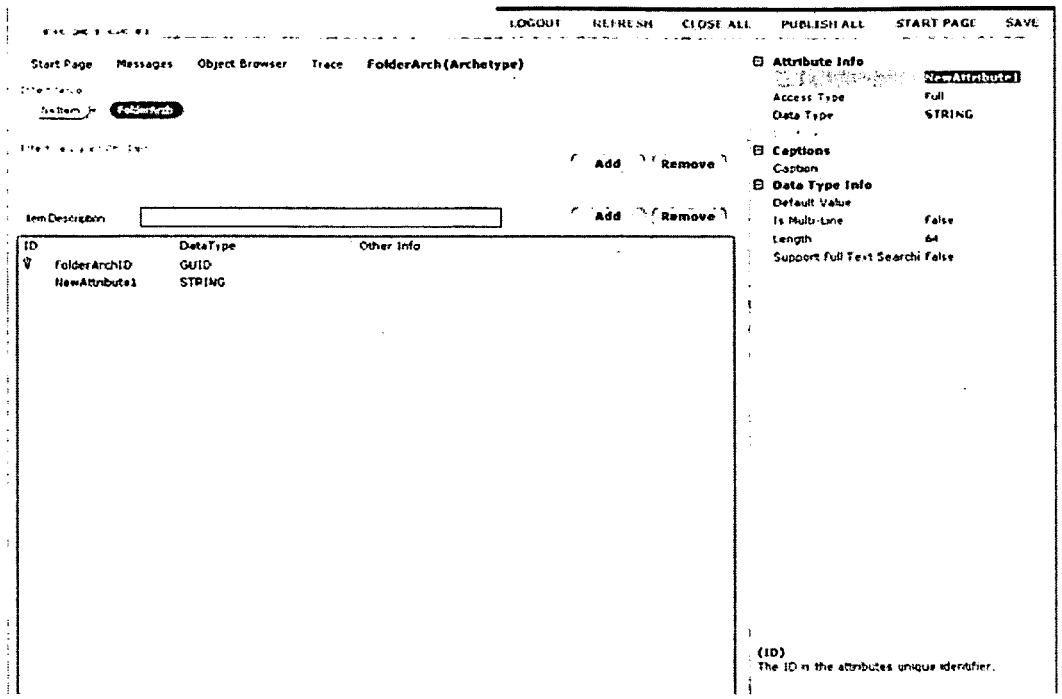

NewAttribute1 with the data type of STRING displays below FolderArchID. Enter the following information in the Properties tab:

- In the (ID) field under Archetype Info, enter Name. This overwrites the name NewAttribute1.

- In the Caption field, enter Folder Name.

5. Add an attribute for the timekeeper description to this archetype by right-clicking FolderArchID and selecting Add Attribute (or press CTRL-N).

Enter the following information in the Properties tab:

- In the (ID) field under Archetype Info, enter Description.

- In the Caption field, enter Folder Description.

6. Now you will add a relationship attribute with a link to the folder type archetype you previously created. Right-click FolderArchID and selecting Add Attribute (or press CTRL-N).

Enter the following information in the Properties tab:

- In the (ID) field under Archetype Info, enter FolderTypeLink.

- In the Data Type field, select RELATIONSHIP from the drop-down list.

- In the Caption field, enter Folder Type.

- Click in the Related Archetype field and choose the ... button. From the Select Item window, select FolderTypeArch. This is the destination archetype for the FolderTypeLink relationship attribute.

- In the Relationship ID field, enter FolderTypeLink.

7. Add a relationship attribute with a link to the timekeeper archetype you previously created by right-clicking FolderArchID and selecting Add Attribute (or press CTRL-N).

Enter the following information in the Properties tab:

- In the (ID) field under Archetype Info, enter TimekeeperLink.

- In the Data Type field, select RELATIONSHIP from the drop-down list.

- In the Caption field, enter Timekeeper.

- Click in the Related Archetype field and choose the ... button. From the Select Item window, select TimekeeperArch. This is the destination archetype for the TimekeeperLink relationship attribute.

- In the Relationship ID field, enter TimekeeperLink.

8. The following information should now display in the Archetype Designer.

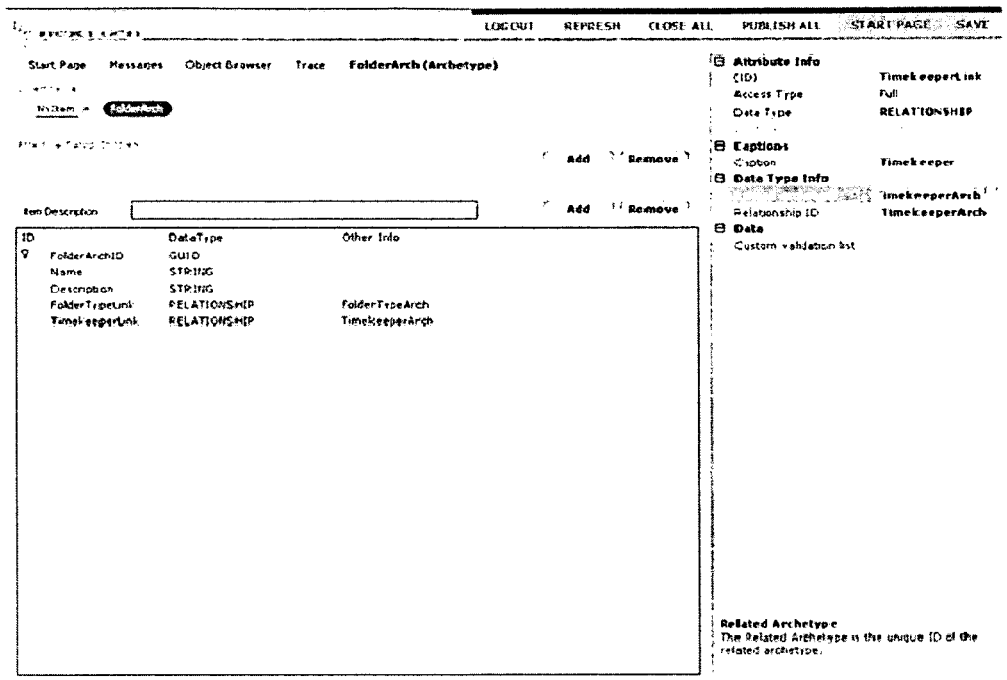

Choose the Save button in the upper right corner to save this information and return to the Start Page.

Execution continues at block 730.

Block 730 entails adding objects to one or more archetypes, such as those created in block 720, using the object designer. In the exemplary embodiment, based on the sample project, this entails adding objects to the Folder Type, Timekeeper and Folder archetypes.

Adding Objects to the Folder Type Archetype may be achieved as follows:

Now you will add a Folder Type object that contains Code and Description attributes to the Folder Type archetype by doing the following.

1. In the Exemplary IDE Start Page, right-click Object and select Add New Object Item.

2. In the Add New Object window, enter FolderTypeObj and choose OK. The Object Designer displays.

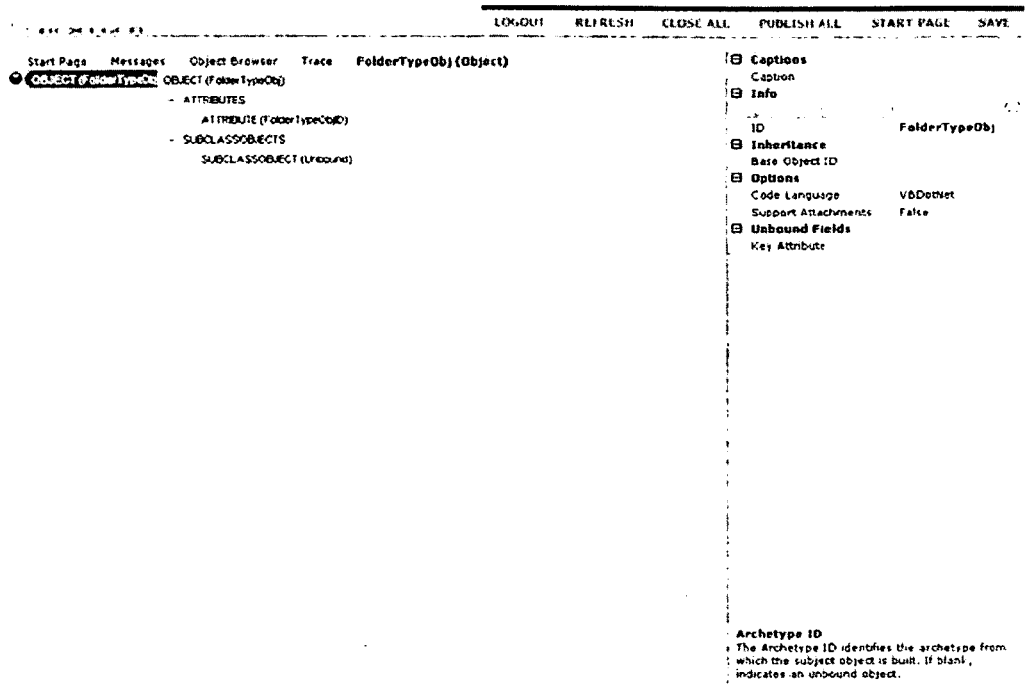

3. Enter the following information about the Folder Type object in the Properties tab:

- In the Caption field, enter Folder Type.

- Click in the Archetype ID field and choose the ... button. From the Select Item window, select FolderTypeArch. This identifies the archetype from which the Folder Type object is built. Note that the ATTRIBUTES heading is automatically removed from the Object tree, and SUBCLASSOBJECT (FolderTypeArch) displays under the SUBCLASSOBJECTS heading.

4. Next you will add Code and Description attributes to the Folder Type object. Right-click OBJECT (FolderTypeObj) in the Object tree and select Add>ATTRIBUTES. An ATTRIBUTES heading displays in the OBJECT tree.

5. To add a Code attribute, right-click ATTRIBUTES and select Add>ATTRIBUTE. Note that ATTRIBUTE (ATTRIBUTE0) displays below the ATTRIBUTES heading in the Object tree.

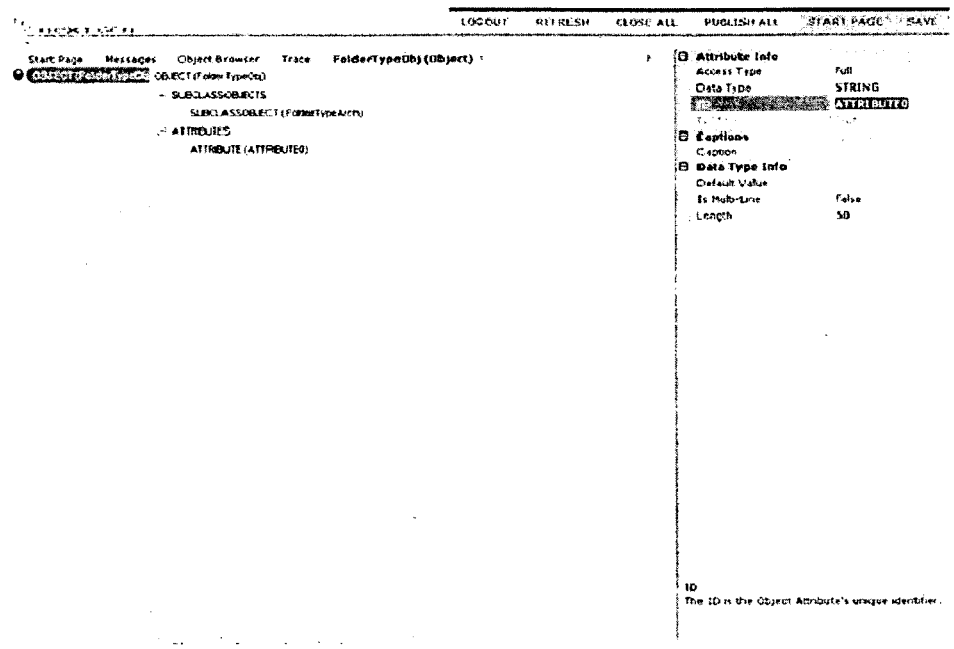

6. Enter the following information in the Properties tab:

- Click in the Access Type field and select Required from the drop-down list. This indicates that users must enter a value in the Code field.

- Click in the Data Type field and select BOUND from the drop-down list. This indicates the Code attribute is tied to the Folder Type archetype.

- Click in the Archetype Attribute field and select Code from the drop-down list. This drop-down list includes the attributes you defined (Code and Description) for the Folder Type archetype. Note that Code automatically displays in the Caption field. This is the same caption you entered for Code attribute for the Folder Type archetype.

- In the ID field, enter Code. This replaces ATTRIBUTE (ATTRIBUTE0) in the Object tree with ATTRIBUTE (Code).

7. Next you will add a Description attribute. Right-click ATTRIBUTES and select Add>ATTRIBUTE. Enter the following information in the Properties tab:

- Click in the Data Type field and select BOUND from the drop-down list.

- In the ID field, enter Description. This replaces ATTRIBUTE (ATTRIBUTE0) in the Object tree with ATTRIBUTE (Description).

- In the Caption field, enter Description.

8. The following information should now display in the Object Designer.

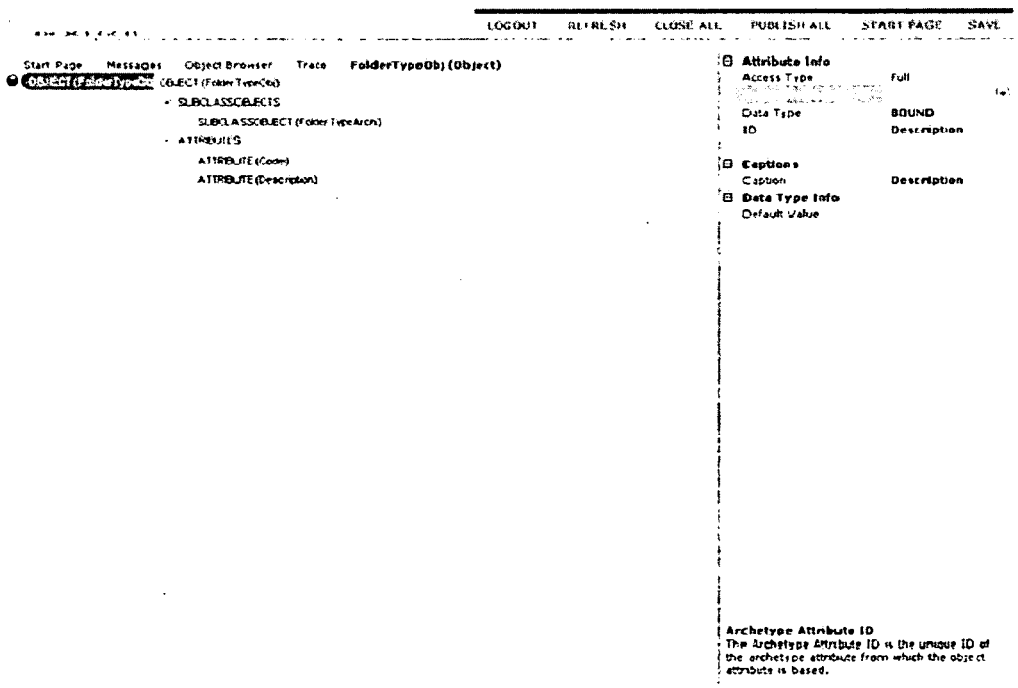

Choose the Save button in the upper right corner to save this information and return to the Start Page.

Next you will add objects to the Timekeeper archetype.

1.1.1 Add Objects to the Timekeeper Archetype

Now you will add a Timekeeper object containing Number, Name, Department and Description attributes to the Timekeeper archetype by doing the following.

1. In the Exemplary IDE Start Page, right-click Object and select Add New Object Item.

2. In the Add New Object window, enter TimekeeperObj and choose OK. The Object Designer displays.

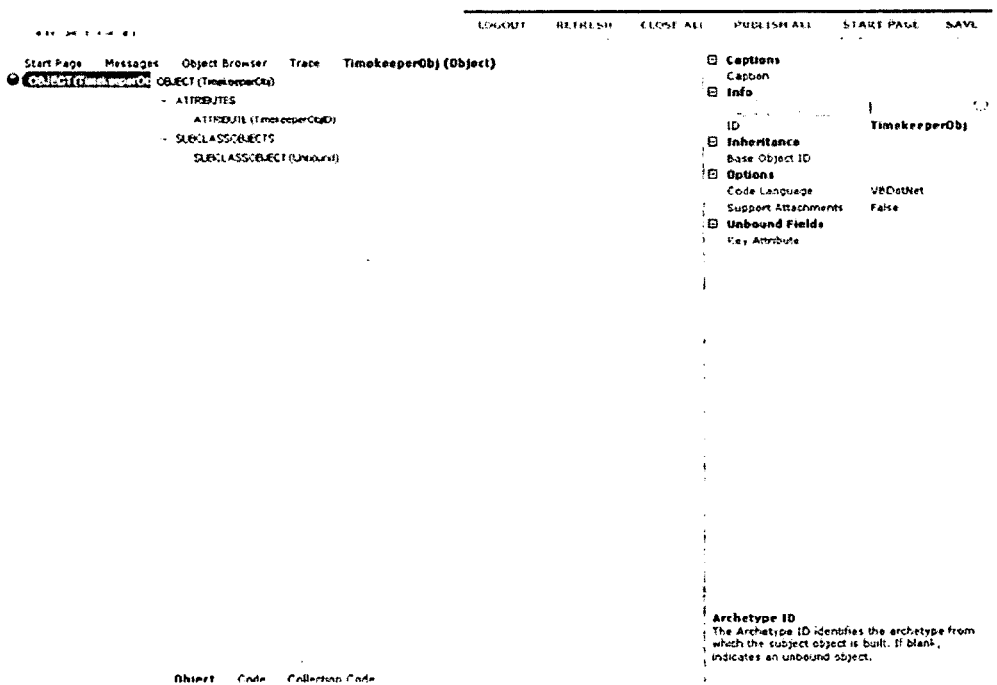

3. Enter the following information about the Folder Type object in the Properties tab:

- In the Caption field, enter Timekeeper.

- Click in the Archetype ID field and choose the ... button. From the Select Item window, select TimekeeperArch. This identifies the archetype from which the Timekeeper object is built. Note that the ATTRIBUTES heading is automatically removed from the Object tree, and SUBCLASSOBJECT (TimekeeperArch) displays under the SUBCLASSOBJECTS heading.

4. Next you will add Number, Name, Department and Description attributes to the Timekeeper object. Right-click OBJECT (TimekeeperObj) in the Object tree and select Add>ATTRIBUTES. An ATTRIBUTES heading displays in the Object tree.

5. Right-click ATTRIBUTES and select Add>ATTRIBUTE. Note that ATTRIBUTE (ATTRIBUTE0) displays below the ATTRIBUTES heading in the Object tree.

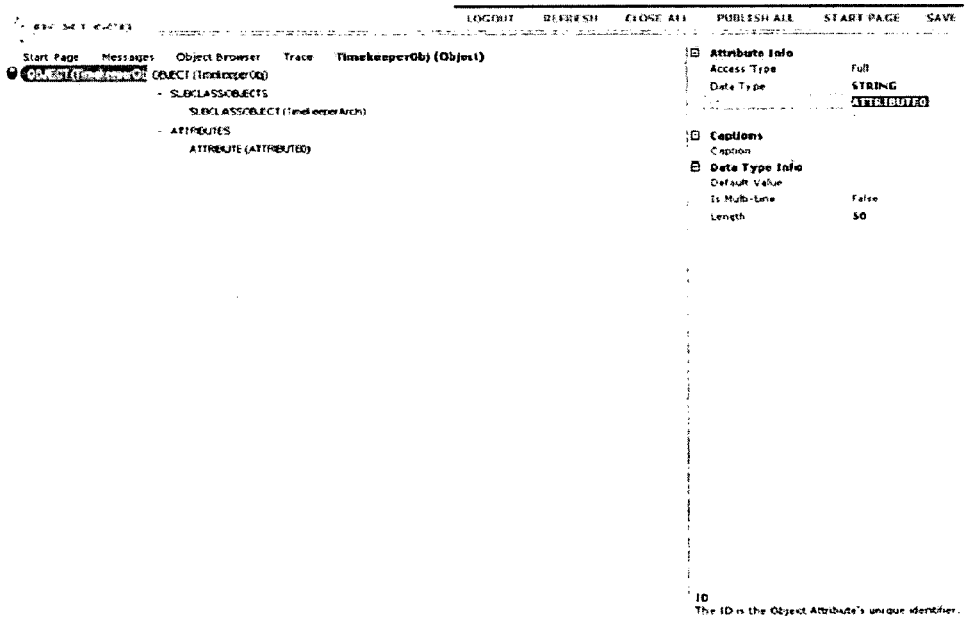

6. Enter the following information for the Number attribute in the Properties tab:

- Click in the Access Type field and select Required from the drop-down list. This indicates that users must enter a value in the Number field.

- Click in the Data Type field and select BOUND from the drop-down list. This indicates the Number attribute is tied to the Timekeeper archetype.

- Click in the Archetype Attribute field and select Number from the drop-down list. This drop-down list includes the attributes you defined for the Timekeeper archetype. Note that Tkpr Number automatically displays in the Caption field. This is the same caption you entered for the Timekeeper Number attribute for the Timekeeper archetype.

- In the ID field, enter Number.

7. Add a Name attribute. Right-click ATTRIBUTES and select Add>ATTRIBUTE. Enter the following information in the Properties tab:

- Click in the Data Type field and select BOUND from the drop-down list.

- Click in the Archetype Attribute field and select Name from the drop-down list. Timekeeper Name automatically displays in the Caption field.

- In the ID field, enter Name.

8. Add a Department attribute. Right-click ATTRIBUTES and select Add>ATTRIBUTE. Enter the following information in the Properties tab:

- Click in the Data Type field and select BOUND from the drop-down list.

- Click in the Archetype Attribute field and select Department from the drop-down list. Note that Timekeeper Dept. automatically displays in the Caption field.

- In the ID field, enter Department.

9. Add a Description attribute. Right-click ATTRIBUTES and select Add>ATTRIBUTE. Enter the following information in the Properties tab:

- Click in the Data Type field and select BOUND from the drop-down list.

- Click in the Archetype Attribute field and select Description from the drop-down list. Note that Description automatically displays in the Caption field.

- In the ID field, enter Description.

10. The following information should now display in the Object Designer.

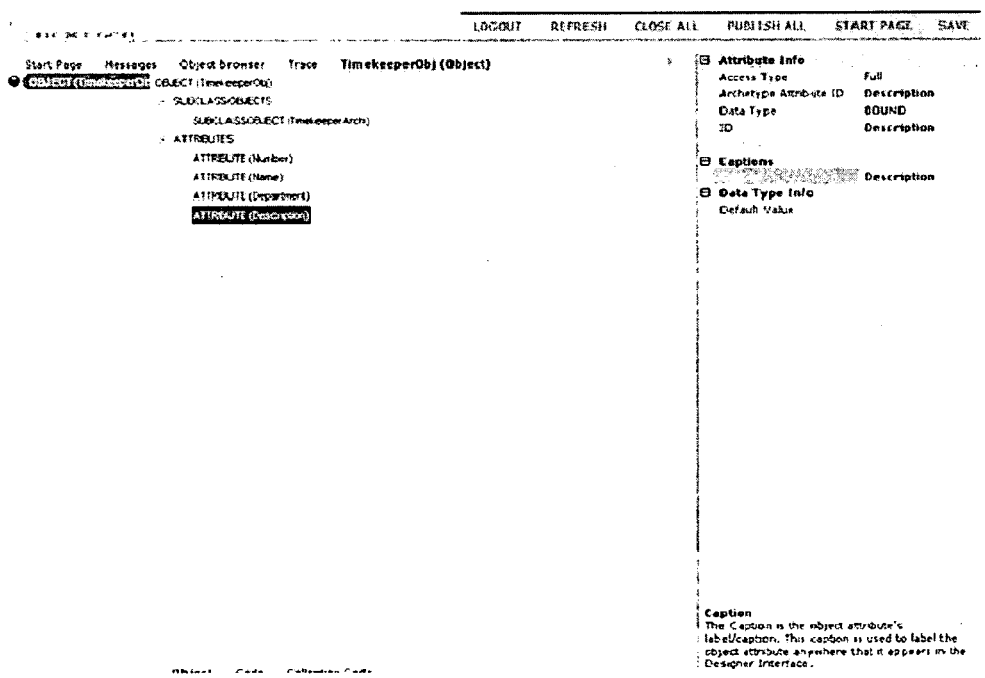

Choose the Save button in the upper right corner to save this information and return to the Start Page.

Next you will add objects to the Folder archetype.

Adding Objects to the Folder Archetype

Now you will add a Folder object containing Name and Description attributes, and Folder Type Link and Timekeeper Link relationship attributes, to the Folder archetype by doing the following.

1. In the Exemplary IDE Start Page, right-click Object and select Add New Object Item.

2. In the Add New Object window, enter FolderObj and choose OK. The Object Designer displays.

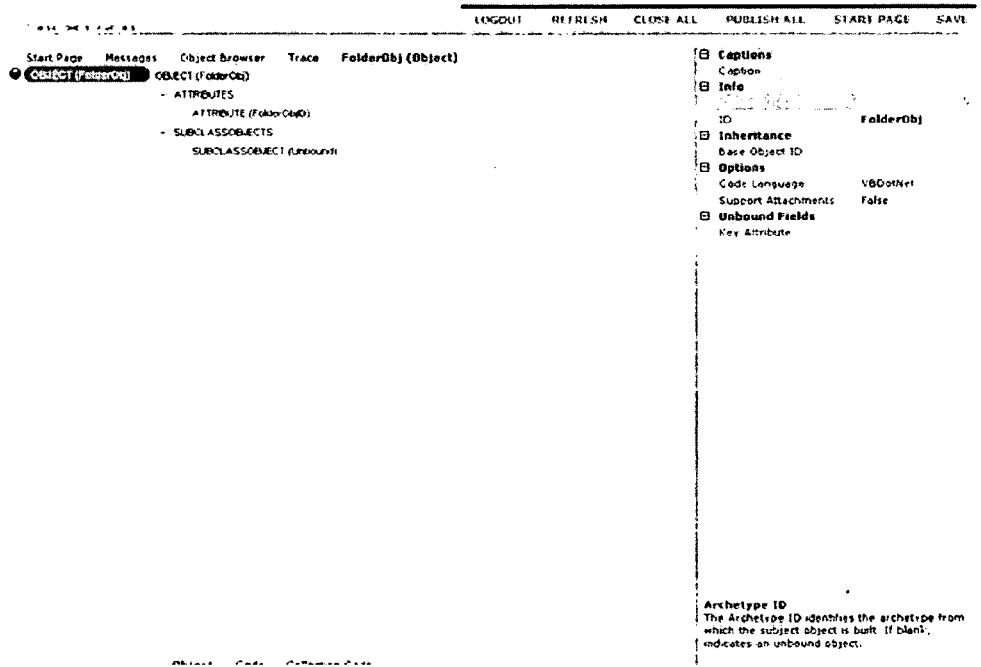

3. Enter the following information about the Folder object in the Properties tab:

- In the Caption field, enter Folder.

- Click in the Archetype ID field and choose the ... button. From the Select Item window, select FolderArch. This identifies the archetype from which the Folder object is built. Note that the ATTRIBUTES heading is automatically removed from the Object tree, and SUBCLASSOBJECT (FolderArch) displays under the SUBCLASSOBJECTS heading.

4. Next you will add a Name attribute to the Folder object. Right-click OBJECT (FolderObj) in the Object tree and select Add>ATTRIBUTES. An ATTRIBUTES heading displays in the Object tree.

5. Right-click ATTRIBUTES and select Add>ATTRIBUTE. Note that ATTRIBUTE (ATTRIBUTE0) displays below the ATTRIBUTES heading in the Object tree.

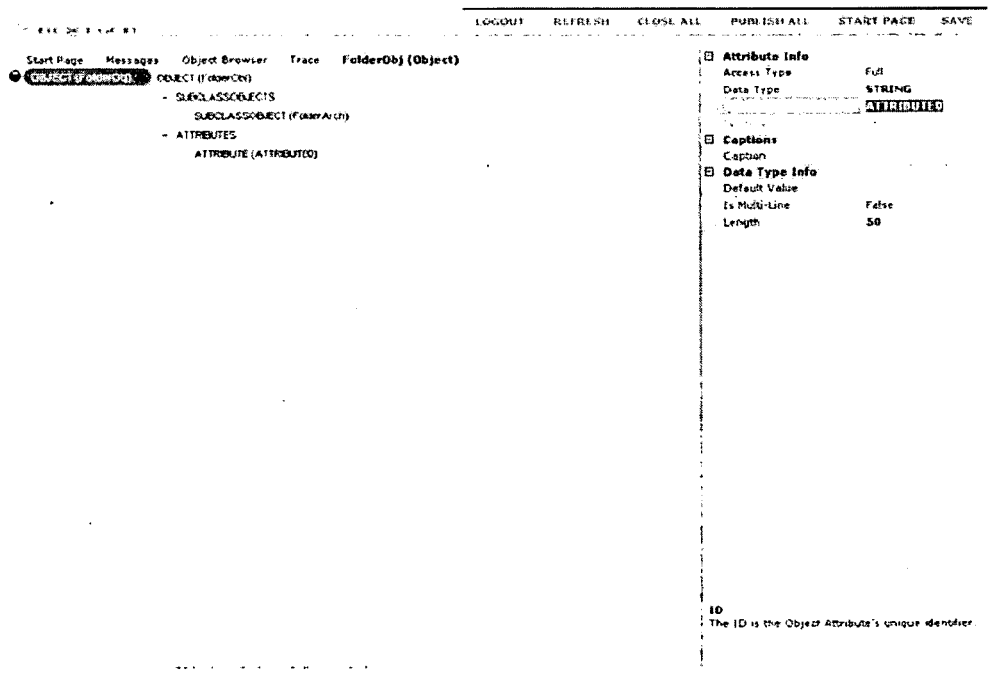

6. Enter the following information for the Name attribute in the Properties tab:

- Click in the Data Type field and select BOUND from the drop-down list. This indicates the Name attribute is tied to the Folder archetype.

- Click in the Archetype Attribute field and select Name from the drop-down list. This drop-down list includes the attributes you defined for the Folder archetype. Note that Folder Name automatically displays in the Caption field. This is the same caption you entered for the Folder Name attribute for the Folder archetype.

- In the ID field, enter Number.

7. Add a Description attribute. Right-click ATTRIBUTES and select Add>ATTRIBUTE. Enter the following information in the Properties tab:

- Click in the Data Type field and select BOUND from the drop-down list.

- Click in the Archetype Attribute field and select Description from the drop-down list. Description automatically displays in the Caption field.

- In the ID field, enter Description.

8. Next you will add a Folder Type Link relationship attribute. Right-click ATTRIBUTES and select Add>ATTRIBUTERELATIONSHIP. Enter the following information in the Properties tab:

- Click in the Data Type field and select BOUND from the drop-down list.

- Click in the Archetype Attribute field and select FolderTypeLink from the drop-down list. Note that Folder Type automatically displays in the Caption field.

- In the ID field, enter FolderTypeLink.

9. Add a Timekeeper Link relationship attribute. Right-click ATTRIBUTES and select Add>ATTRIBUTE. Enter the following information in the Properties tab:

- Click in the Data Type field and select BOUND from the drop-down list.

- Click in the Archetype Attribute field and select TimekeeperLink from the drop-down list. Note that Timekeeper automatically displays in the Caption field.

- In the ID field, enter TimekeeperLink.

10. The following information should now display in the Object Designer.

Choose the Save button in the upper right corner to save this information and return to the Start Page.

Now that you have finished adding Folder Type, Timekeeper and Folder objects to their associated archetypes, you can design forms that will include these archetypes. Proceed to block 740.

Block 740 entails design forms for each of the objects. In the exemplary embodiment, this entails designing a grid, form and worklist for each using the Form Designer. This will yield a the following:

- Folder Grid
- Folder Form
- Folder Worklist

- Folder Type Grid
- Folder Type Form
- Folder Type Worklist

- Timekeeper Grid
- Timekeeper Form
- Timekeeper Worksheet

When you've finished designing a form, you can define different "views" for each parent and child object defined for the page's base object by proceeding to Step 5 - Define Pages.

1.1.2 Folder Forms

*1.1.2.1 Design a Folder Grid*

First you will design a Folder grid that contains fields associated with the Folder archetype.

1. In the Exemplary IDE Start Page, right-click Form and select Add New Form Item.

2. In the Add New Form window, enter FolderGrid and choose OK. The Form Designer displays.

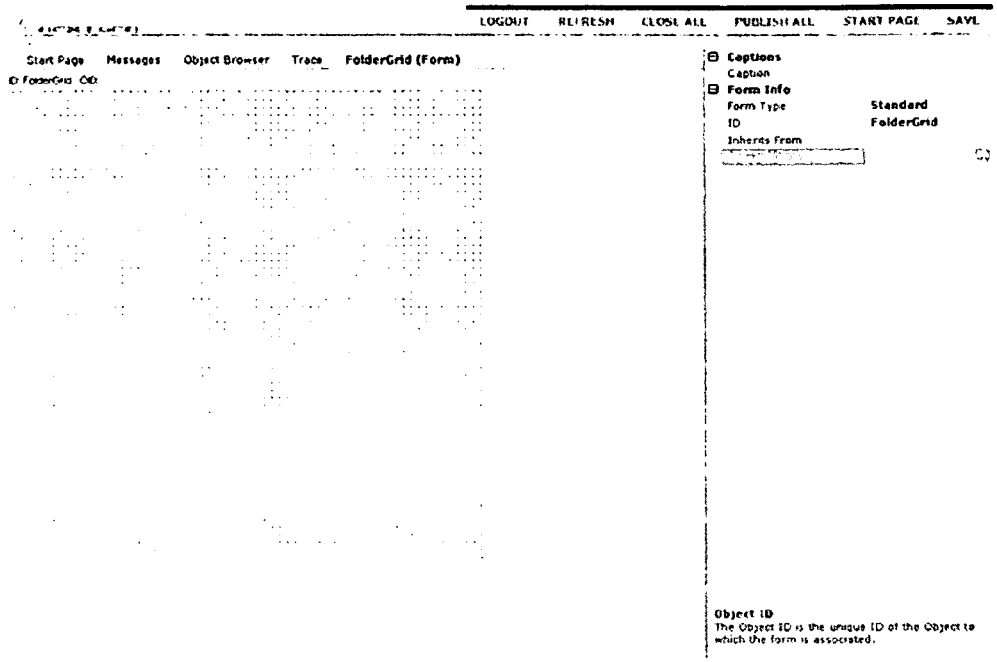

3. Enter the following information about the Folder grid in the Properties tab:

- In the Caption field, enter Folder.

- Click in the Form Type field and select Grid from the drop-down list.

- Click in the Object ID field and choose the ... button. From the Select Item window, select FolderObj. This indicates that the Folder object is the object associated with the Folder grid.

4. Select the Tools tab. A list of attributes associated with the Folder object displays.

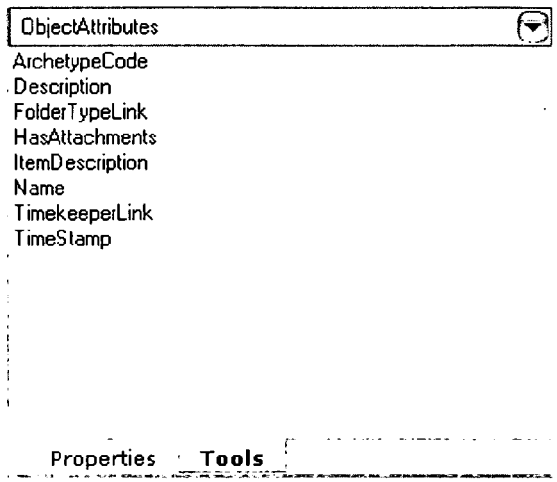
5. Click Name and drag it to the far left of the Designer tab. The Folder Name column automatically displays. Folder Name is the caption you defined for this attribute in the Archetype Designer.
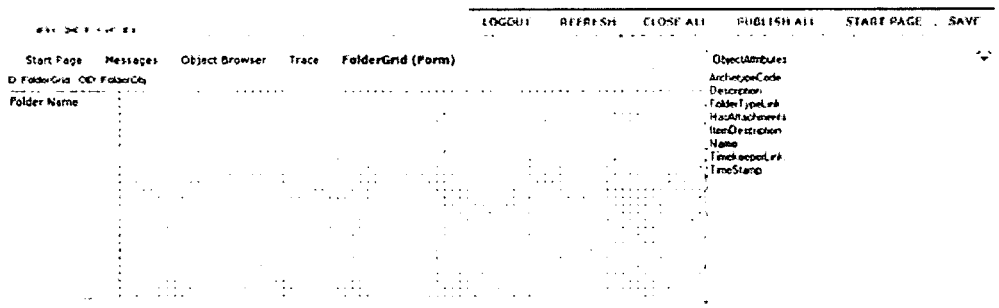
6. Click Description and drag it to right of the Folder Name column. The Folder Description column automatically displays.
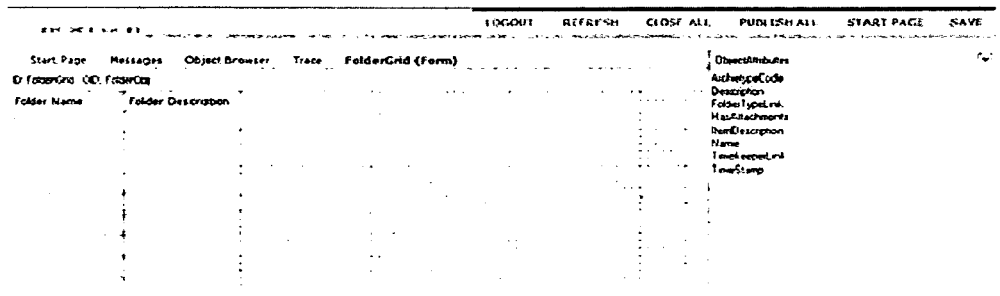

7. Click FolderTypeLink and drag it to right of the Folder Description column. The Folder Type column automatically displays.

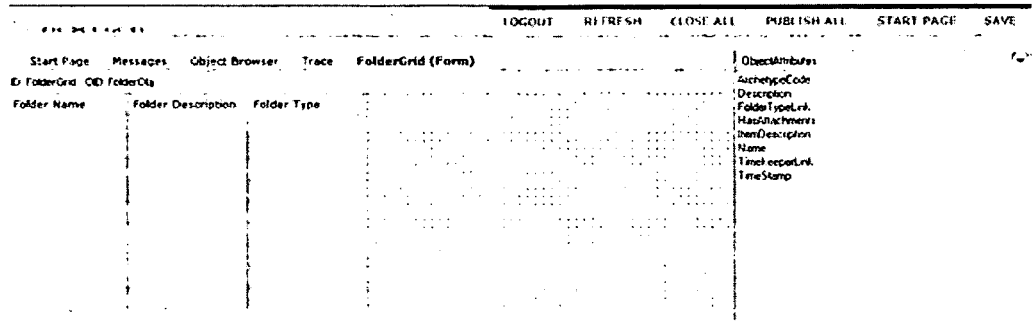

8. Increase the width of each column by clicking in the column and dragging the blue dot to the left. You can also increase the width by selecting the Properties tab and entering a value in the Width field.

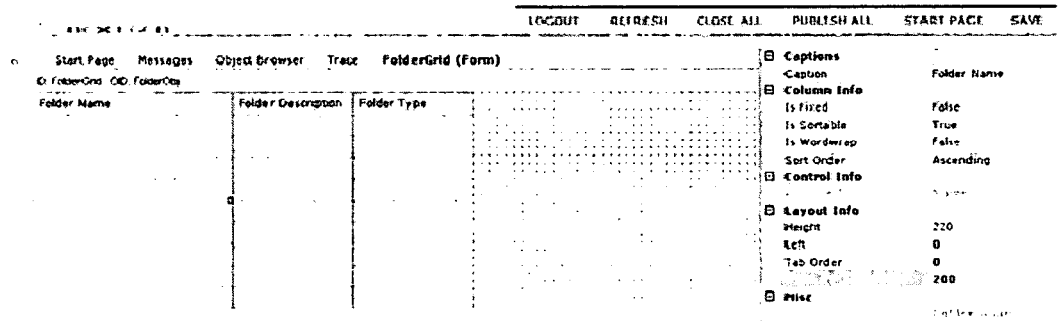

9. Choose the Save button in the upper right corner to save this grid and return to the Start Page.

Next you will design a Folder form.

*1.1.2.2 Design a Folder Form*

Now you will design a Folder form that contains fields associated with the Folder archetype.

1. In the Exemplary IDE Start Page, right-click Form and select Add New Form Item.

2. In the Add New Form window, enter FolderForm and choose OK. The Form Designer displays.

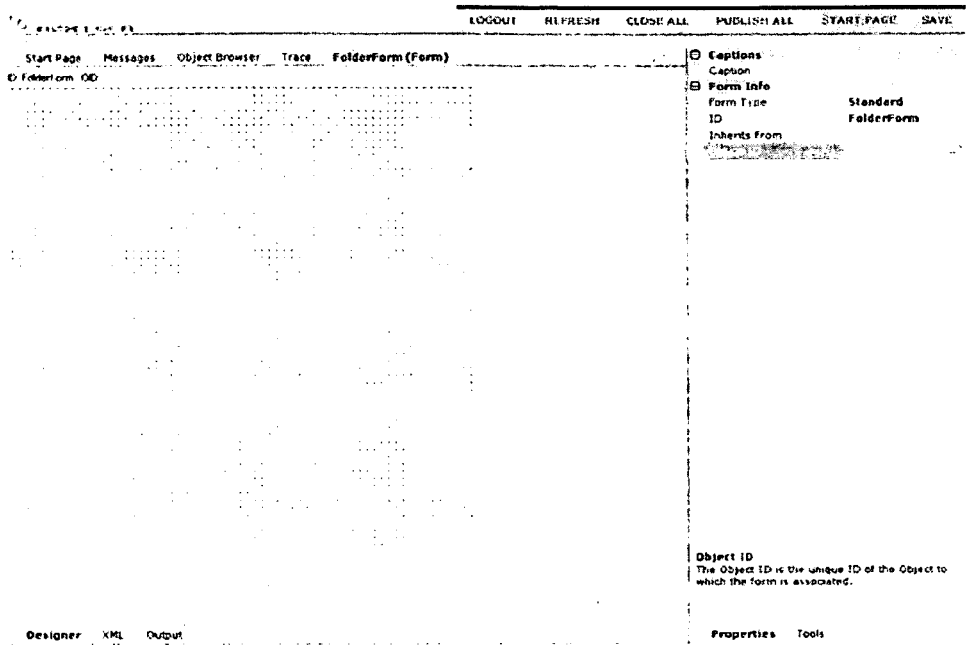

3. Enter the following information about the Folder form in the Properties tab:

- In the Caption field, enter Folder.

- Click in the Object ID field and choose the ... button. From the Select Item window, select FolderObj. This indicates that the Folder object is the object associated with the Folder form.

4. Select the Tools tab. A list of attributes associated with the Folder object displays.

5. Click Name and drag it to the far left of the Designer tab. The Folder Name field automatically displays.

6. Increase the width of this field by clicking in the column and dragging the blue dot to the left. You can also increase the width by selecting the Properties tab and entering a value in the Width field.

7. In the Tools tab, select Description and drag it below the Folder Name field. The Folder Description field automatically displays. Increase the width of this field as described in step 6.

8. In the Tools tab, select FolderTypeLink and drag it below the Folder Description field. The Folder Type field automatically displays. The icon indicates this field can be queried 9. Select TimekeeperLink and drag it to the right of the Folder Type field.

The Timekeeper field, which can be queried, automatically displays.

10. Reduce the length of the form by clicking in it, and then clicking and dragging the center blue dot in the bottom of the form to just below the Folder Type and Timekeeper fields.

11. Choose the Save button in the upper right corner to save this form and return to the Start Page.

Next you will design a Folder worklist.

*1.1.2.3 Design a Folder Worklist*

Now you will design a Folder worklist that contains fields associated with the Folder archetype.

1. In the Exemplary IDE Start Page, right-click Form and select Add New Form Item.

2. In the Add New Form window, enter FolderWorklist and choose OK. The Form Designer displays.

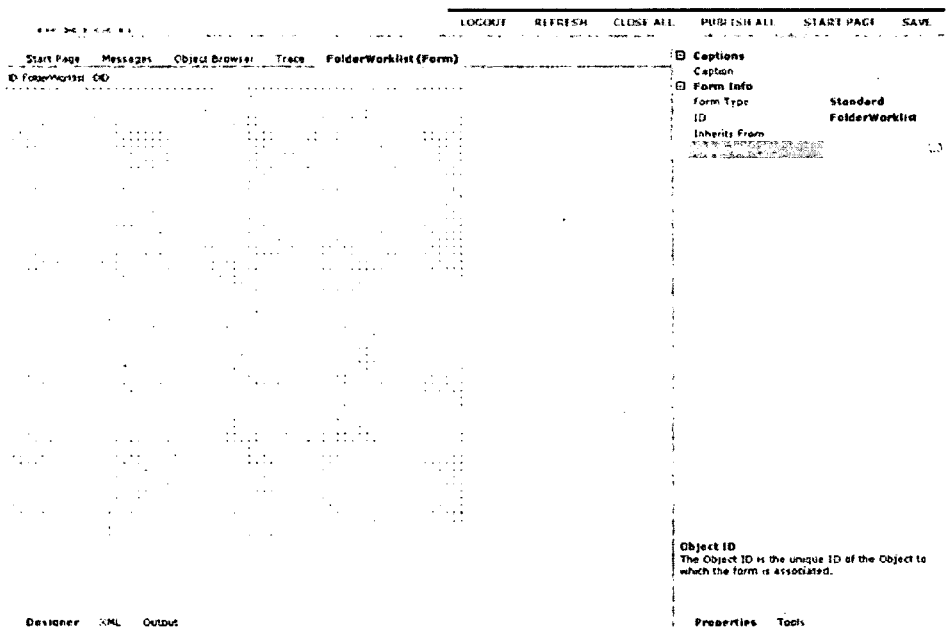

3. Enter the following information about the Folder worklist in the Properties tab:

- In the Caption field, enter Folder.

- Click in the Form Type field and select Worklist from the drop-down list.

- Click in the Object ID field and choose the ... button. From the Select Item window, select FolderObj. This indicates that the Folder object is the object associated with the Folder worklist.

4. Select the Tools tab. A list of attributes associated with the Folder object displays.

5. Click Name and drag it to the far left of the Designer tab. The Folder Name column automatically displays.

6. Click Description and drag it to the far left of the Designer tab. The Folder Description column automatically displays.

7. Increase the width of each column by clicking in the column and dragging the blue dot to the left. You can also increase the width by selecting the Properties tab and entering a value in the Width field.

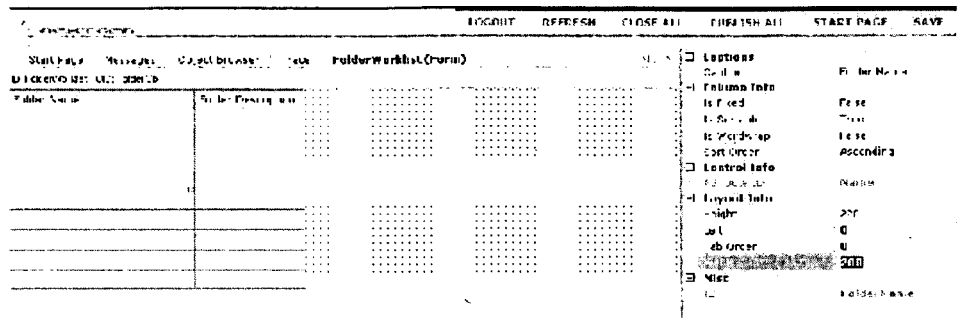

8. Choose the Save button in the upper right corner to save this worklist and return to the Start Page.

Now that you have finished designing forms for the Folder attribute, design a grid for the Folder Type attribute.

1.1.3 Folder Type Forms

*1.1.3.1 Design a Folder Type Grid*

Next you will design a Folder Type grid that contains fields associated with the Folder Type archetype.

1. In the Exemplary IDE Start Page, right-click Form and select Add New Form Item.

2. In the Add New Form window, enter FolderTypeGrid and choose OK. The Form Designer displays.

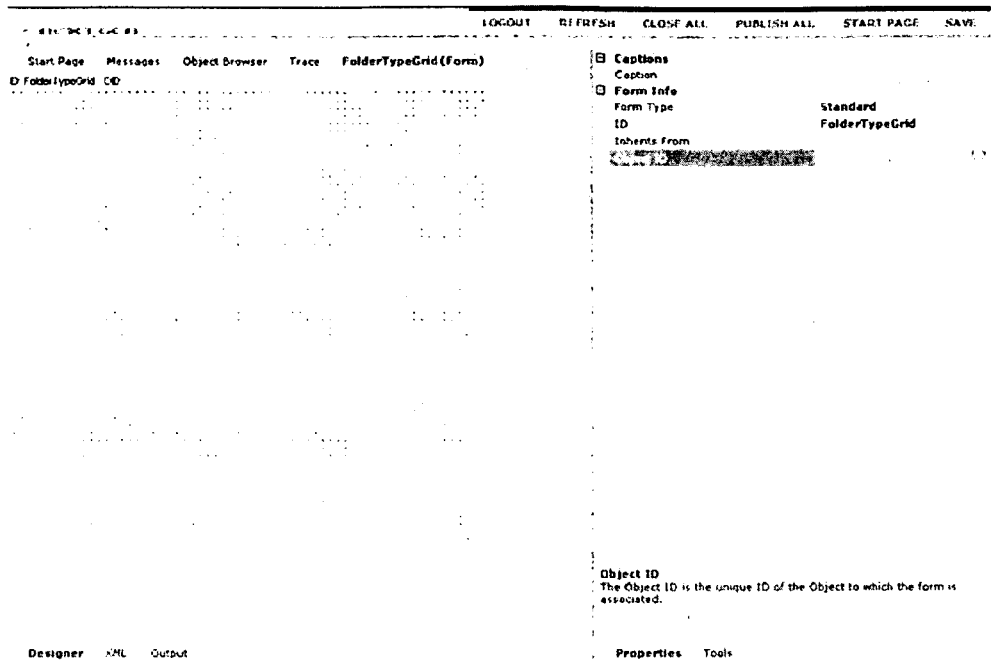

3. Enter the following information about the Folder Type grid in the Properties tab:

- In the Caption field, enter Folder Type.

- Click in the Form Type field and select Grid from the drop-down list.

- Click in the Object ID field and choose the ... button. From the Select Item window, select FolderTypeObj. This indicates that the Folder Type object is the object associated with the Folder Type worklist.

4. Select the Tools tab. A list of attributes associated with the Folder Type object displays.

5. Click Code and drag it to the far left of the Designer tab. The Code column automatically displays. Code is the caption you defined for this attribute in the Archetype Designer.

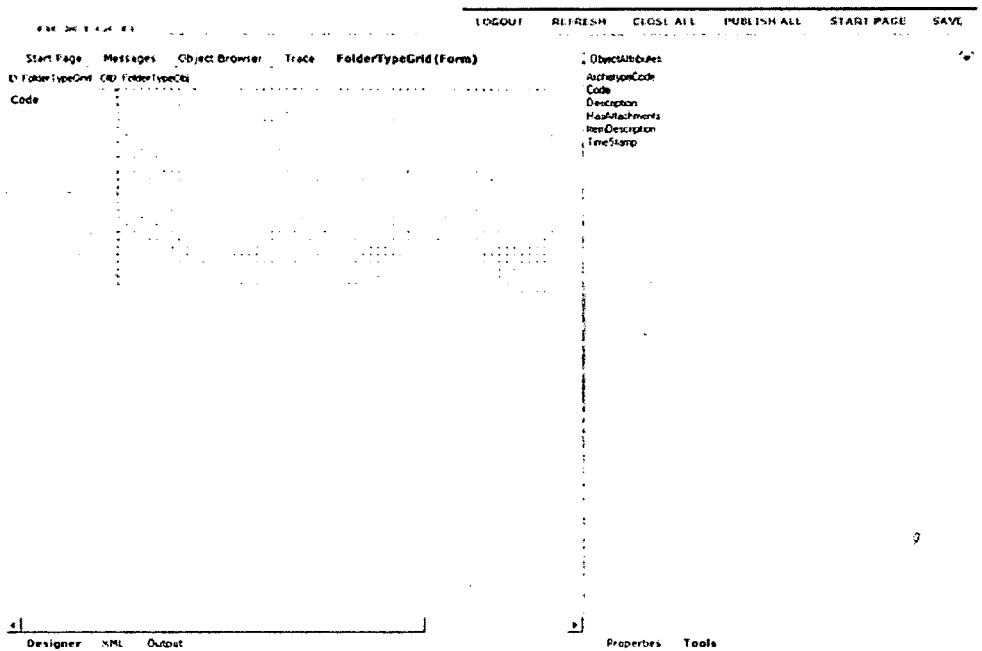
6. Click Description and drag it to the right of the Code column. The Description column automatically displays.
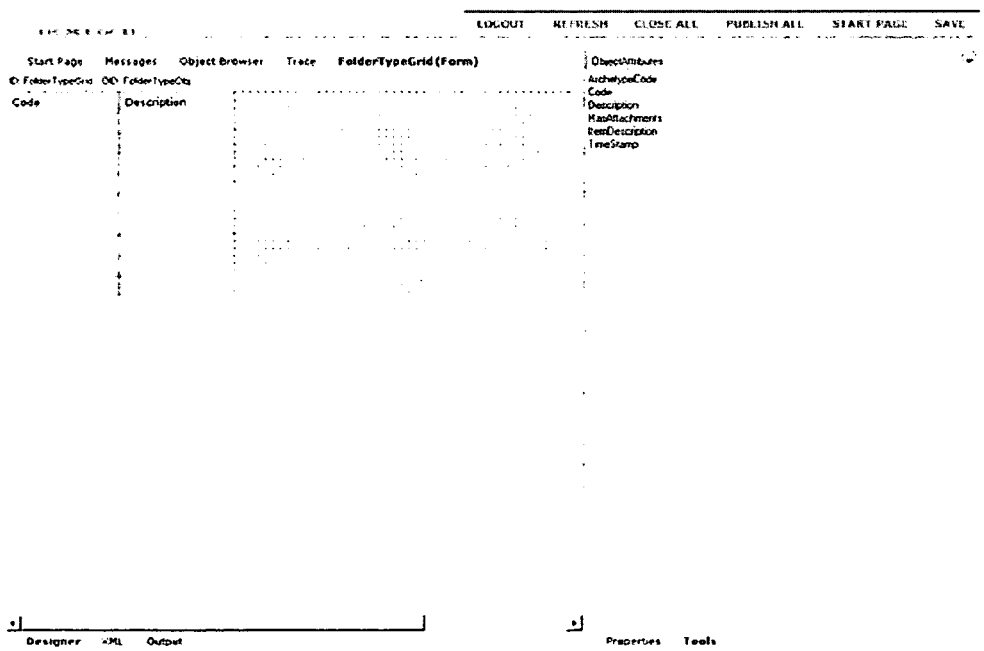

7. Increase the width of each column by clicking in the column and dragging the blue dot to the left. You can also increase the width by selecting the Properties tab and entering a value in the Width field.

8. Choose the Save button in the upper right corner to save this grid and return to the Start Page.

Next you will design a Folder Type form.

*1.1.3.2 Design a Folder Type Form*

Now you will design a Folder Type form that contains fields associated with the Folder Type archetype.

1. In the Exemplary IDE Start Page, right-click Form and select Add New Form Item.

2. In the Add New Form window, enter FolderTypeForm and choose OK. The Form Designer displays.

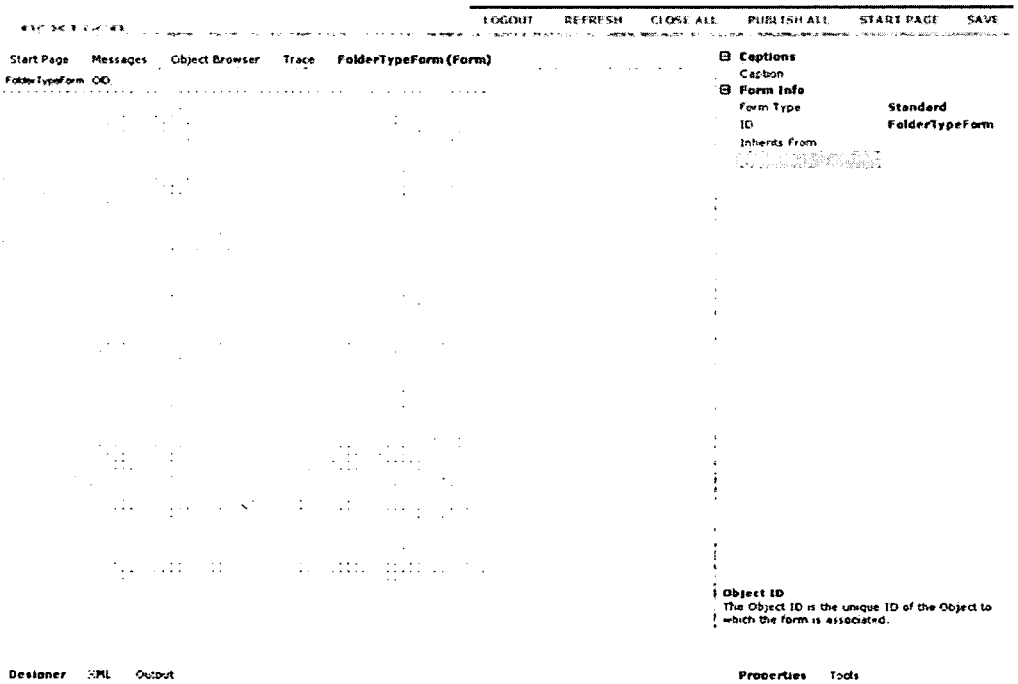

3. Enter the following information about the Folder Type form in the Properties tab:

- In the Caption field, enter Folder Type.

- Click in the Object ID field and choose the ... button. From the Select Item window, select FolderTypeObj. This indicates that the Folder Type object is the object associated with the Folder form.

4. Select the Tools tab. A list of attributes associated with the Folder Type object displays.

5. Click Code and drag it to the far left of the Designer tab. The Code field automatically displays.

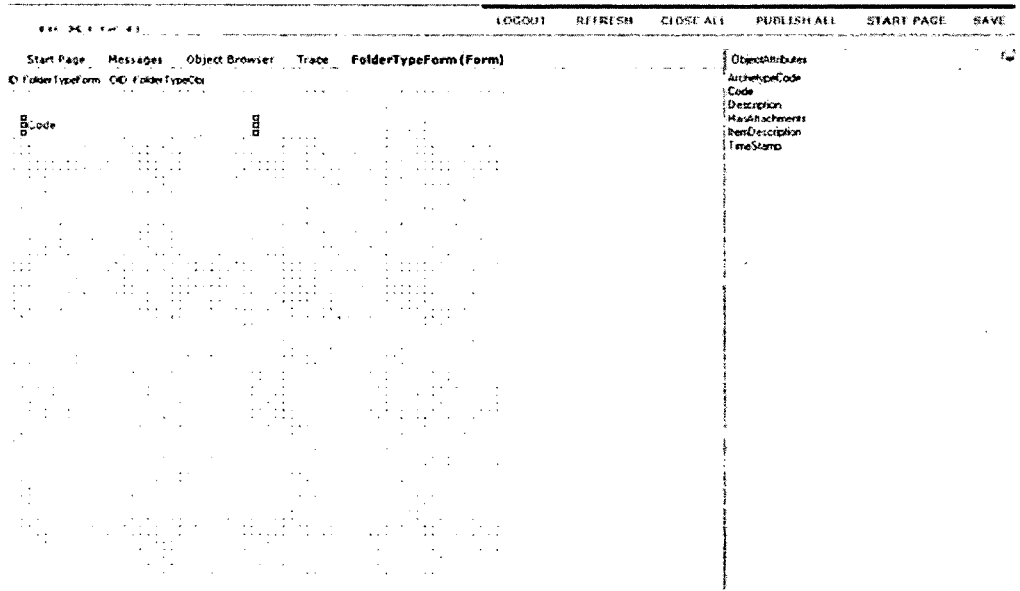

6. Click Description and drag it to the far left of the Designer tab. The Description field automatically displays.

7. Reduce the length of the form by clicking in it, and then clicking and dragging the center blue dot in the bottom of the form to just below the Description field.

8. Choose the Save button in the upper right corner to save this form and return to the Start Page.

Next you will design a Folder Type worklist.

*1.1.3.3  Design a Folder Type Worklist*

Now you will design a Folder Type worklist that contains fields associated with the Folder Type archetype.

1. In the Exemplary IDE Start Page, right-click Form and select Add New Form Item.

2. In the Add New Form window, enter FolderTypeWorklist and choose OK. The Form Designer displays.

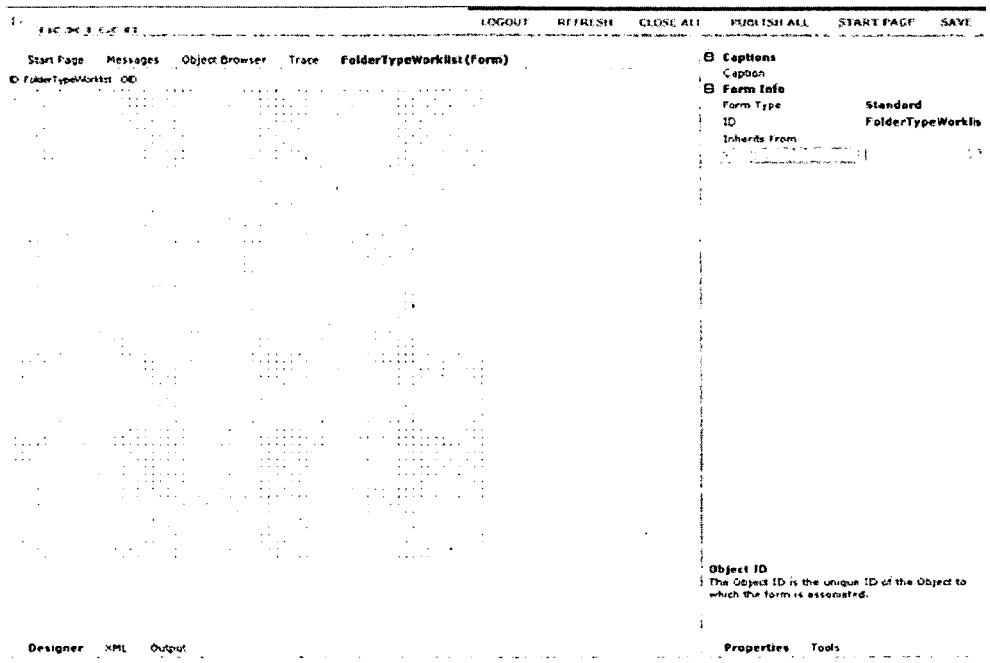

3. Enter the following information about the Folder Type worklist in the Properties tab:

- In the Caption field, enter Folder Type.

- Click in the Form Type field and select Worklist from the drop-down list.

- Click in the Object ID field and choose the ... button. From the Select Item window, select FolderTypeObj. This indicates that the Folder Type object is the object associated with the Folder Type worklist.

4. Select the Tools tab. A list of attributes associated with the Folder Type object displays.

5. Click Code and drag it to the far left of the Designer tab. The Code column automatically displays.

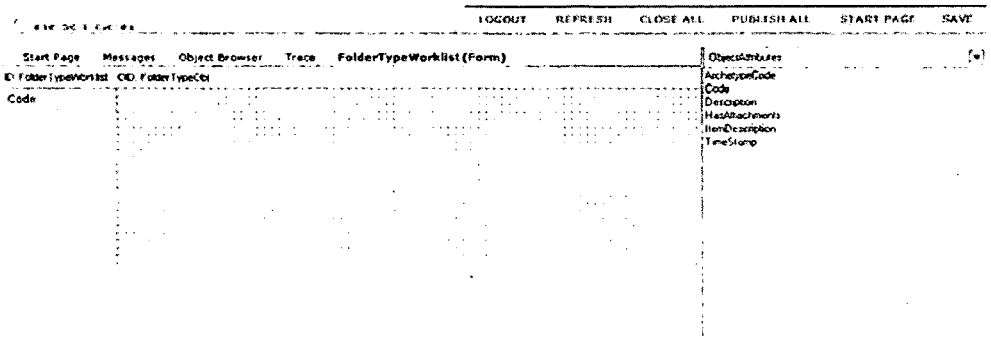

6. Click Description and drag it to the right of the Code column. The Description column automatically displays.

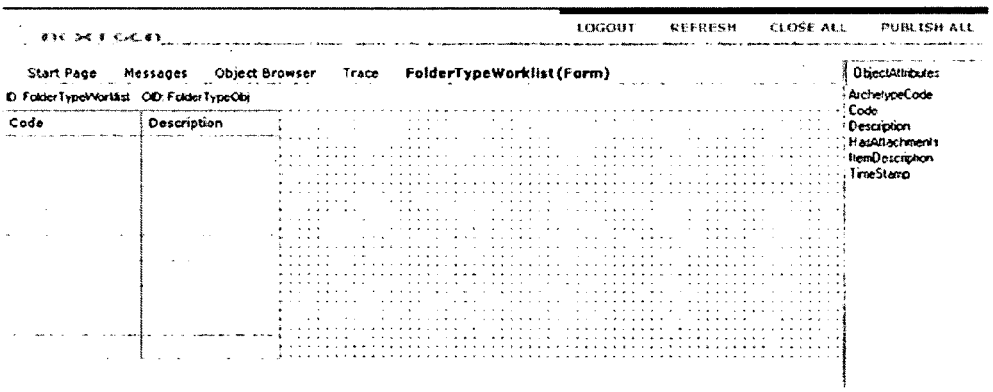

7. Increase the width of each column by clicking in the column and dragging the blue dot to the left. You can also increase the width by selecting the Properties tab and entering a value in the Width field.

8. Choose the Save button in the upper right corner to save this worklist and return to the Start Page.

Now that you have finished designing forms for the Folder Type attribute, design a grid for the Timekeeper attribute.

1.1.4 Timekeeper Forms

*Design a Timekeeper Grid*

Next you will design a Folder Type grid that contains fields associated with the Timekeeper archetype.

1. In the Exemplary IDE Start Page, right-click Form and select Add New Form Item.

2. In the Add New Form window, enter TimekeeperGrid and choose OK. The Form Designer displays.

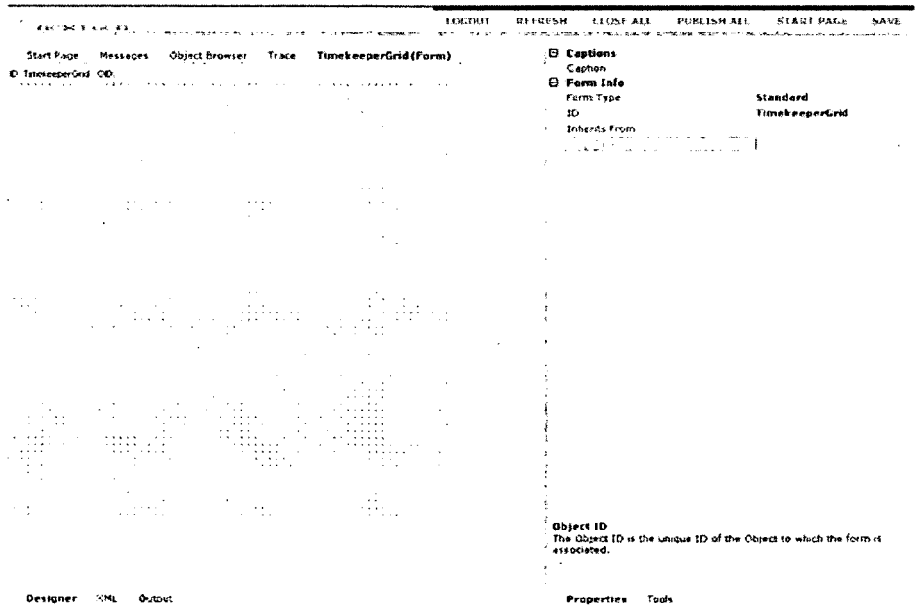

3. Enter the following information about the Timekeeper grid in the Properties tab:

- In the Caption field, enter Timekeeper.

- Click in the Form Type field and select Grid from the drop-down list.

- Click in the Object ID field and choose the ... button. From the Select Item window, select TimekeeperObj. This indicates that the Timekeeper object is the object associated with the Timekeeper worklist.

4. Select the Tools tab. A list of attributes associated with the Timekeeper object displays.

5. Click Number and drag it to the far left of the Designer tab. The Tkpr Number column automatically displays. Tkpr Number is the caption you defined for this attribute in the Archetype Designer.

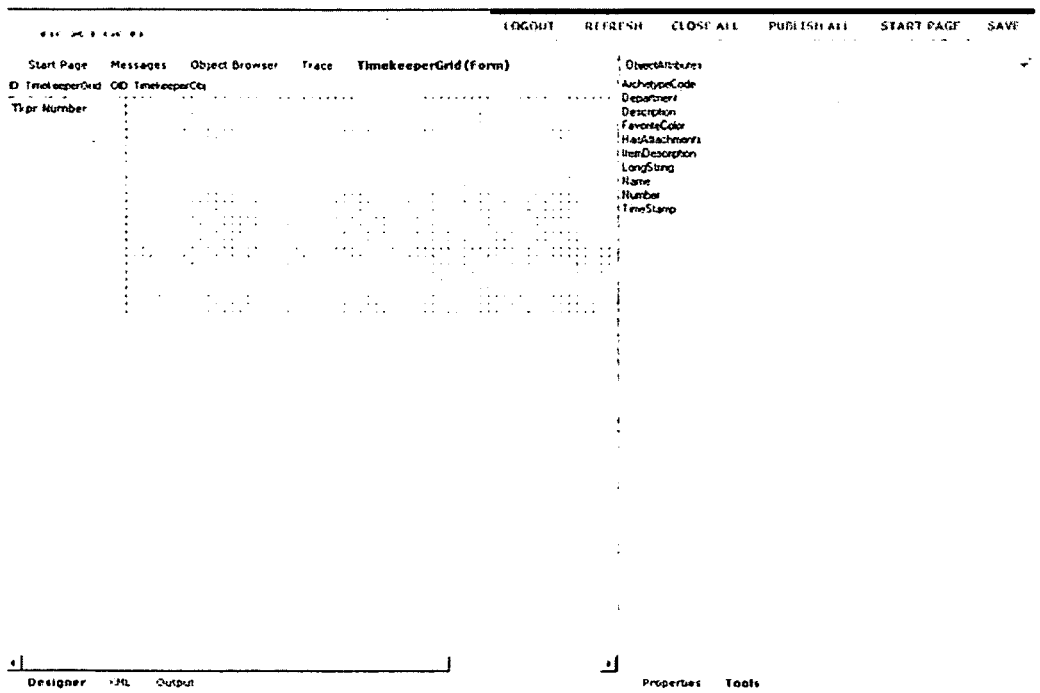

7. Click Name in the Tools tab and drag it to the right of the Tkpr Number column in the Designer tab. The Name column automatically displays.

8. Click Department in the Tools tab and drag it to the right of the Name column in the Designer tab. The Department column automatically displays.

9. Click Description in the Tools tab and drag it to the right of the Department column in the Designer tab. The Description column automatically displays. The grid should now display as follows in the Designer tab.

10. Increase the width of each column by clicking in the column and dragging the blue dot to the left. You can also increase the width by selecting the Properties tab and entering a value in the Width field.

11. Choose the Save button in the upper right corner to save this grid and return to the Start Page.

Now you will design a Timekeeper form that contains fields associated with the Timekeeper archetype.

1. In the Exemplary IDE Start Page, right-click Form and select Add New Form Item.

2. In the Add New Form window, enter TimekeeperForm and choose OK. The Form Designer displays.

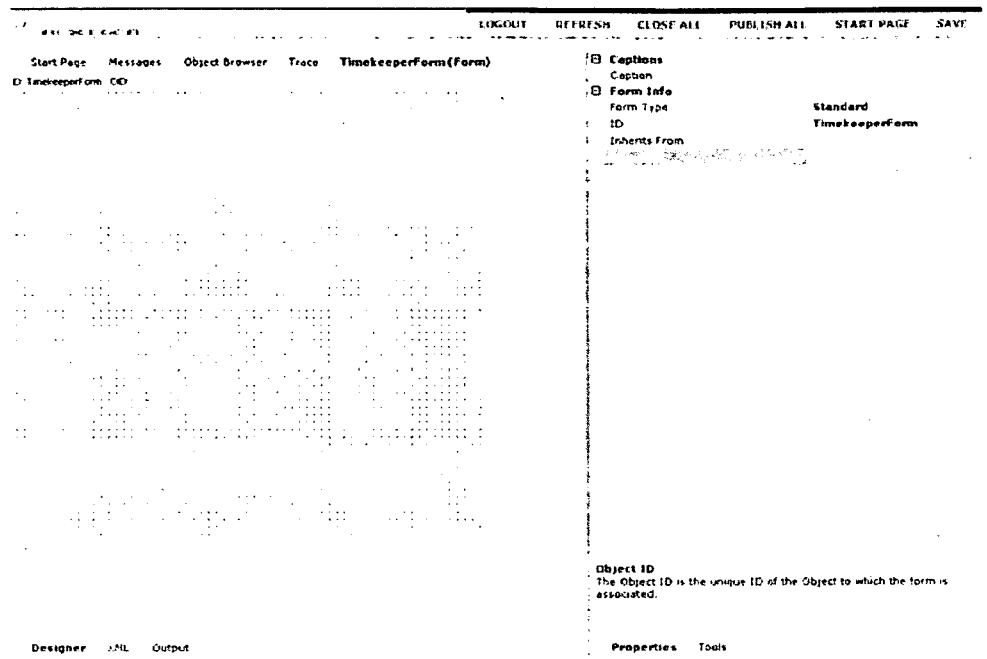

3. Enter the following information about the Timekeeper form in the Properties tab:

- In the Caption field, enter Timekeeper.

- Click in the Object ID field and choose the ... button. From the Select Item window, select TimekeeperObj. This indicates that the Timekeeper object is the object associated with the Timekeeper form.

4. Select the Tools tab. A list of attributes associated with the Timekeeper object displays.

5. Click Number and drag it to the upper left corner of the Designer tab. The Tkpr Number field automatically displays.

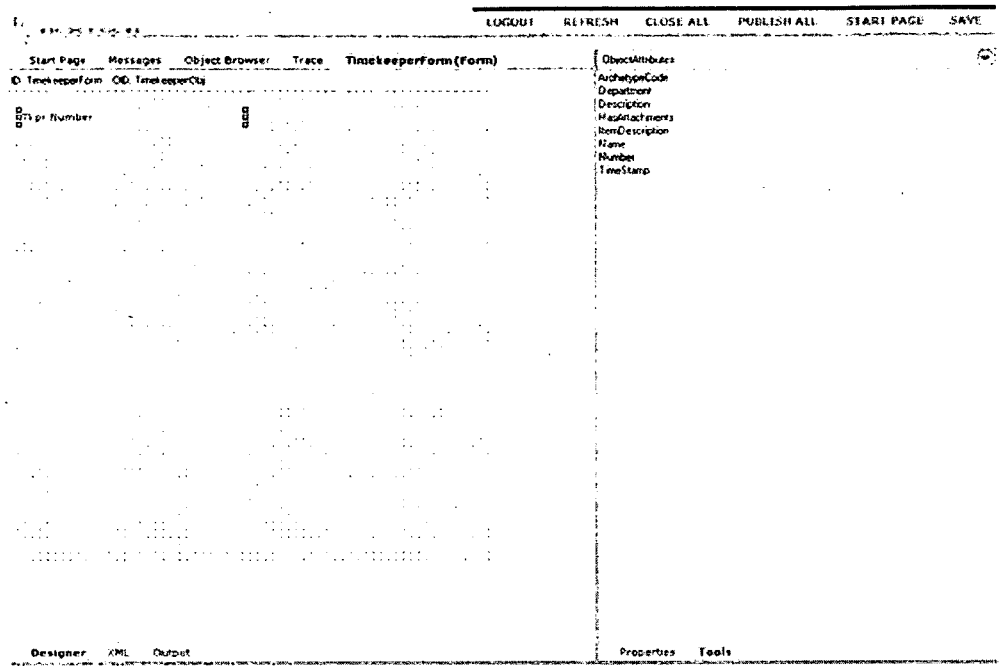

6. Click Name in the Tools tab and drag it below the Tkpr Number field in the Designer tab. The Name field automatically displays.

7. Click Department in the Tools tab and drag it to the right of the Name field in the Designer tab. The Department field automatically displays.

8. Click Description in the Tools tab and drag it below the Name field in the Designer tab. The Description field automatically displays. The form should now display as follows in the Designer tab.

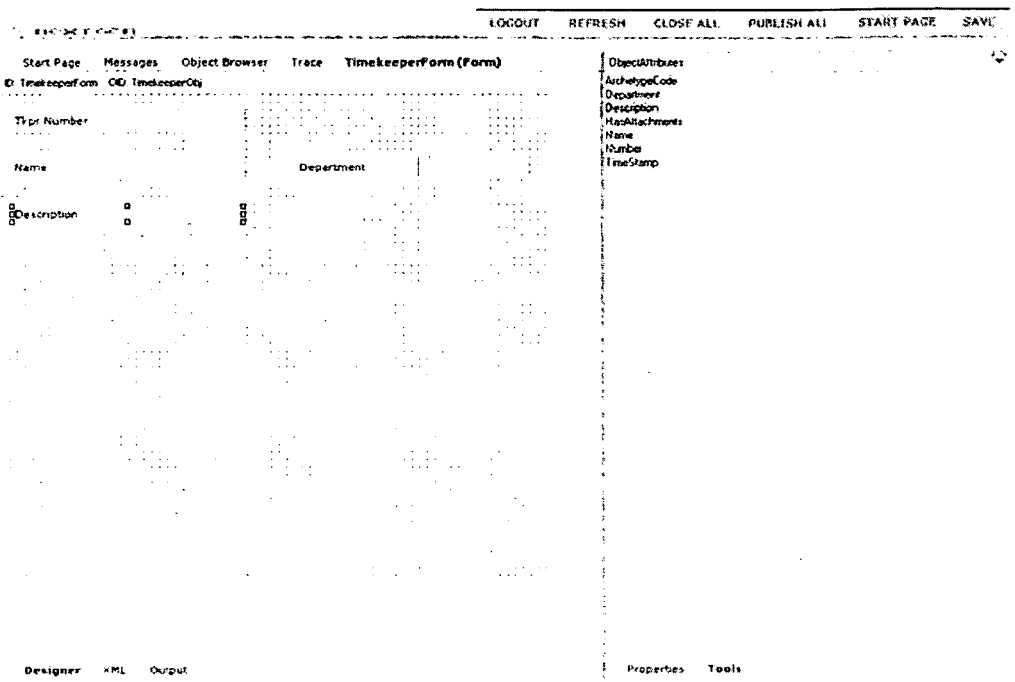

8. Choose the Save button in the upper right corner to save this form and return to the Start Page.

Now you will design a Timekeeper worklist that contains fields associated with the Timekeeper archetype.

1. In the Exemplary IDE Start Page, right-click Form and select Add New Form Item.

2. In the Add New Form window, enter TimekeeperWorklist and choose OK. The Form Designer displays.

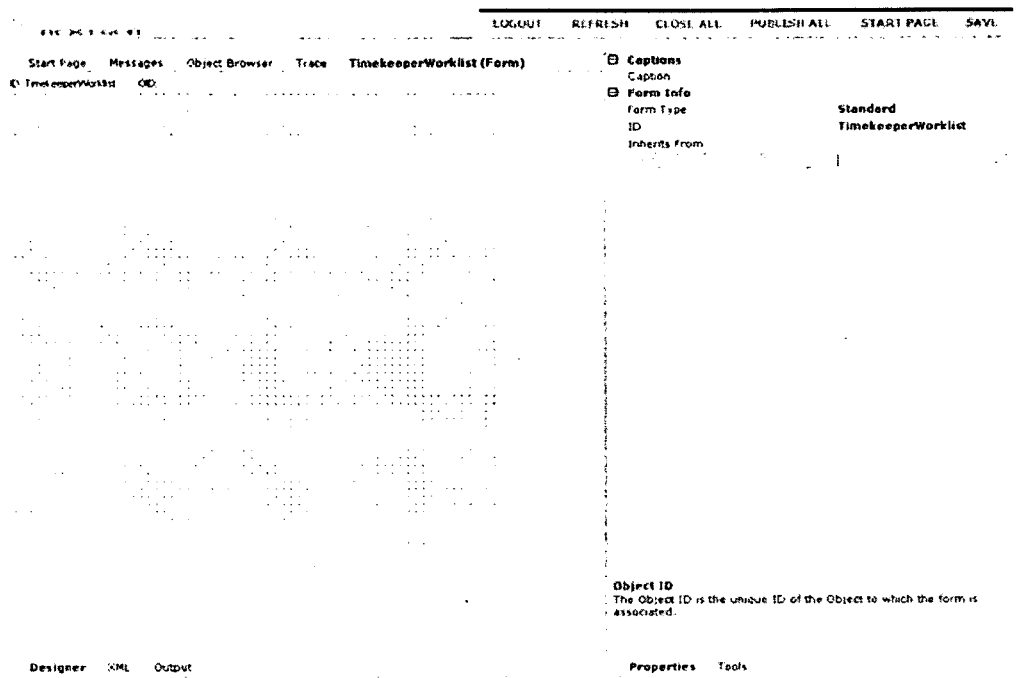

3. Enter the following information about the Timekeeper worklist in the Properties tab:

- In the Caption field, enter Timekeeper.

- Click in the Form Type field and select Worklist from the drop-down list.

- Click in the Object ID field and choose the ... button. From the Select Item window, select TimekeeperObj. This indicates that the Timekeeper object is the object associated with the Timekeeper worklist.

4. Select the Tools tab. A list of attributes associated with the Timekeeper object displays.

5. Click Number and drag it to the far left of the Designer tab. The Tkpr Number column automatically displays.

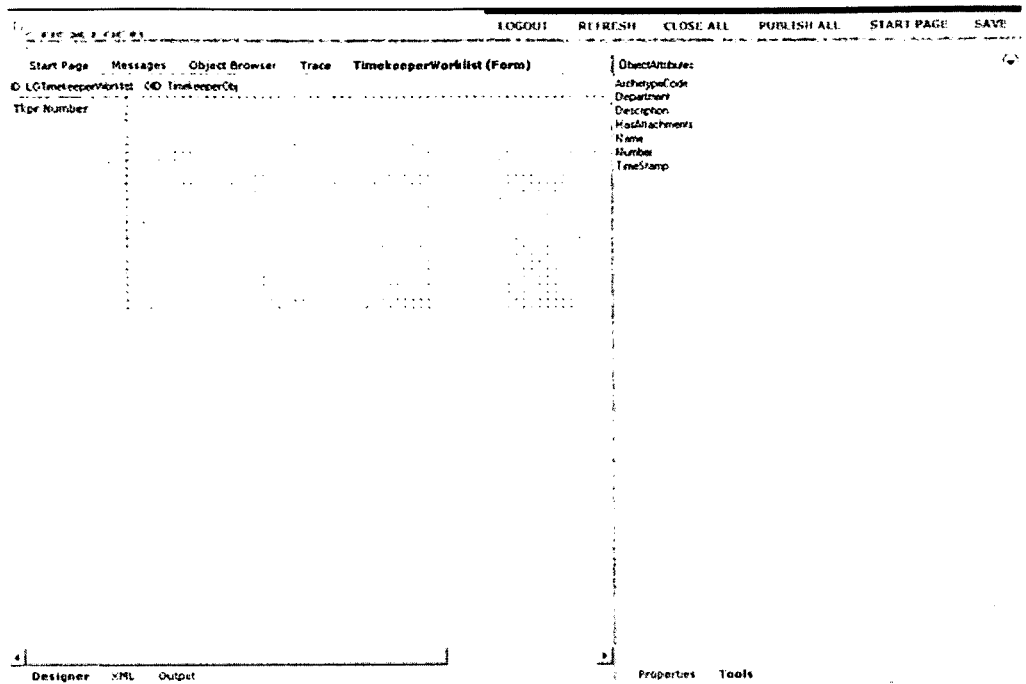

6. Click Name in the Tools tab and drag it to the right of the Tkpr Number column in the Designer tab. The Name column automatically displays.

7. Click Department in the Tools tab and drag it to the right of the Name column in the Designer tab. The Department column automatically displays.

8. Click Description in the Tools tab and drag it to the right of the Department column in the Designer tab. The Description column automatically displays. The worksheet should now display as follows in the Designer tab.

9. Increase the width of each column by clicking in the column and dragging the blue dot to the left. You can also increase the width by selecting the Properties tab and entering a value in the Width field.

10. Choose the Save button in the upper right corner to save this worklist and return to the Start Page.

Now that you have finished designing Folder, Folder Type and Timekeeper forms, you can define pages or "views" for each object defined for the page's base object. Execution then advances to block 750.

Block 750 entails defining different "views" using the page designer for each object defined for the page's base object. In the exemplary embodiment, this entails defining a Folder Page, a Folder Type Page, and a Timekeeper Page. After you define Folder and Folder Type pages, you will configure and deploy a business work flow process in the Process Designer.

Defining a Folder Page allows you to define different "views" for each parent and child object defined for the Folder object.

1. In the Exemplary IDE Start Page, right-click Page and select Add New Page Item.

2. In the Add New Page window, enter FolderPage and choose OK. The Page Designer displays.

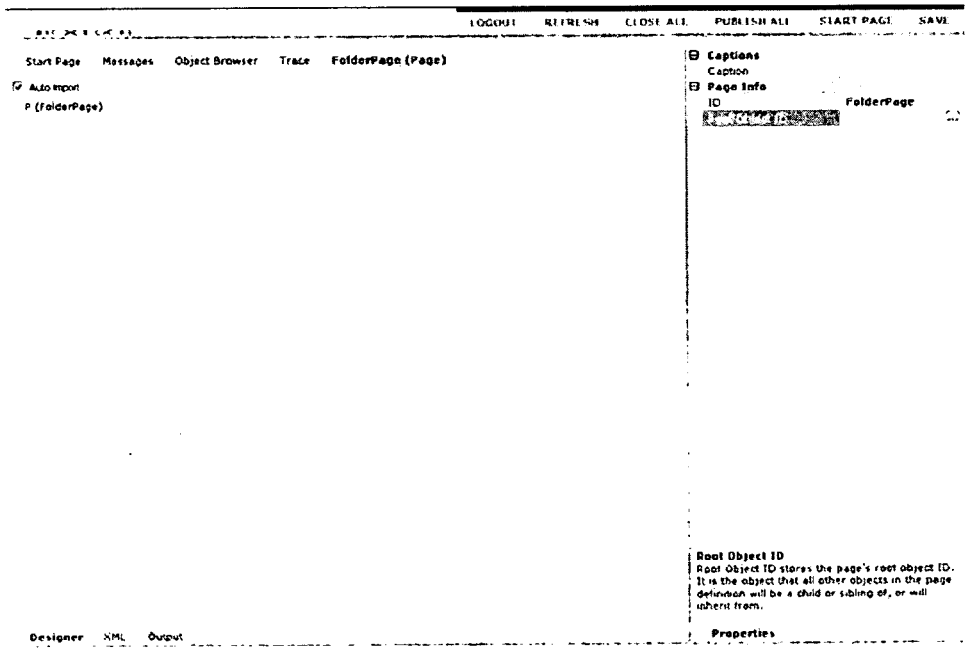

3. Enter the following information in the Properties tab:

- In the Caption field, enter Folder Page.

- Click in the Root Object ID field and choose the ... button. From the Select Item window, select FolderObj. This indicates that the Folder object is the base object associated with this page.

The following information now displays in the P (FolderPage) tree in the Designer tab.

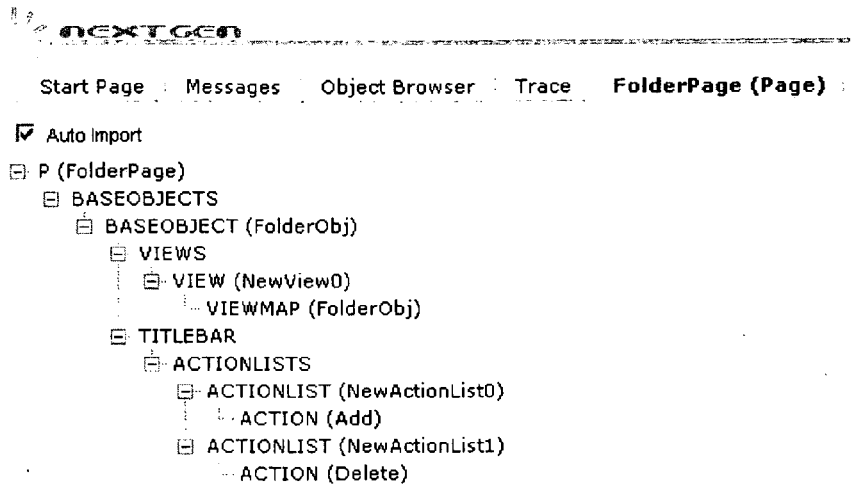

4. Now you will define the normal (form) view for the Folder object. In the P (FolderPage) tree in the Designer tab, click VIEW (NewView0) and then enter the following information in the Properties tab:

- In the Caption field, enter Normal.

- In the (ID) field, enter Normal.

5. To add a grid view for the Folder object, do the following: In the Caption field, enter Grid.

- In the (ID) field, enter Grid.

6. Next, define the Add and Delete actions that will be available in the page's title bar. Click ACTIONLIST (NewActionList0) and enter the following information in the Properties tab: In the Caption field, enter AddActionList.

- In the (ID) field, enter AddActionList

7. To define the Delete action, click ACTIONLIST (NewActionList1) and enter the following information in the Properties tab:

- In the Caption field, enter DelActionList.

- In the (ID) field, enter DelActionList

8. The following information should now display in the Page Designer.

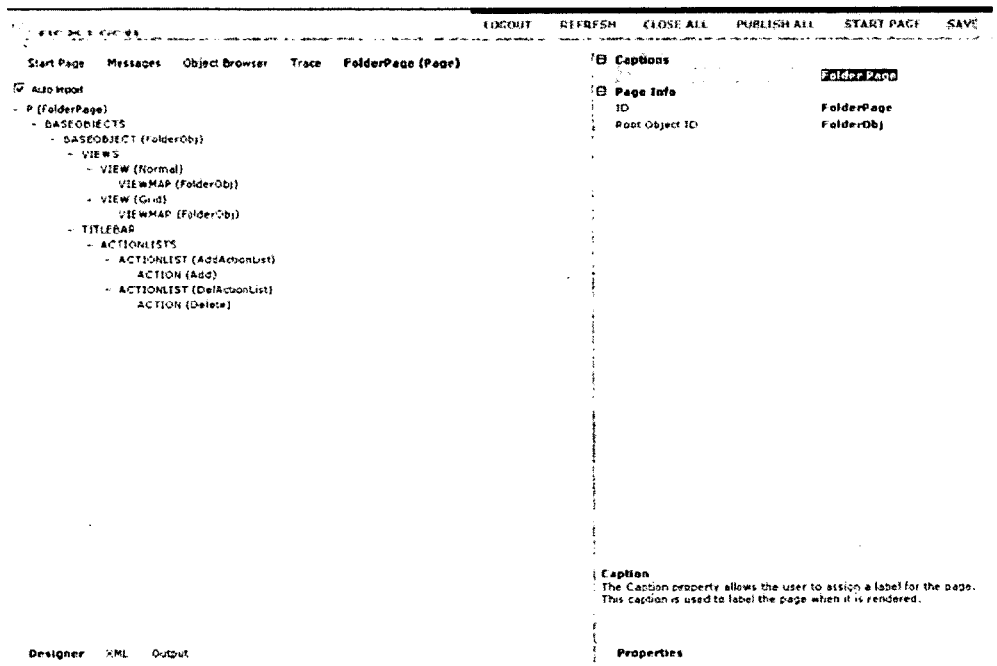

Choose the Save button in the upper right corner to save this information and return to the Start Page.

Next you will define a Folder Type page.

1.1.5 Define a Folder Type Page

After you've defined a Folder page, define a Folder Type page that allows you to define different "views" for each parent and child object defined for the Folder Type object.

1. In the Exemplary IDE Start Page, right-click Page and select Add New Page Item.

2. In the Add New Page window, enter FolderTypePage and choose OK. The Page Designer displays.

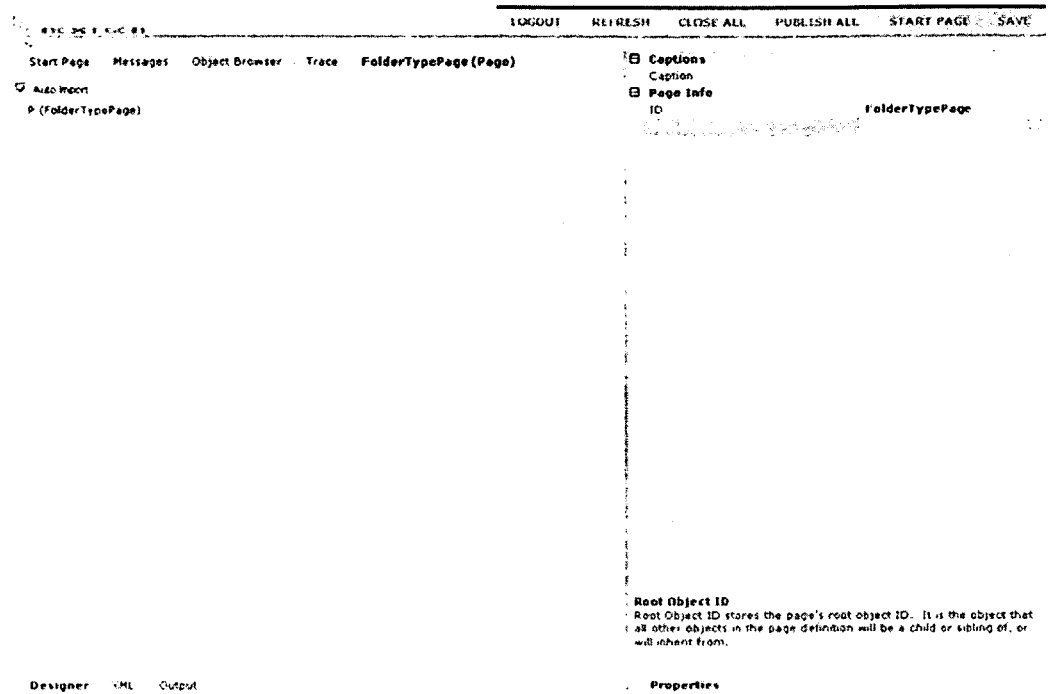

3. Enter the following information in the Properties tab:

- In the Caption field, enter Folder Type Page.

- Click in the Root Object ID field and choose the ... button. From the Select Item window, select FolderTypeObj. This indicates that the Folder Type object is the base object associated with this page.

The following information now displays in the P (FolderTypePage) tree in the Designer tab.

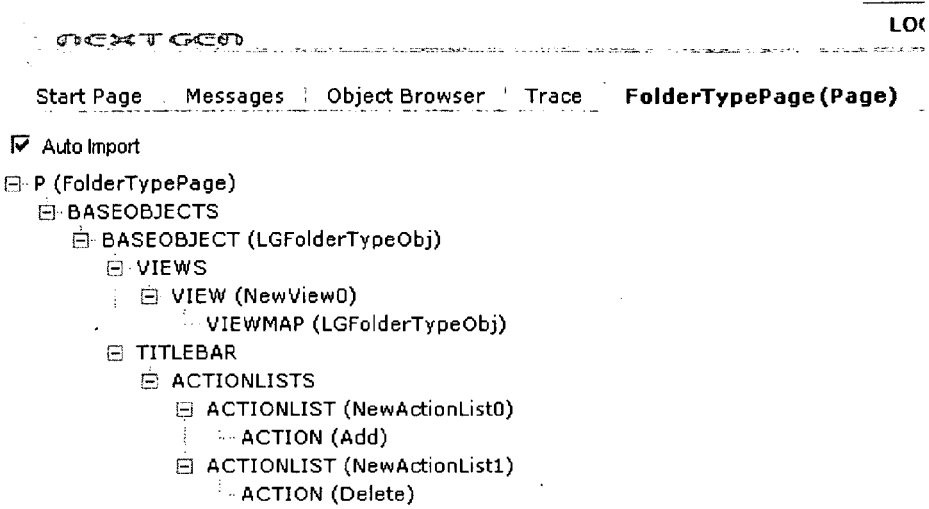

4. Now you will define the normal (form) view for the Folder Type object. In the P (FolderTypePage) tree in the Designer tab, click VIEW (NewView0) and then enter the following information in the Properties tab:

- In the Caption field, enter Normal.

- In the (ID) field, enter Normal.

5. Next, define the Add and Delete actions that will be available in the page's title bar. Click ACTIONLIST (NewActionList0) and enter the following information in the Properties tab:

6. In the Caption field, enter AddActionList.

- In the (ID) field, enter AddActionList

6. To define the Delete action, click ACTIONLIST (NewActionList1) and enter the following information in the Properties tab:

- In the Caption field, enter DelActionList.

- In the (ID) field, enter DelActionList

7. The following information should now display in the Page Designer.

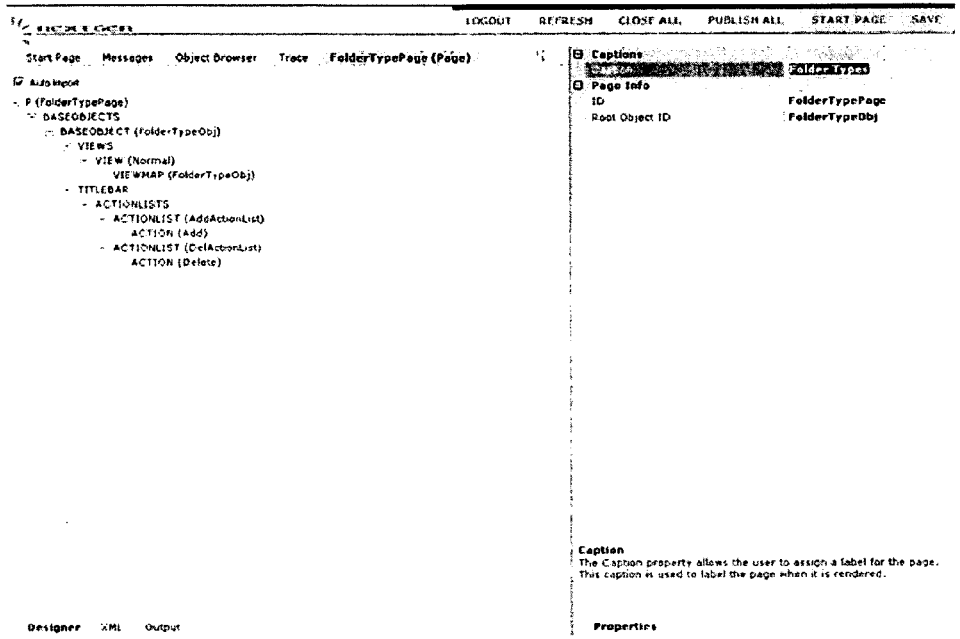

Choose the Save button in the upper right corner to save this information and return to the Start Page.

Next you will define a Timekeeper page.

1.1.6 Define a Timekeeper Page

Next, define a Timekeeper page that allows you to define different "views" for each parent and child object defined for the Timekeeper object.

1. In the Exemplary IDE Start Page, right-click Page and select Add New Page Item.

2. In the Add New Page window, enter TimekeeperPage and choose OK. The Page Designer displays.

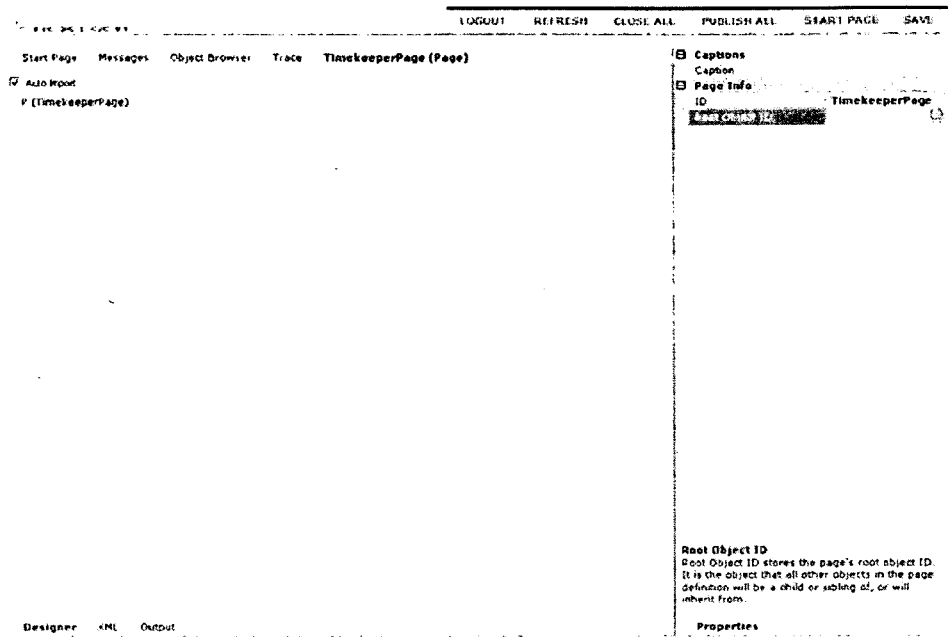

3. Enter the following information in the Properties tab:

- In the Caption field, enter Timekeeper Page.

- Click in the Root Object ID field and choose the ... button. From the Select Item window, select TimekeeperObj. This indicates that the Timekeeper object is the base object associated with this page.

The following information now displays in the P (TimekeeperPage) tree in the Designer tab.

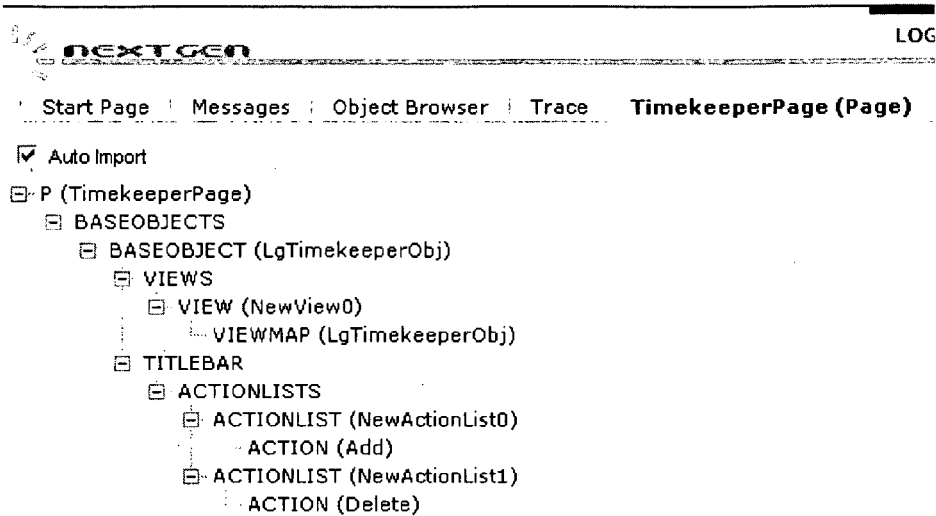

4. Now you will define the normal (form) view for the Timekeeper object. In the P (TimekeeperPage) tree in the Designer tab, click VIEW (NewView0) and then enter the following information in the Properties tab:

- In the Caption field, enter Normal.

- In the (ID) field, enter Normal.

5. Next, define the Add and Delete actions that will be available in the page's title bar. Click ACTIONLIST (NewActionList0) and enter the following information in the Properties tab:

6. In the Caption field, enter AddActionList.

- In the (ID) field, enter AddActionList

6. To define the Delete action, click ACTIONLIST (NewActionList1) and enter the following information in the Properties tab:

- In the Caption field, enter DelActionList.

- In the (ID) field, enter DelActionList.

7. The following information should now display in the Page Designer.

[screen shot showing tree]

Choose the Save button in the upper right corner to save this information and return to the Start Page.

Now that you have defined the Timekeeper, Folder and Folder Type pages, you can create a business work flow process in the Process Designer. Proceed to Step 6 – Configure the Work Flow Process .

Block 760 entails configuring or defining a business workflow process. In the exemplary embodiment, this entails use of the process designer and the for the Folder and Folder Type pages to configure a Folder process and a Folder Type process.

Configure a Folder Process

First you will configure a Folder process that creates a work flow for the Folder object.

1. In the Exemplary IDE Start Page, right-click Process and select Add New Process Item.
2. In the Add New Process window, enter FolderProcess and choose OK. The Process Designer displays.

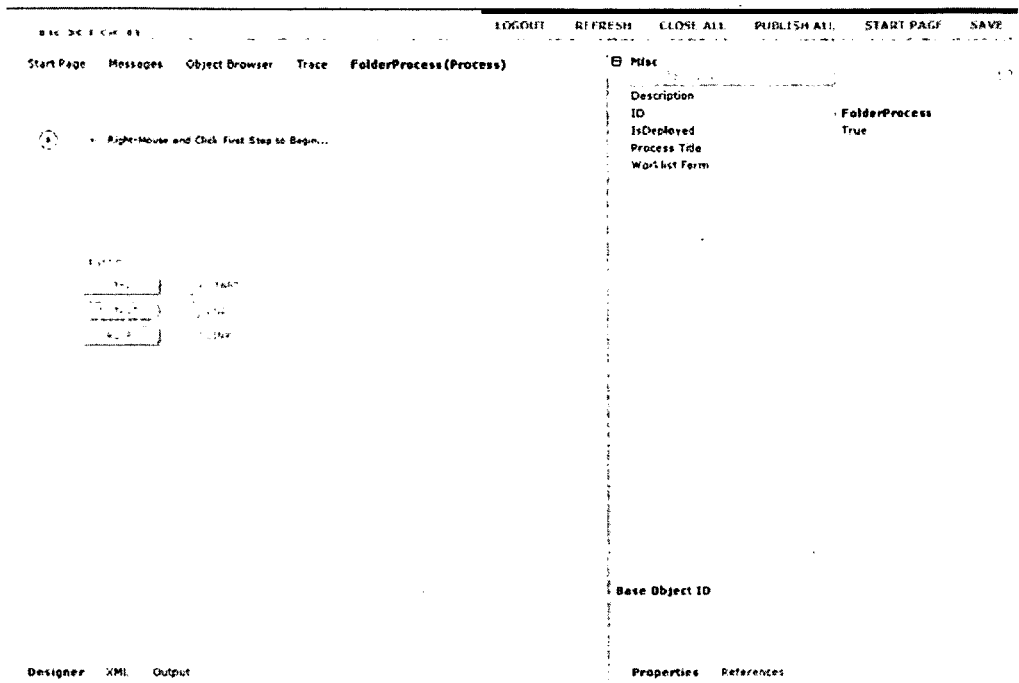

3. Enter the following information in the Properties tab:

- Click in the Base Object ID field and choose the ... button. From the Select Item window, select FolderObj. This indicates that the Folder object is the base object associated with this process.

- In both the Description and Process Title fields, enter Folder Process.

- Click in the Worklist Form field and choose the ... button. From the Select Item window, select FolderWorklist. This indicates that the Folder worklist is the form associated with this process.

4. In the Designer tab, right-click ![Right-Mouse and Click First Step to Begin...] and select First Step.

5. A menu displays the FolderPage, which is the page associated with the Folder object. Select FolderPage.

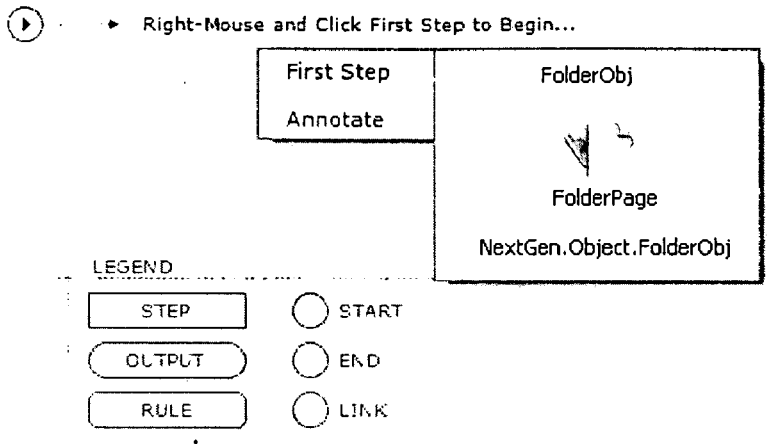

6. The FIRSTSTEP step icon displays. Right-click it and select New Output>Release - Cancel. The Release and Cancel output icons display.

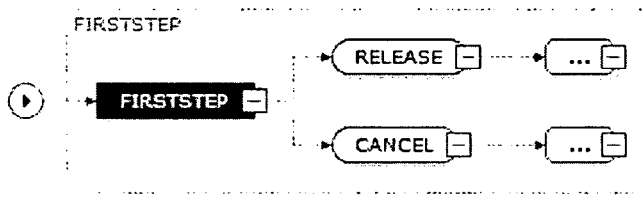

7. Right-click the ⬚ (ELSE) icon to the right of the RELEASE output icon and select Next Step.

8. From the menu, you can select one of the following: an existing step (either END to end the process or FIRSTSTEP to return to the first step); FolderPage, which is the page of the base object (FolderObj) associated with this process; or Save to save the information users have entered. Select Save.

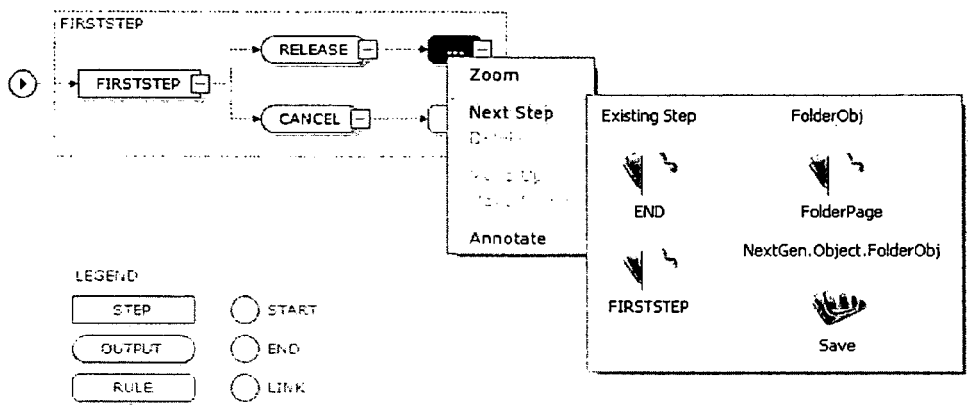

9. The following diagram now displays in the Designer tab.

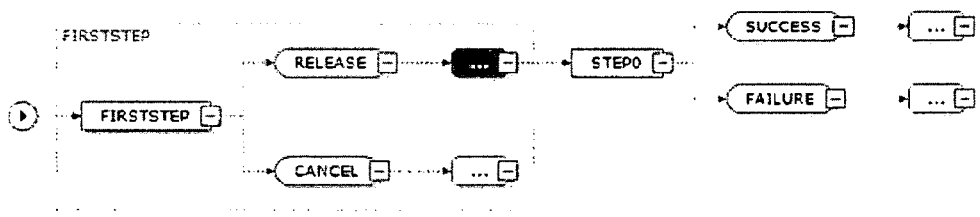

Click the STEP0 step icon and then enter SAVE in the ID field in the Properties tab.

10. To indicate the action to take for a successful save, right-click the ⬚ (ELSE) icon to the right of the SUCCESS output icon, select Next Step and then select END from the menu. An ⊗ icon displays to the right of the ELSE icon. This indicates that if users successfully save the data, the process ends.

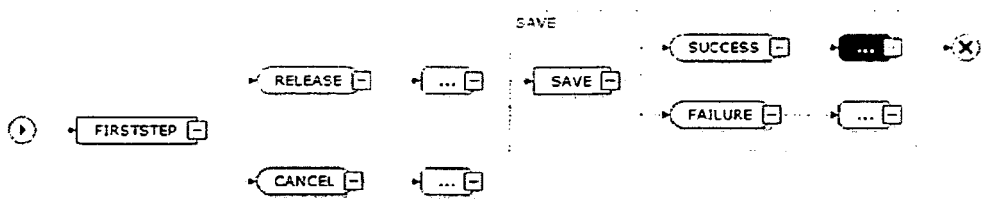

11. Next, indicate the action to take for an unsuccessful save. Right-click the ⌊...⌉ (ELSE) icon to the right of the FAILURE output icon, select Next Step and then select FIRSTSTEP from the menu. A ① icon now displays on the FIRSTSTEP icon and to the right of the ELSE icon. This indicates that if the data is not successfully saved, users are returned to the first step, where they can repeat the process.

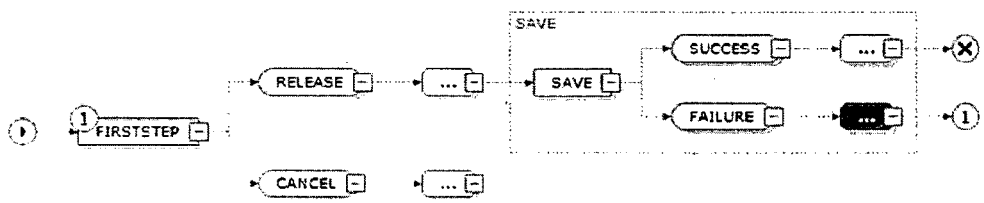

12. Now you will indicate the action to take if users cancel the process. Right-click the ⌊...⌉ (ELSE) icon to the right of the CANCEL output icon, select Next Step and then select END from the menu. An ⓧ icon displays to the right of the ELSE icon. This indicates that if users choose to cancel out of the process, the process ends.

13. The diagram should now display as follows.

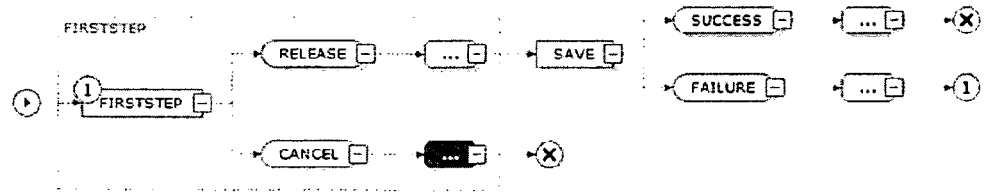

Choose the Save button in the upper right corner to save this information and return to the Start Page.

Next you will configure a Folder Type process.

1.1.7 Configure a Folder Type Process

Next you will configure a Folder Type process that creates a work flow for the Folder Type object.

1. In the Exemplary IDE Start Page, right-click Process and select Add New Process Item.

2. In the Add New Process window, enter FolderTypeProcess and choose OK. The Process Designer displays.

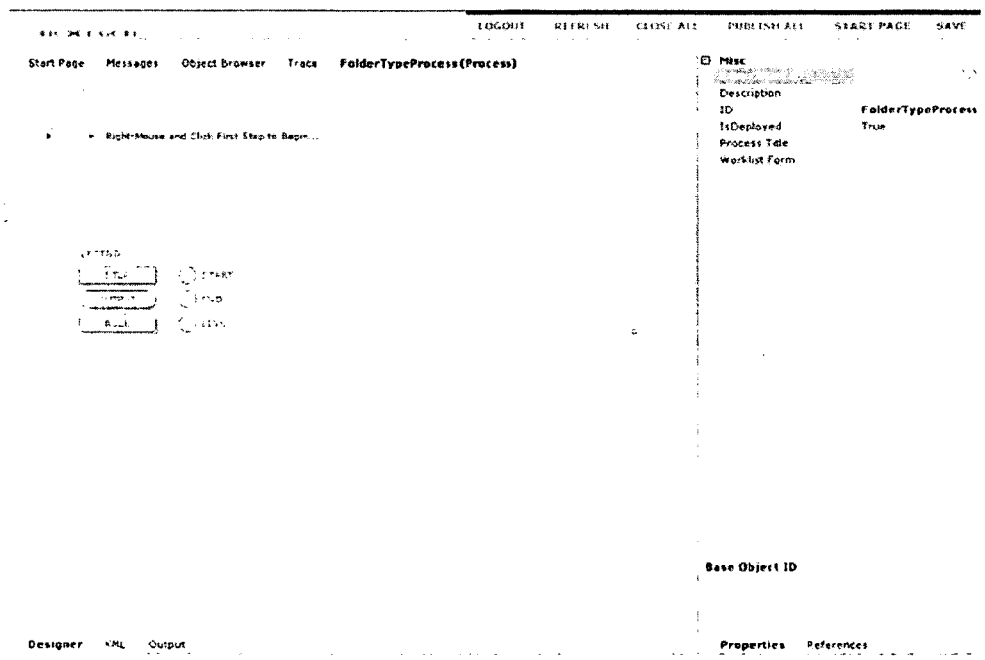

3. Enter the following information in the Properties tab:

- Click in the Base Object ID field and choose the ... button. From the Select Item window, select FolderTypeObj. This indicates that the Folder Type object is the base object associated with this process.

- In both the Description and Process Title fields, enter Folder Type Process.

- Click in the Worklist Form field and choose the ... button. From the Select Item window, select FolderTypeWorklist. This indicates that the Folder Type worklist is the form associated with this process.

4. In the Designer tab, right-click ⊙ ▸ Right-Mouse and Click First Step to Begin... and select First Step.

5. A menu displays the FolderTypePage, which is the page associated with the Folder Type object. Select FolderTypePage.

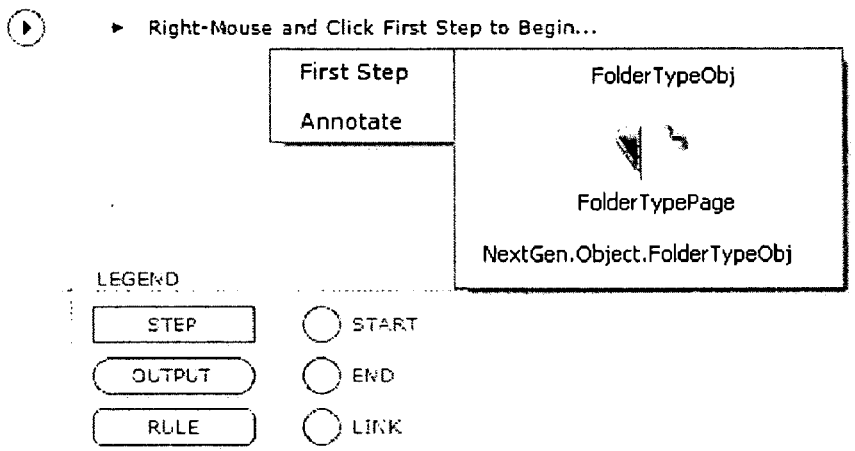

6. The FIRSTSTEP step icon displays. Right-click it and select New Output>Release - Cancel. The Release and Cancel output icons display.

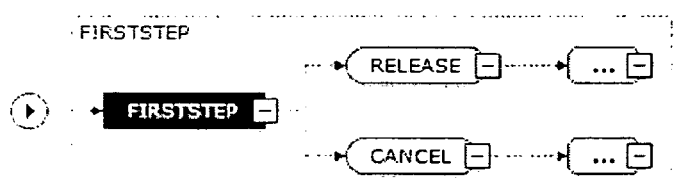

7. Right-click the ⊡ (ELSE) icon to the right of the RELEASE output icon and select Next Step.

8. From the menu, you can select one of the following: an existing step (either END to end the process or FIRSTSTEP to return to the first step);

FolderTypePage, which is the page of the base object (FolderTypeObj) associated with this process; or Save to save the information users have entered. Select Save.

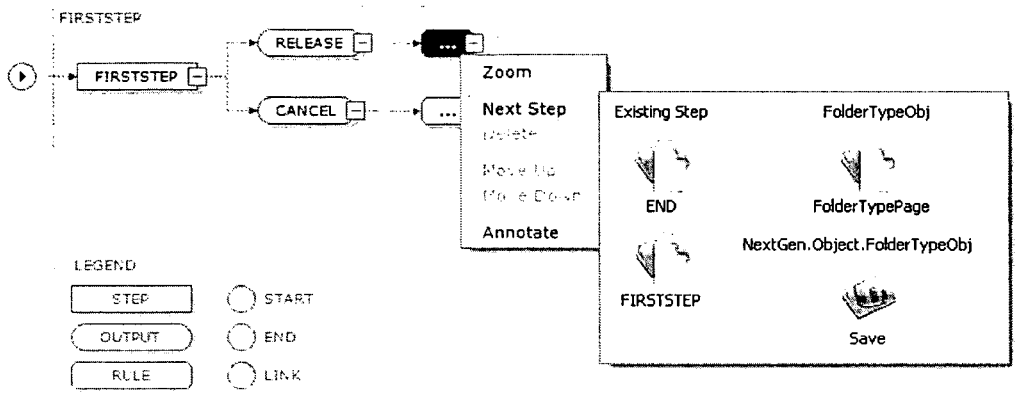

9. The remaining steps are identical to steps 9-13 for configuring a Folder process.

When you are finished configuring the Folder Type process, configure a Timekeeper process.

1.1.8 Configure a Timekeeper Process

Finally you will configure a Timekeeper process that creates a work flow for the Timekeeper object.

1. In the Exemplary IDE Start Page, right-click Process and select Add New Process Item.

2. In the Add New Process window, enter TimekeeperProcess and choose OK. The Process Designer displays.

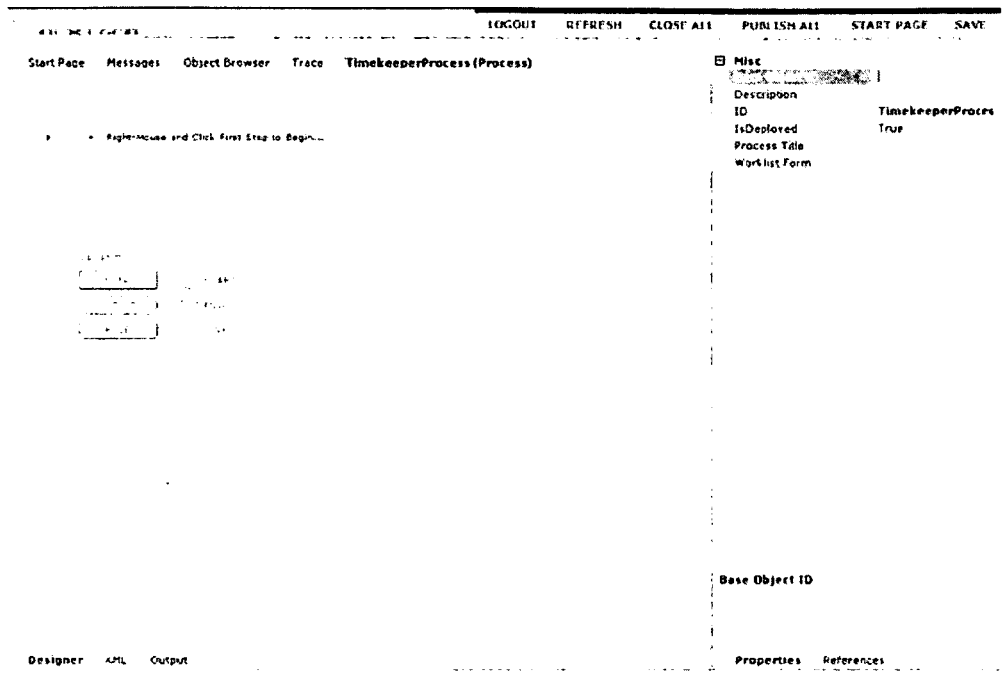

3. Enter the following information in the Properties tab:

- Click in the Base Object ID field and choose the ... button. From the Select Item window, select TimekeeperObj. This indicates that the Timekeeper object is the base object associated with this process.

- In both the Description and Process Title fields, enter Timekeeper Process.

- Click in the Worklist Form field and choose the ... button. From the Select Item window, select TimekeeperWorklist. This indicates that the Timekeeper worklist is the form associated with this process.

4. In the Designer tab, right-click

 ► Right-Mouse and Click First Step to Begin... and select First Step.

5. A menu displays the TimekeeperPage, which is the page associated with the Timekeeper object. Select TimekeeperPage.

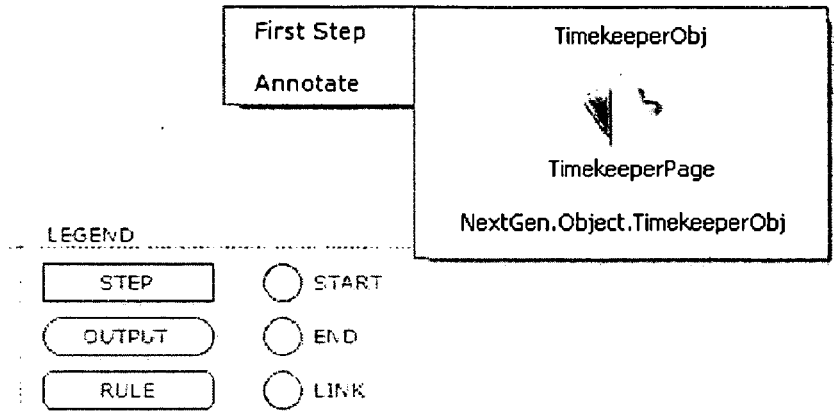

6. The FIRSTSTEP step icon displays. Right-click it and select New Output>Release - Cancel. The Release and Cancel output icons display.

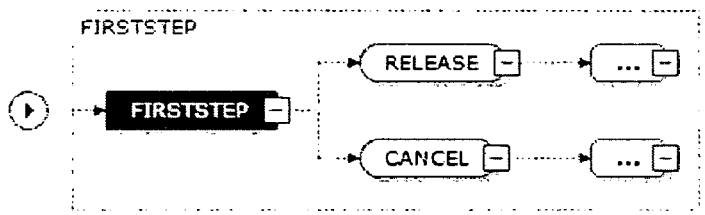

7. Right-click the ⌐⋯⌐ (ELSE) icon to the right of the RELEASE output icon and select Next Step.

8. From the menu, you can select one of the following: an existing step (either END to end the process or FIRSTSTEP to return to the first step); FolderTypePage, which is the page of the base object (FolderTypeObj) associated with this process; or Save to save the information users have entered. Select Save.

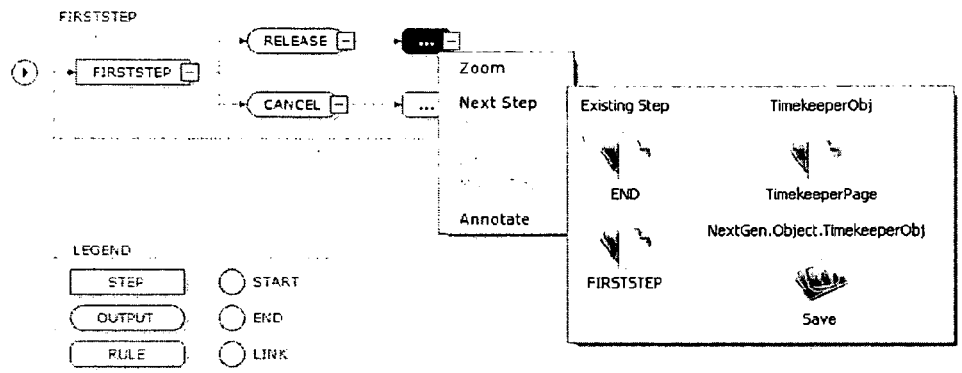
9. The remaining steps are identical to steps 9-13 for configuring a Folder process.

Appendix: Exemplary Designer Interface User Guide

Overview

The Exemplary Designer Interface is an integrated development environment that enables Thomson Elite developers to develop the Exemplary Product Suite's "out-of-the-box" functionality. It provides the ability to create projects to organize developers' work and move between Designers from a central Start Page. The Designer Interface supports two modes: an internal Thomson Elite developer and an external developer or knowledgeable IT professional to customize existing Thomson Elite archetypes, objects, pages and processes to support custom functionality.

The Exemplary Designer Interface is composed of the following designers, which can all be accessed from the Start Page:

- Archetype Designer – The first step in building an application, the Archetype Designer is where a significant portion of the application is designed. Archetypes are created by defining their attributes, lookup capabilities, indexes and Quick Find definitions.

- Object Designer – This is the second step in building an application. It is where business objects are created and all application logic/code is written. An object determines the functionality of the applications in which it is used.

- Form Designer – This designer is used to create work lists, standard forms and grids. It allows a visual interface to be created for the object.

- Page Designer – This is where pages, which can contain multiple forms, are designed. Different views can be defined for each object on the page: for example, a standard form and a grid "view" could be created to display a client's address records.

- Process Designer – This is the final step in creating an application. It is where application workflows are created: for example, a sign-off could be required on expense reports that exceed a specified amount.

- Business Object Designer – Develop code that can be reused by other objects in the system.

- Message Designer

Exemplary IDE Start Page

The Exemplary IDE Start Page is the starting point of Exemplary application development. It is where users can pull existing objects, such as forms and pages, into a project or can find individual objects using the Find pane.

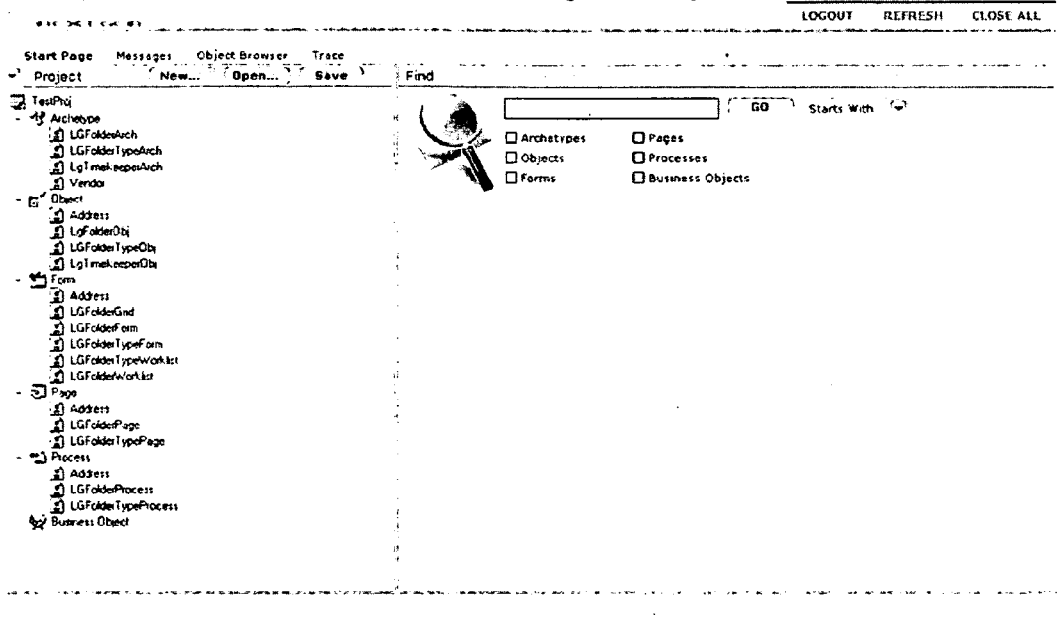

The Start Page includes the following buttons, tabs and sections:

- LOGOUT, REFRESH, CLOSE ALL, Arrow and X buttons
- Start Page, Messages, Object Browser and Trace tabs
- Project tree
- FInd pane
- Status pane 1.2 Buttons

The LOGOUT, REFRESH and CLOSE ALL buttons display on the upper right side of the Start Page.

- LOGOUT – Exit Exemplary. If you have made any changes, you will be prompted to save them.
- REFRESH – Refresh the current page view.
- CLOSE ALL – Close all open designers.

The ◁▷ and × buttons display on the upper right side of the Start Page, below the CLOSE ALL button.

- ◁▷– Click the left arrow to display the previous page, or the right arrow to display the next page.

- ×– Click this button to close the current page or designer.

1.3 Tabs

The Start Page, Messages, Object Browser and Trace tabs display on the upper left side of the Start Page when you first access this page.
After you access other designers, the item name followed by the designer name in parentheses displays in a tab so you can quickly access it from another designer: for example, Address (Object).

- Start Page – Return to the Start Page.
- Messages – Display the Message Designer.
- Object Browser – Display the Object Browser.
- Trace –
- Project Tree The Project tree on the left side of the Start Page displays the project in a tree format. Objects can be dragged from the Find pane and dropped into the Project browser. Refer to Displaying Items in the Project Tree for further information.

1.4 Object Browser

The Object Browser allows users to provide criteria and search for existing objects (archetypes, objects, business objects, pages and processes). Objects matching the entered criteria can be dragged to the Project browser. Refer to Searching for Items in the Find Pane for further information.

1.5 Status Pane

The status and activity of objects within the Exemplary IDE display in this read-only pane at the bottom of the Start Page. Any source code exceptions also display. For example:

Loading Project Vendors
    Project load complete

- To copy the displayed status, right-click and select Copy.
- To delete any displayed information, right-click and select Clear All.

1.6 Displaying Items in the Project Tree

The Project browser on the left side of the Start Page displays the current project and all the objects it contains in a tree format. The objects that display are organized by the designer in which they were created or added (Archetype, Object, Form, etc.).

Objects can be dragged from the Find pane and dropped into the Project browser. Refer to Searching for Items in the Find Pane for more information.

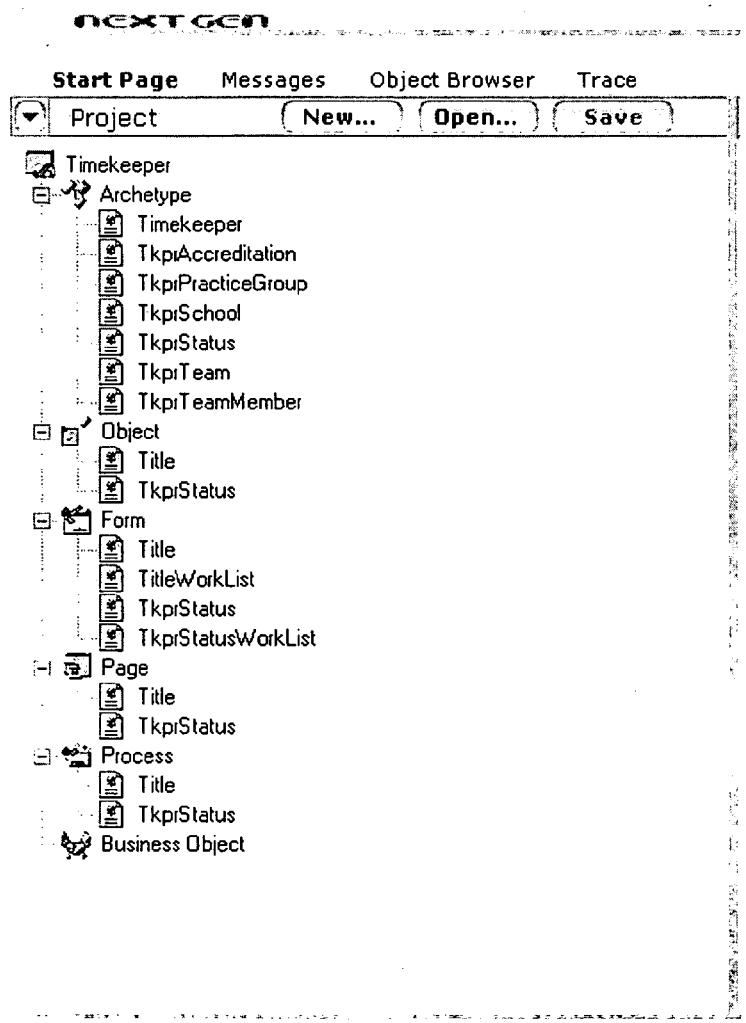

1.6.1 Project Tree Buttons

The following buttons display in the Project tree title bar:

-  Display a drop-down list of the six most recently opened projects. To open a project in the list, double-click it.

- New... – Create a new project. Refer to Adding a New Project for further information.

- Open... – Open an existing project. Refer to Opening an Existing Project for further information.

- Save – Save any changes made to the project.

1.6.2 Expanding and Collapsing the Project Tree

To expand the Project tree to display all the project's components, double-click the project name or right-click the name and select Expand All Nodes. Refer to Project Menu for further information.

To collapse the tree so that only the project name displays, double-click the project name or right-click the name and select Collapse All Nodes. Refer to Project Menu for further information.

To display all objects contained in a designer, click ⊟ to the left of the designer name. To collapse the tree to display only the designer name, click ⊟.

If necessary, use the scroll bar to the right to display more items.

1.7 Right-Click Menu Options

Various actions can be accessed by right-clicking a project, designer or item displayed in the Project tree in the Exemplary IDE Start Page.

1.7.1 Project Menu

The following menu options display when you right-click the current project in the Project tree.

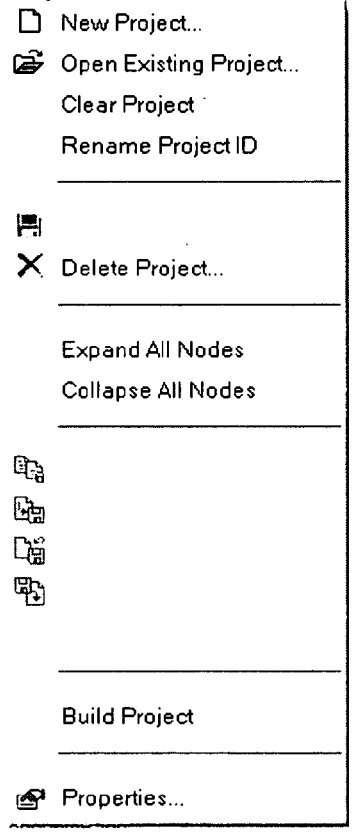

- New Project – Create a new project. You can also choose the New button to create a new project. Refer to Adding a New Project for further information.

- Open Existing Project – Open an existing project. You can also choose the Open button to open a project. Refer to Opening an Existing Project for further information.

- Clear Project – Removes all the objects that were added to the project. The objects are not deleted from the system.

- Rename Project ID – Rename the project.

- Save - Save the changes made to any objects in the project.

- Delete Project – Delete the current project and all the objects created or included in the project.

- Expand All Nodes – Expand the entire project tree to display all designers and the objects they contain. You can also double-click the project name to expand the tree.

- Collapse All Nodes – Collapse the entire project tree so only the project name displays. You can also double-click the project name to collapse the tree.

- Build Project – Build the associated system files by using the XML for each object in the project.

- Properties – Display information about the project, including its ID, type, source control status, etc.

The following options are only accessible if Exemplary is integrated with a document management system.

- Get Latest – Access the latest versions of all the corresponding items (archetypes, objects, forms, etc.) included in the project that is currently open from the integrated document management system.

- Check Out – Check out all the corresponding items included in the project that is currently open from the document management system to your workstation.

- Check In – Check in all the corresponding items included in the project that is currently open from your workstation to the document management system.

- Undo Check Out – Undoes the last check out action of corresponding items in the project that is currently open.

- Show Out-of-Sync Items

1.7.2 Designer Menu

Menu options similar to the following display when you right-click a designer (Archetype, Object, etc.) in the Project tree. The following example is for the Object Designer.

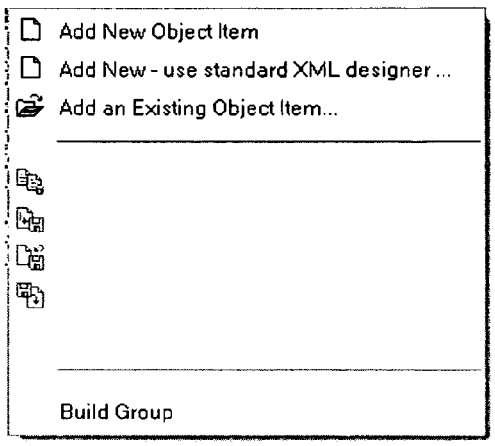

For further information about adding new or existing items, refer to the appropriate designer section in this guide.

- **Add New *Designer* Item** – Add a new item to the selected designer (Archetype, Object, etc.). The Add New *Designer* window displays, where *Designer* indicates the selected designer (for example, Add New Object Item).

- Add New - use standard XML designer – The Add New *Designer* window displays, where *Designer* indicates the selected designer.

- **Add an Existing *Designer* Item** – Add an item that already exists in Exemplary to the project. The Select Item window displays, from which you can select the item.

- Build Group – Build system files from the XML definitions listed for the corresponding designer. For example, selecting this option for an archetype item would take the XML definitions listed as archetypes in the Archetype Designer and build their associated system files.

The Get Latest, Check Out, Check In, Undo Check Out and Show Out-of-Sync Items options are only accessible if Exemplary is integrated with a document management system. Refer to Project Menu for definitions of these options.

1.7.3  Item Menu

Menu options similar to the following display when you right-click an item listed under a designer (Archetype, Object, etc.) in the Project tree. The following example is for an Object item.

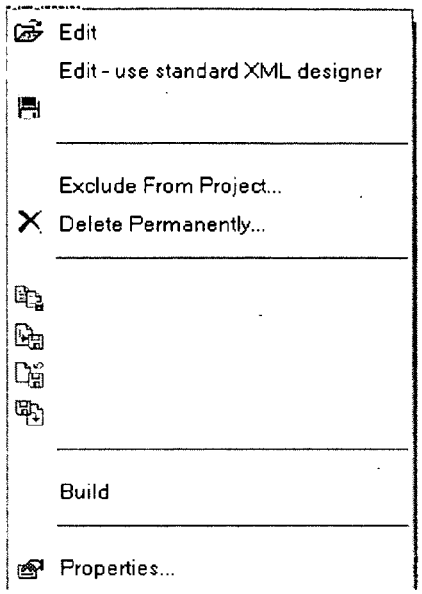

For further information about editing items, refer to the appropriate designer section in this guide.

- Edit – Edit the selected item. The associated designer window displays.

- Edit - use standard XML designer

- Exclude From Project – Delete the selected item from the project, but not from the system. The Start Page is refreshed so the selected item no longer displays.

- Delete Permanently – Delete the selected item from the system as well as the project.

- Build – Build system files from the XML definitions listed for the corresponding designer.

- Properties – Display information about the selected item, including its ID, type, source control status, etc.

The Get Latest, Check Out, Check In, Undo Check Out and Show Out-of-Sync Items options are only accessible if Exemplary is integrated with a document management system. Refer to Project Menu for definitions of these options.

1.8 Searching for Items in the Find Pane

The Find pane allows users to provide criteria and search for existing objects (archetypes, objects, business objects, pages and processes).

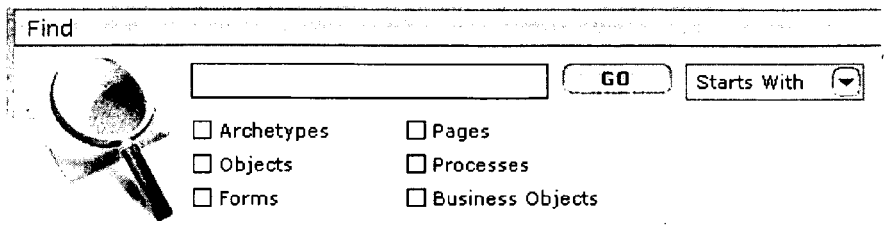

To find an object, do the following:

1. Enter the criteria in the Search Criteria field.

2. Optionally, select one of the following options from the drop-down list box:

- Starts With – Search for objects beginning with the entered character(s).

- Contains – Search for objects including the entered characters.

- Exact Match – Search for objects that exactly match the entered characters.

3. Select any of the check boxes to indicate the types of objects you are looking for. If you do not select any check boxes, all types of objects are searched for.

4. Choose GO to start the search.

5. The Find pane is refreshed and displays any objects matching your criteria. The matching objects are grouped by type: For example, all archetype objects display under Archetype.

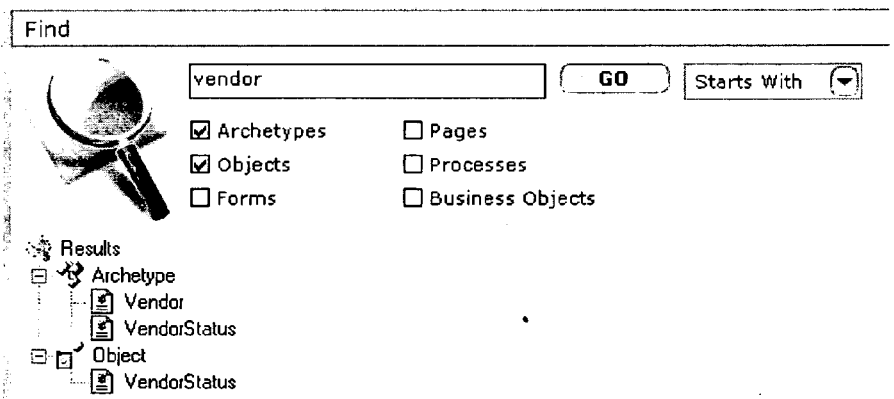

6. To add an object to the project, drag it from the Find pane to the appropriate location in the Project tree. Refer to Displaying Items in the Project Tree for more information.

1.9 Adding a New Project

In the Exemplary Designer Interface, a project is a way of grouping objects.
To add a new project, do the following:

1. In the Start Page, choose the New... button.

- If you have made any changes to a project that is currently open, you are prompted to save the changes.

2. The Add New Project dialog box displays. Enter a name for the project in the Item ID field. The name cannot contain any spaces. Choose OK, or choose Cancel to close this dialog box without adding a new project.

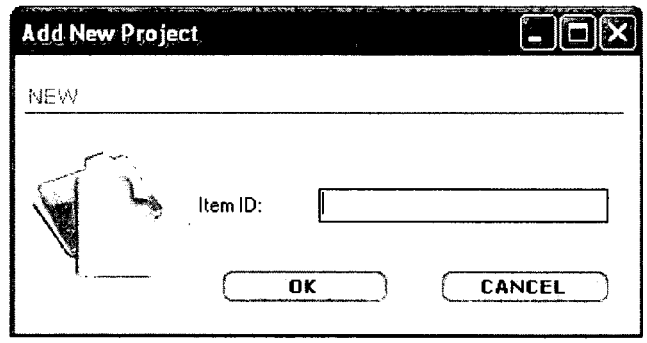

3. The new project displays in the Project tree of the Start Page.

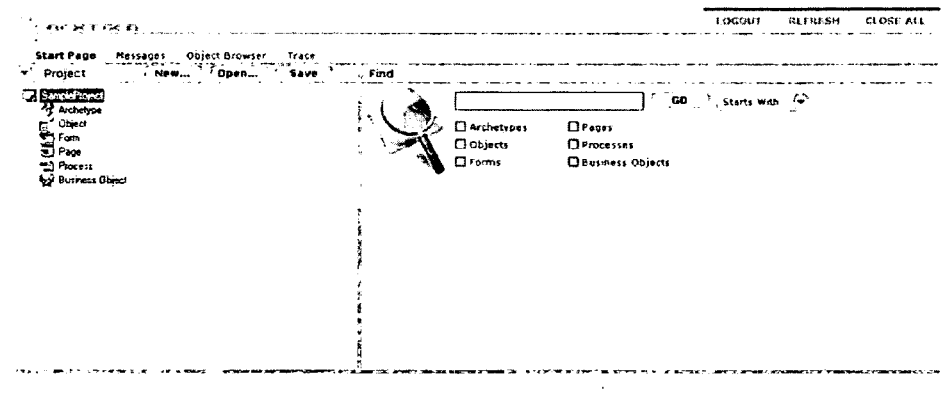

To begin creating an application, refer to Archetype Designer.

1.10 Opening an Existing Project

To open an existing project, do the following:

1. In the Start Page, choose the Open... button.

- If you have made any changes to a project that is currently open, you will be prompted to save the changes.

2. The Select Item dialog box displays. Enter the first few letters of the project name in the Find field, or use the scroll bar to locate an existing project.

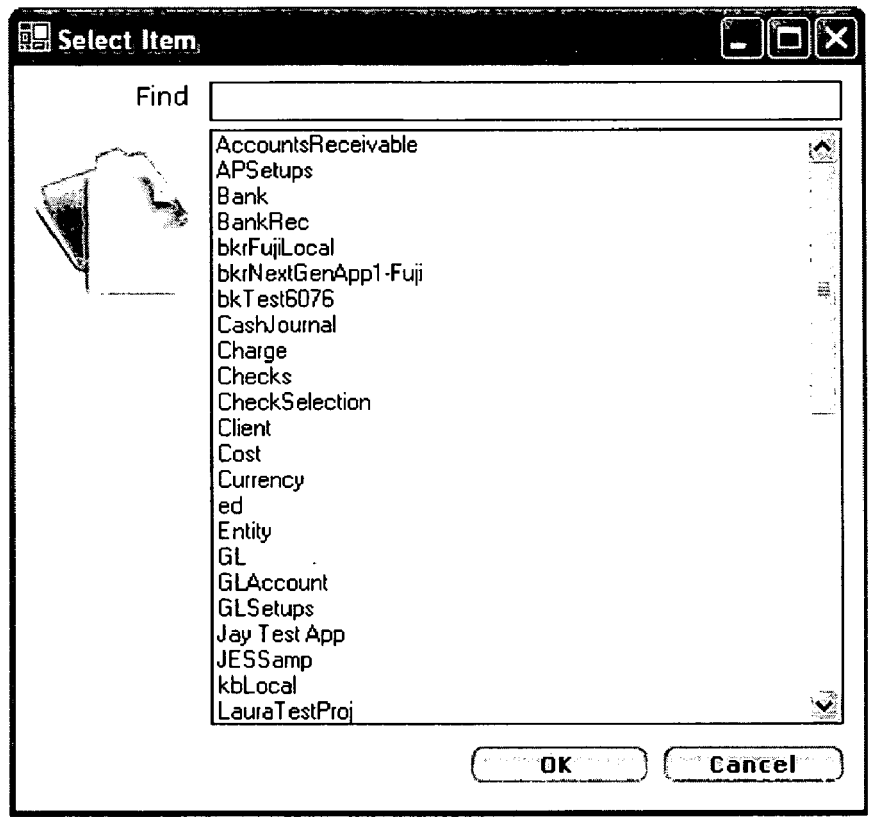

Click the project and choose OK, or choose Cancel to close this dialog box without opening an existing project.

3. The selected project and its associated archetypes, objects, forms, pages, processes and business objects display in the Project tree of the Start Page.

Archetype Designer Overview

The Archetype Designer is the first step in building a Exemplary application. This designer allows tables to be created by defining their attributes, lookup capabilities, indexes and Quick Find definitions. For example, an archetype can be defined as a big list (query) or small list (drop-down list box). The attributes to be indexed can be determined and the default attributes to display as a result of the Query definition can be selected.

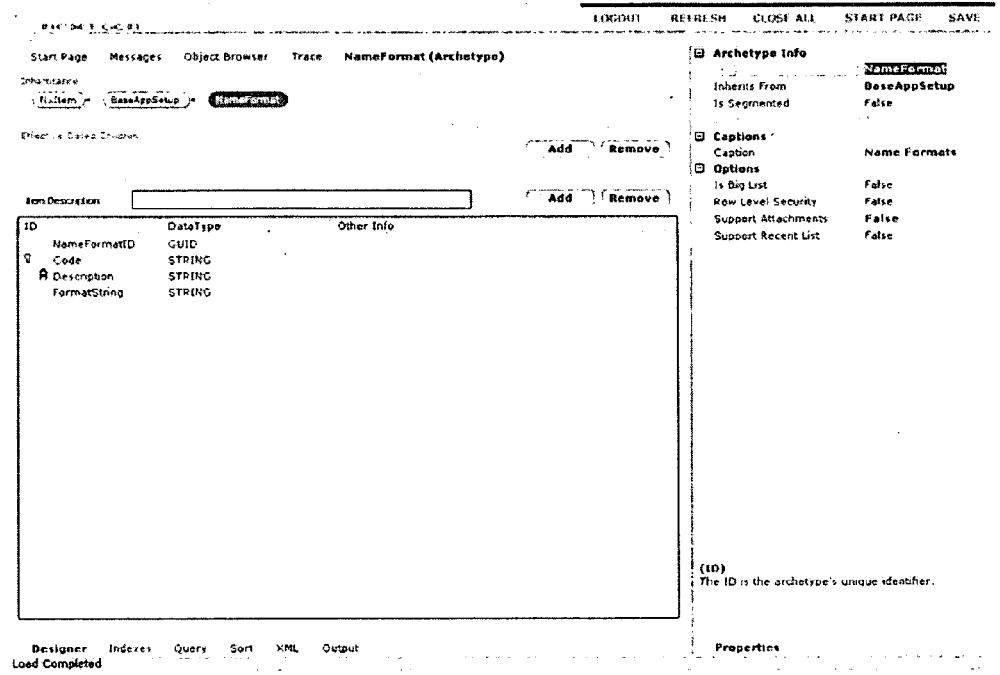

The Archetype Designer includes the following sections:

- Inheritance pane – Displays the child archetype and its parent archetypes. Refer to Inheritance Pane for further information.

- Item Description

- Designer tab – Design and define an archetype. Refer to Working with Archetypes for further information.

- Indexes tab – Create additional indexes for the archetype. Refer to Creating Additional Indexes for an Archetype for further information.

- Query tab – Define the query to be used any time the archetype is used, looked up or queried. Refer to Adding a Query to an Archetype for further information.

- XML tab – Displays the XML code generated from the Archetype Designer. Refer to XML tab for further information.

- Output tab – Displays any error or generated code resulting from selecting the SAVE option. Refer to Output tab for further information.

- Properties tab – Displays the properties associated with the selected archetype and its attributes. Refer to Archetype Properties Field Definitions for further information.

1.11 Accessing the Archetype Designer

The Archetype Designer can be accessed by performing one of the following actions from the Project browser in the Exemplary IDE Start Page:

- Double-click an archetype listed under Archetype.

- Right-click a listed archetype and select Edit.

- Right-click Archetype and select either Add New Archetype Item or Add New – use standard XML designer. The Archetype Designer displays after you enter a name for the new archetype in the Add New Archetype dialog box (refer to Adding a New Archetype for further information).

- Right-click Archetype and select Add an Existing Archetype Item. The Archetype Designer displays after you select the archetype from Select Item dialog box (refer to Adding an Existing Archetype for further information).

Once you have accessed the Archetype Designer and then open another designer, you can return to it by clicking the *Archetype Name* (Archetype) tab at the top left of the Exemplary window.

1.12 Inheritance Pane

The Inheritance pane at the top of the Archetype Designer displays a diagram representing the relationship of the archetype to its parent archetypes.

INHERITANCE

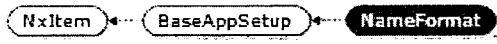

To modify the archetype's properties, click the archetype in the inheritance diagram. The archetype's properties display in the Properties tab. Refer to Archetype Properties Field Definitions for more information.

1.13 Item Description

The Item Description area in the Archetype Designer displays a text box in which you can add or remove information about the item.

1.14 Working with Archetypes

An archetype can be created by defining its attributes, lookup capabilities, indexes and Quick Find definitions.

1.14.1 Adding a New Archetype

To add a new archetype to the project, do the following.

Note: To add a new archetype using the standard XML designer, refer to Adding a New Archetype using the XML Designer.

1. In the Project tree in the Exemplary IDE Start Page, right-click Archetype and select Add New Archetype Item.

2. The Add New Archetype dialog box displays. Enter a name for the archetype in the Item ID field and then choose OK, or choose Cancel to close this dialog box without creating a new archetype.

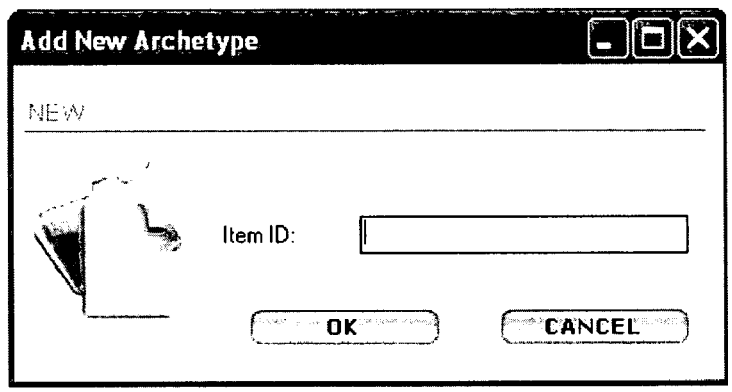

3. The new archetype displays in the Archetype Designer.

- Refer to Archetype Properties Field Definitions for information about the fields in the Properties tab.

- For information about the archetype's primary key attribute, key attribute and alias attribute, refer to Types of Attributes.

- To add attributes to the archetype, refer to Working with Attribute Archetypes.

4. Click SAVE in the upper right corner of the Archetype Designer to save the new archetype.

1.14.2 Adding a New Archetype using the XML Designer

To add a new archetype to the project using the standard XML designer, do the following.

1. From the Project tree in the Exemplary IDE Start Page, right-click Archetype and select Add New – use standard XML designer.

2. The Add New Archetype dialog box displays. Enter a name for the archetype in the Item ID field and then choose OK, or choose Cancel to close this dialog box without creating a new archetype.

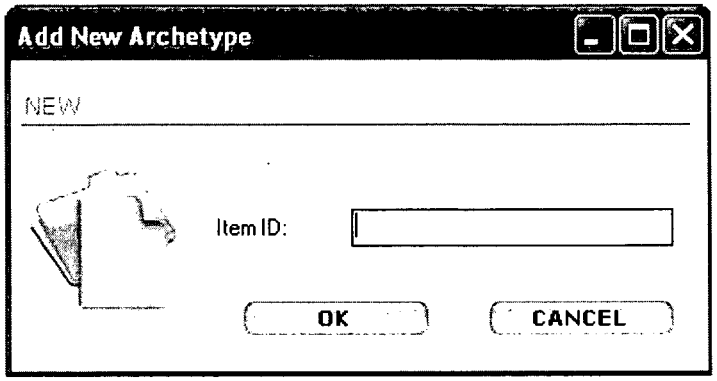

3. The new archetype displays in the Archetype Designer.

- Refer to Archetype Properties Field Definitions for information about the fields in the Properties tab.

- For information about the archetype's primary key attribute, key attribute and alias attribute, refer to Types of Attributes.

- To add attributes to the archetype, refer to Working with Attribute Archetypes.

4. Click SAVE in the upper right corner of the Archetype Designer to save the new archetype.

1.14.3  Adding an Existing Archetype

To add an existing archetype to the project, do the following.

1. From the Project tree in the Exemplary IDE Start Page, right-click Archetype and select Add an Existing Archetype Item.

2. The Select Item dialog box displays.

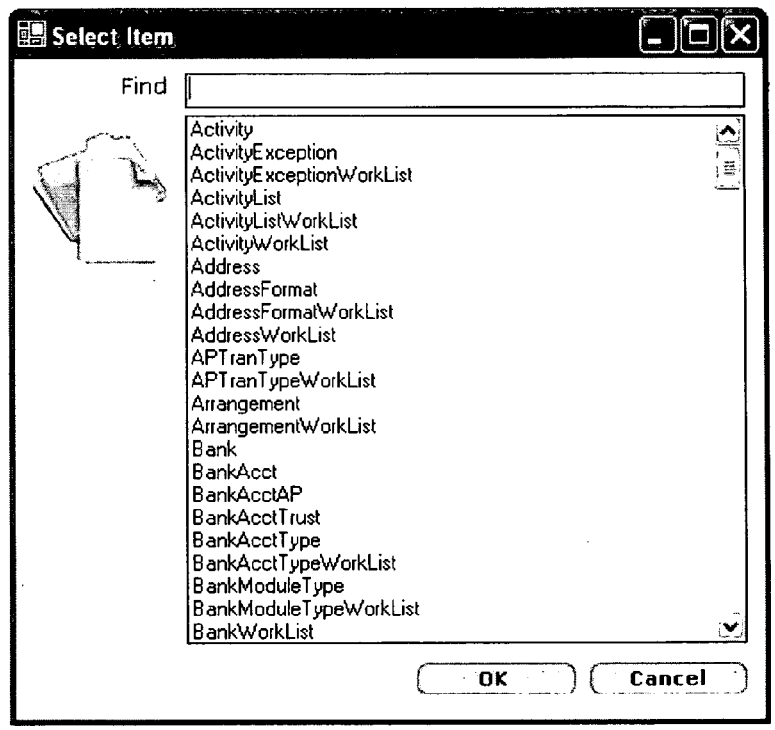

Enter the first few letters of the archetype name in the Find field, or use the scroll bar to locate the existing archetype.

3. Select the archetype and choose OK, or choose Cancel to close this dialog box without adding an existing archetype.

4. The selected archetype and its associated attributes display in the Archetype Designer.

- Refer to Types of Attributes for information about the archetype's primary key attribute, key attribute and alias attribute.

- To add attributes to the archetype, refer to Working with Attribute Archetypes.

5. Click SAVE in the upper right corner of the Archetype Designer to save the archetype.

1.14.4   Working with Archetype Attributes

Once you add an archetype to a project, you can add attributes, indexes and queries to it in the Designer tab of the Archetype Designer.

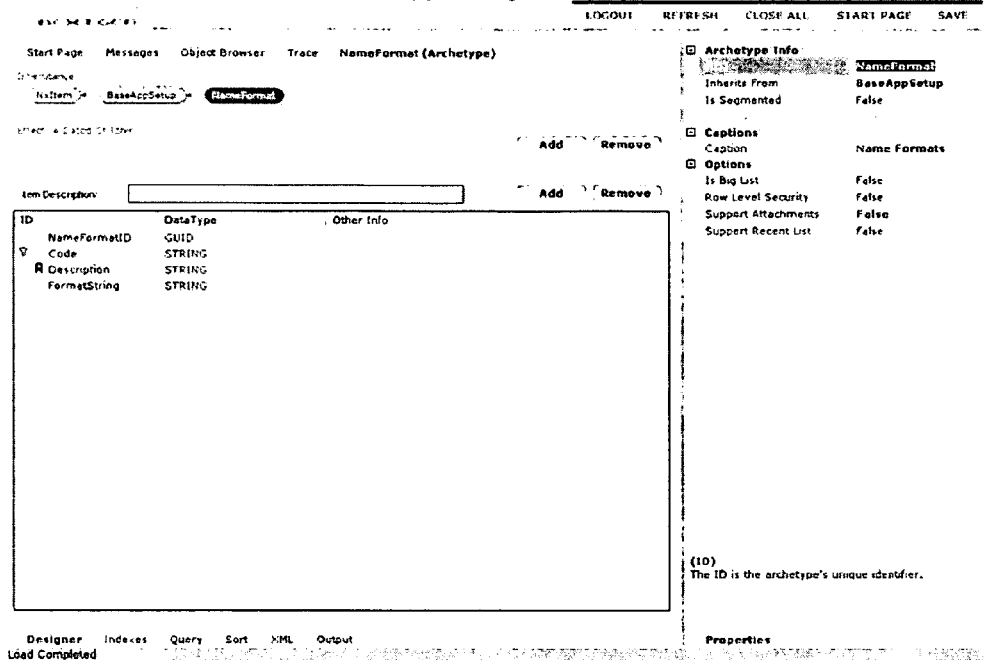

The Designer tab displays when you first access the Archetype Designer (refer to Accessing the Archetype Designer). From this tab, you can design and define an archetype.

Refer to Types of Attributes for information about the archetype's primary key attribute, key attribute and alias attribute.

The following options are available by right-clicking a displayed attribute:

- Set Key Attribute – Set the selected attribute as the archetype's key attribute. The Designer tab is refreshed to display the new assignment. A unique index is automatically created for the key attribute; this index does not display.

- Toggle Alias Attribute – Set the selected attribute as the archetype's alias attribute. The page is refreshed to display the new assignment.

- Add Attribute – Add an attribute to the archetype. The new attribute displays at the bottom of the list. Refer to Adding an Attribute to an Archetype for further information.

- Insert Attribute – Insert an attribute in the archetype. The attribute displays after the insertion point. Refer to Adding an Attribute to an Archetype for further information.

- Remove Attribute – Delete an attribute from the archetype. Refer to Removing an Attribute from an Archetype for further information.

*1.14.4.1  Types of Attributes*

In addition to regular attributes, the following three types of attributes display in the Designer tab of the Archetype Designer:

- Default Primary Key Attribute: Every archetype has a system-assigned default primary key attribute. This attribute is used to look up or join the designated data type. Its name is the archetype's name followed by "ID." For example, the default primary key attribute for the archetype SampleArchetype would be named SampleArchetypeID. You can set the archetype's primary key to another attribute by right-clicking an attribute and selecting Set Key Attribute.

Note: The default primary key attribute's properties cannot be edited.

- Key Attribute: The ⁊ (key attribute) icon displays to the left of the attribute if it is the primary key. Any time this archetype is designated as a relationship from another archetype (i.e., a join to this archetype), the system joins on the primary key designated at the destination archetype.

- Alias Attribute: The A (alias attribute) icon displays to the left of the attribute if it is the alias attribute. The alias attribute displays to users instead of the data's unique identifier. The system manages data (saves, edits, etc.) internally using the key attribute, but the user interacts with the data through the alias attribute.

*1.14.4.2  Adding an Attribute to an Archetype*

To add an attribute to an archetype, do the following.

1. Display the Archetype Designer as described in Access the Archetype Designer.

2. Do one of the following:

- To add the attribute at the end of any listed attributes in the Designer tab, right-click an attribute and select Add Attribute, or press CTRL-N. The new attribute displays at the bottom of the list.

- To insert the attribute directly below any listed attribute, right-click the attribute above the insertion point and select Insert Attribute, or press CTRL-I. The new attribute displays below the selected attribute.

3. The new attribute is named **NewAttribute*n***, where *n* indicates the number of the attribute. In the Properties tab, enter a unique identifier for the attribute in the ID field, and other information about the attribute as necessary. Refer to Attribute Properties Field Definitions for more information.

4. Click SAVE in the upper right corner of the Archetype Designer to save the new attribute.

*1.14.4.3  Removing an Attribute from an Archetype*

To remove an attribute from an archetype, do the following.

1. Display the Archetype Designer as described in Access the Archetype Designer.

2. Right-click an attribute in the Designer tab and select Remove Attribute, or press DELETE.

*1.14.4.4  Attribute Properties Field Definitions*

Select an attribute in the Designer tab of the Archetype Designer and then enter or modify the fields in the Properties tab as defined below.
Refer to Working with Archetype Attributes for further information.

Note: The default primary key attribute's properties cannot be modified.

| Field Name | Description |
|---|---|
| *Attribute Info* | |
| (ID) | Enter a unique identifier for the attribute. When an attribute is first added, the name displays as **NewAttribute*n***, where *n* indicates a number that increments as many times as necessary to uniquely identify each new attribute. |
| Access Type | This field indicates the access level for this attribute and whether the attribute requires a value. |
| | Click in this field and select one of the following options from the drop-down list box:<br>• Required – The attribute is required to have a value. The attribute name displays with an asterisk (*) to indicate a value is required.<br>• Full – The attribute can be accessed by all users. This is the default value.<br>• ReadOnly – The attribute can only be modified by framework-initiated actions. This access type is used for calculated fields such as the archetype description and time stamp. This access type is typically driven by the framework and should not be used to disable controls, but if it is selected, its associated control must be rendered as a disabled control. |

| Field Name | Description |
|---|---|
| Data Type | This field stores the attribute's data type. |
| | Click in this field and select one of the following data types from the drop-down list box. The default value is STRING.<br>AUTONUMBER    INTEGER<br>BOOLEAN    MONEY<br>CURRENCY    MULTILANGUAGE<br>CODE<br>DATE    NARRATIVE<br>DATETIME    RELATIONSHIP<br>DECIMAL    STRING<br>EMAIL    URL<br>GUID |
| Is Stock | This field indicates whether the attribute was created internally by Thomson Elite and thus cannot be edited by external users. If the user is logged in as an internal Thomson Elite user, the default value is True; otherwise, the default value is False. This field is read only and cannot be modified. |
| *Captions* | |
| Caption | Enter the name of the attribute. This name displays wherever the attribute displays in the Exemplary Designer Interface. It is also inherited by the object attributes that are created from this archetype. |
| | Note: Although the name is entered in English, it must be assigned and stored with a GUID to support language independence. |
| *Data Type Info* | |
| Conversion Date | Note: This field displays only if MONEY or is selected in the Data Type field. |
| | This property indicates the date when the associated money attribute should be converted. Click in this field and select the conversion date from the drop-down list box. |
| Currency Code | Note: This field displays only if MONEY is selected in the Data Type field. |
| | This property indicates the currency in which the attribute's money value is stored in the database. Click in this field and select the conversion code from the drop-down list box. |

| Field Name | Description |
|---|---|
| Data Precision | Note: This field displays only if DECIMAL or MONEY is selected in the Data Type field.<br><br>Enter the precision (total number of digits) with which the attribute's value is to be stored in the database. The default value is 16. |
| Data Scale | Note: This field displays only if DECIMAL or MONEY is selected in the Data Type field.<br><br>Enter the number of digits to display to the right of the decimal for this attribute. The default value is 2. |
| Default Value | Note: This field does not display if GUID or RELATIONSHIP is selected in the Data Type field.<br><br>Enter the default value for this attribute. |
| Is Multi-Line | Note: This field only displays if STRING is selected in the Data Type field.<br><br>Click in this field and select True from the drop-down list box if this attribute contains multiple line feeds, or select False if it has a single line. The default is False. |
| Is Rounded | Note: This field only displays if MONEY is selected in the Data Type field.<br><br>Click in this field and select True from the drop-down list box if this attribute should be rounded, or select False if it should include decimal places. The default is False. |
| Length | Note: This field displays only if STRING is selected in the Data Type field.<br><br>Enter the maximum length of the attribute. The default value is 64. |
| Support Full Text Searching | Note: This field displays only if NARRATIVE, STRING, SEGMENT or GUID is selected in the Data Type field.<br><br>Click in this field and select True from the drop-down list box if the system must support full-text searching for the attribute. The default is False. |
| Related Archetype | Note: This field displays only if RELATIONSHIP is selected in the Data Type field.<br><br>The related archetype is the destination archetype for the relationship attribute. Enter a unique ID or click the ... |

| Field Name | Description |
|---|---|
| | button to select an existing archetype. |
| Relationship ID | Note: This field displays only if RELATIONSHIP is selected in the Data Type field.<br><br>The relationship ID is used throughout the system to uniquely refer to the current relationship attribute. If the attribute is a relationship attribute, the user must provide a value for this property. |

1.14.5 Creating Additional Indexes for an Archetype

In the Indexes tab of the Archetype Designer, you can create additional indexes for the archetype. Indexes are system-generated for the archetype's following attributes:

- GUID
- Key attribute
- Alias attribute (if one exists)

*1.14.5.1  Accessing the Indexes Tab*

To access the Indexes tab, display the Archetype Designer as described in Accessing the Archetype Designer and then click the Indexes tab.

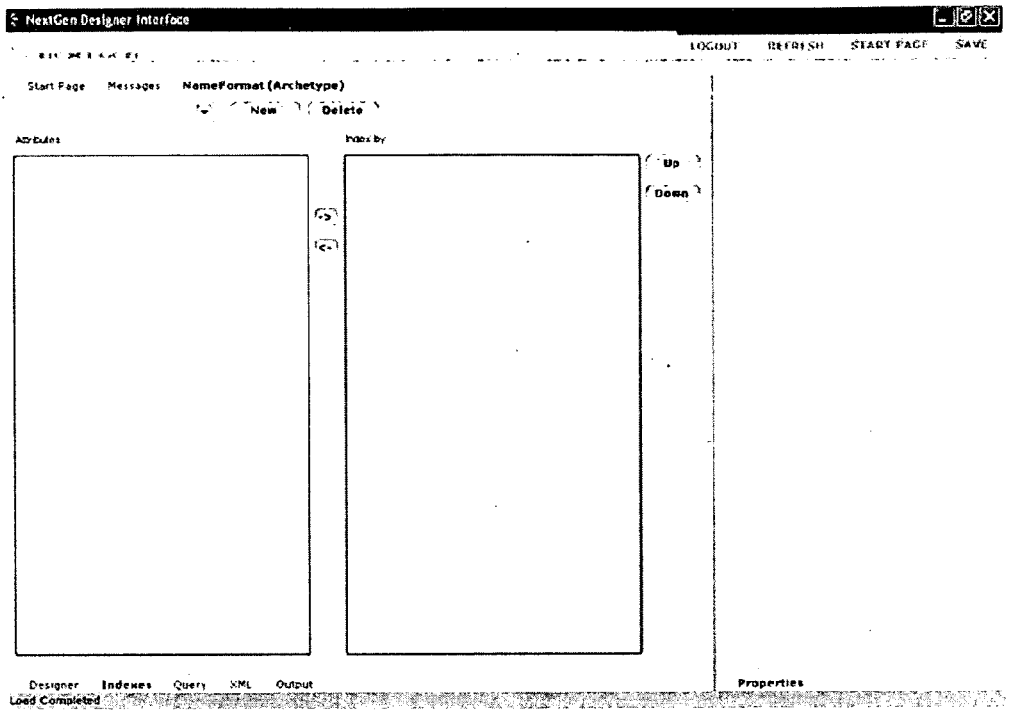

*1.14.5.2 Create an Index for an Archetype*

To create an index for an archetype, do the following.

1. Display the Indexes tab as described in Accessing the Indexes Tab.

2. Choose the New button.

- The system-generated index name displays in the drop-down list box at the top of the tab and in the (ID) field in the Properties tab. The index is named I_ArchetypeNamexn, where ArchetypeName indicates the name of the archetype and *n* indicates the number of the index. For example, I_SampleArchetypex0.

- The available attributes for which indexes can be created display in the Attributes area.

3. In the Properties tab, enter a unique identifier for the index in the (ID) field, and other information about the index as necessary. Refer to Indexes Properties Field Definitions for more information.

4. To include one of the attributes listed in the Attributes area in the index definition, do one of the following:

- Double-click an attribute, or
   - Click an attribute and then click the `->` icon.

The selected attribute now displays in the Index by area.

5. To change the order in which the attributes are indexed, select an attribute in the Index by area and then click the Up or Down button.

6. To remove an attribute from the Index by area, double-click it or click it and then click the  icon.

7. Click SAVE to save the index.

*1.14.5.3   Delete an Index from an Archetype*

To delete an index from an archetype, do the following. System-generated indexes for the GUID, key and alias attributes cannot be deleted.

1. Display the Indexes tab as described in Accessing the Indexes Tab.

2. Select the index to be deleted from the drop-down list box at the top of the tab.

3. Choose the Delete button.

*1.14.5.4   Indexes Properties Field Definitions*

After you create or select an index, enter or modify the fields in the Properties tab of the Archetype Designer as follows.
Refer to Creating Additional Indexes for an Archetype for further information.

| Field Name | Description |
|---|---|
| *Index Info* | |
| (ID) | Enter a unique identifier for the index. When an index is first created, the name displays as I_AttributeNamexn, where *Attribute Name* indicates the name of the attribute and *n* indicates the index number. |
| Is Stock | This property indicates whether the index was created internally by Thomson Elite and thus cannot be edited by external users. If the user is logged in as an internal Thomson Elite user, the default value is True; otherwise, the default value is False. This field is read only and cannot be modified. |
| Is Unique Index | Click in this field and select True from the drop-down list box if all values resulting from combining the attributes in the index must be unique, or select False if they do not. The default is False. |

1.14.6   Adding a Query to an Archetype

In the Query tab of the Archetype Designer, you can define the query to be used any time users use, look up or query the archetype.
The following types of query definitions can be added to an archetype:

- QuickFind Query – A list of an archetype's attributes (with the exception of the alias attribute) the system must search against when a user enters information in the archetype's BigList control.

- QueryAttributes – A list of an archetype's attributes for which users can provide criteria during a query.

- QueryResults – A list of an archetype's attributes that must display by default in the Query Results grid.

- QueryWhere – This definition allows you to define a static (OQL) condition that is applied to the Archetype Query definition.

*1.14.6.1   Accessing the Query Tab*

To access the Query tab, do the following.

1. Display the Archetype Designer as described in Accessing the Archetype Designer and then click the Query tab.

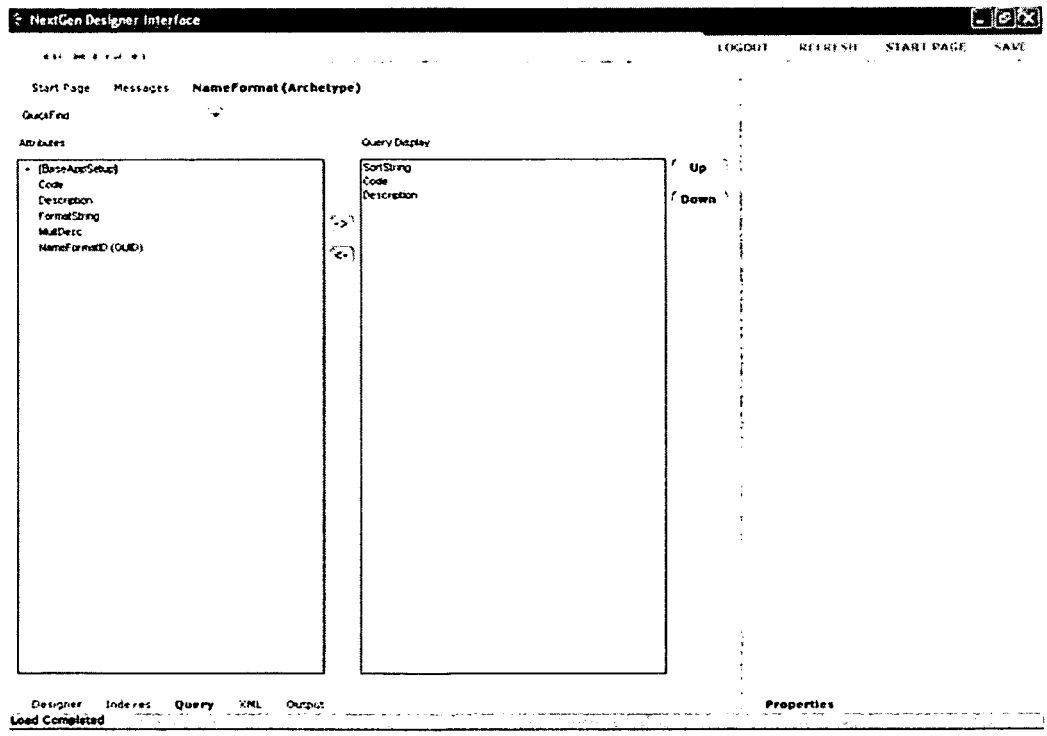

2. From the drop-down list box at the top of the tab, select one of the following options to define the query's characteristics:

- QuickFind – A list of an archetype's attributes (with the exception of the alias attribute) the system must search against when a user enters information in the archetype's BigList control. Refer to Add a QuickFind Query Definition for further information.

- QueryAttributes – This definition is a list of an archetype's attributes for which users can provide criteria during a query. Refer to Add a Query Attributes Definition for further information.

- QueryResults – This definition is a list of an archetype's attributes that must display by default in the Query Results grid. Refer to Add a Query Results Definition for further information.

- Sort – This definition determines the default sort in the Query Results grid by specifying the attributes to sort by and the order in which the selected attributes are to be sorted. Refer to Add a Query Sort Definition for further information.

- QueryWhere – This definition allows you to define a static (OQL) condition that is applied to the Archetype Query definition. Refer to Add a Query Where Definition for further information.

3. Click SAVE to save the query.

*1.14.6.2 Add a QuickFind Query Definition*

A QuickFind Query is a list of an archetype's attributes (with the exception of the alias attribute) that the system must search against when a user enters information in the archetype's BigList control. When users enter any of the attributes, the system searches for all specified attributes.

Note: If an archetype is designated as a BigList (the Is BigList field is set to True in the Properties tab; refer to Archetype Properties Field Definitions for more information), the list of Quick Find attributes must be defined.

To add a QuickFind Query to an archetype, do the following.

1. Display the Query tab as described in Accessing the Query Tab.

2. Select QuickFind from the drop-down list. The Attributes and Query Display boxes display.

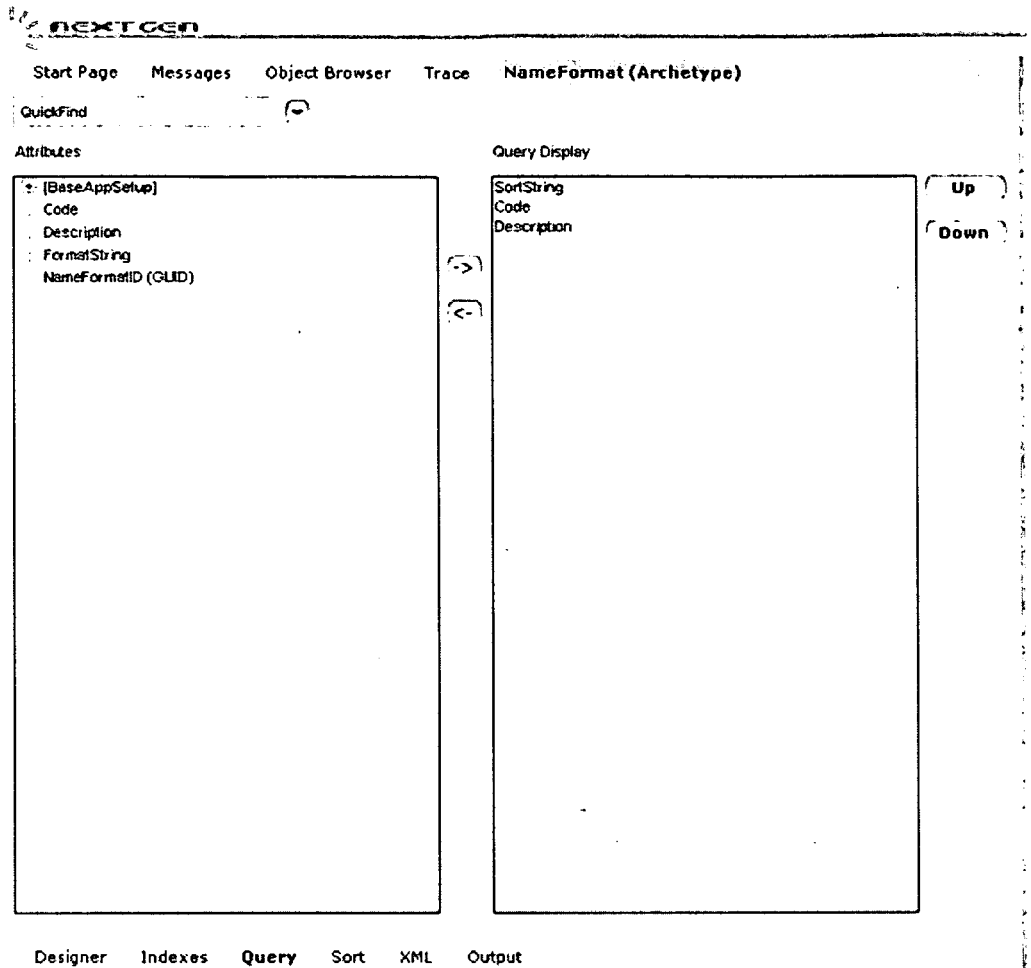

- The Attributes box displays the archetype's defined attributes.

- The Query Display box displays the selected attributes that will display in the Matching Results area of the Query form. Refer to Form Designer for further information.

3. To designate one of the attributes listed in the Attributes area as a Quick Find attribute/field, do one of the following:

- Double-click the attribute, or

- Click the attribute and then click the ⊡ icon.

The selected attribute now displays in the Query by area. The attribute is automatically indexed by the system. When the defined query is executed for the archetype, the system first searches the alias attribute prior to searching the quick find attributes. If the query results in one record, the system uses the matching record; otherwise, the system treats the action as a Query action.

4. To change the order in which the attributes are queried, select an attribute in the Query by area and then click the Up or Down button.

5. To remove an attribute from the Query by area, double-click it or click it and then click the  icon.

6. Select SAVE to save the query.

*1.14.6.3 Add a Query Attributes Definition*

The Query Attributes definition is a list of an archetype's attributes for which users can provide criteria during a query.
To add a query attributes to an archetype, do the following.

1. Display the Query tab as described in Accessing the Query Tab.

2. Select QueryAttributes from the drop-down list. The Attributes and Query Display boxes display.

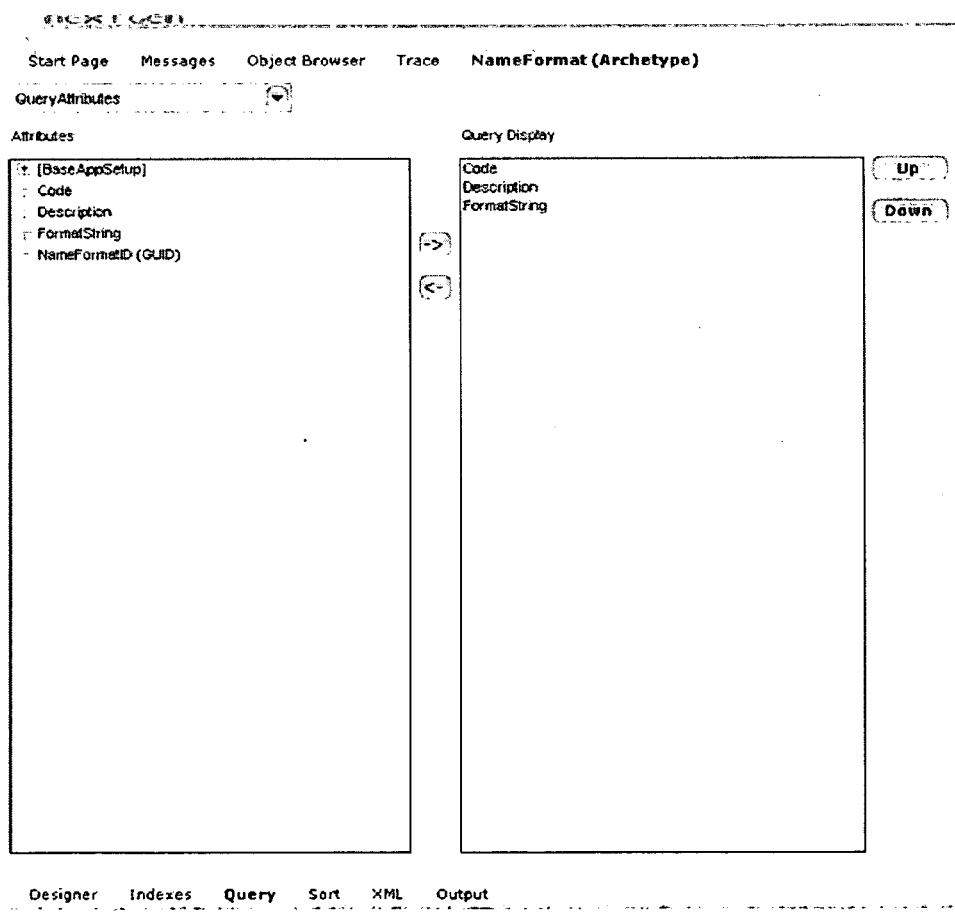

- The Attributes box displays the archetype's defined attributes.

- The Query Display box displays the attributes that will display in the Matching Results area of the Query form. Refer to Form Designer for further information.

3. To include one of the attributes listed in the Attributes box in the QueryAttributes definition, do one of the following:

- Double-click the attribute, or

- Click the attribute and then click the  icon.

The selected attribute now displays in the Query Display box. The attributes you select to include in the QueryAttributes definition are available in any Exemplary interface that allows users to query on the subject archetype.

4. To change the order in which the attributes are queried, select an attribute in the Query Display box and then click the Up or Down button.

5. To remove an attribute from the Query Display box, double-click it or click it and then click the  icon.

6. Select SAVE to save the query.

*1.14.6.4    Add a Query Results Definition*

The Query Results definition is a list of an archetype's attributes that must display by default in the Matching Results area of the Query form. Refer to Form Designer for further information.
To define the attributes that must display, do the following.

1. Display the Query tab as described in Accessing the Query Tab.

2. Select QueryResults from the drop-down list. The Attributes and Query Display boxes display.

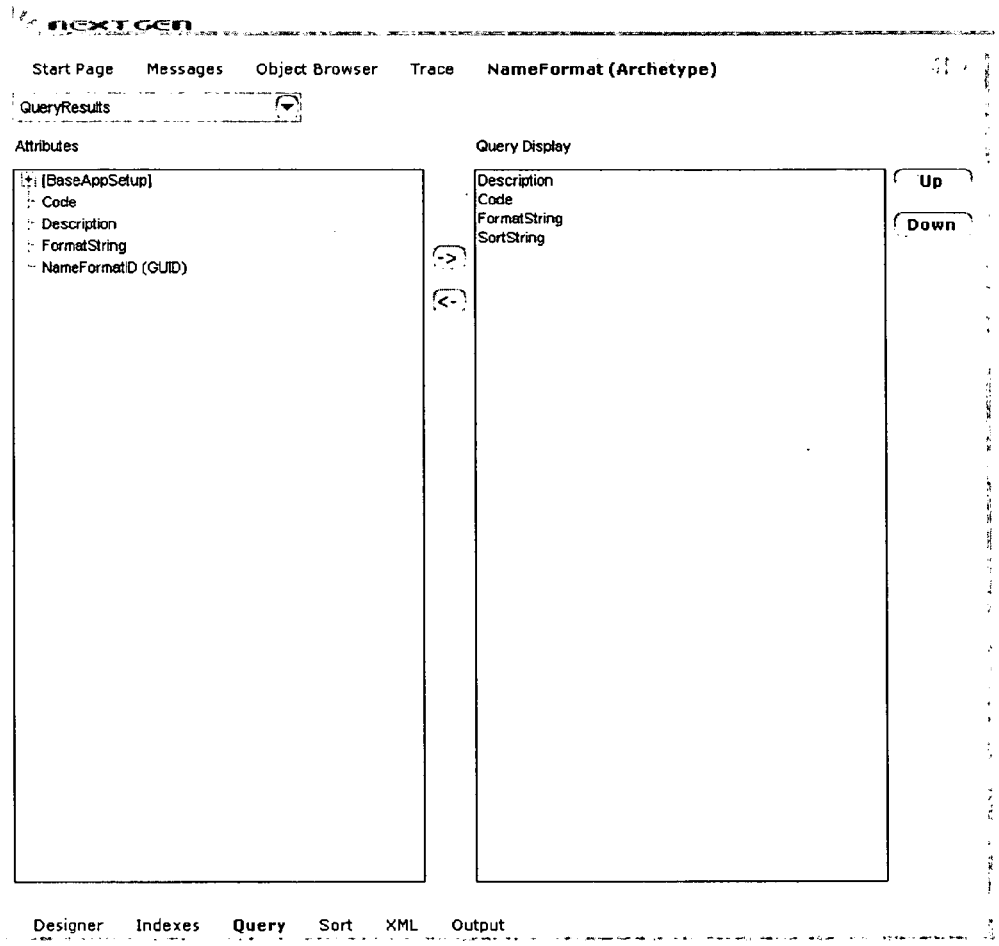

- The Attributes box displays the archetype's defined attributes.

- The Query Display box displays the attributes that will display in the Matching Results area of the Query form. Refer to Form Designer for further information.

3. To select an attribute listed in the Attributes box that must be display by default in the Query Results grid, do one of the following:

- Double-click the attribute, or

- Click the attribute and then click the ⟨->⟩ icon.

The selected attribute now displays in the Query Display box. Attributes that are not included in this definition but are included in the QueryAttributes definition must display in the Query Results grid if users provide criteria for that particular attribute.

4. To change the order in which the attributes are queried, select an attribute in the Query Display box and then click the Up or Down button.

5. To remove an attribute from the Query Display box, double-click it or click it and then click the  icon.

6. Select SAVE to save the query.

*1.14.6.5 Add a Query Where Definition*

The Query Where definition allows users to define a static (OQL) condition that is applied to the Archetype Query definition. For example, an OQL expression could be included that only retrieves active codes in a setup application.
To define the static (OQL) condition, do the following.

1. Display the Query tab as described in Accessing the Query Tab.

2. Select QueryWhere from the drop-down list. The OGL Where text box displays.

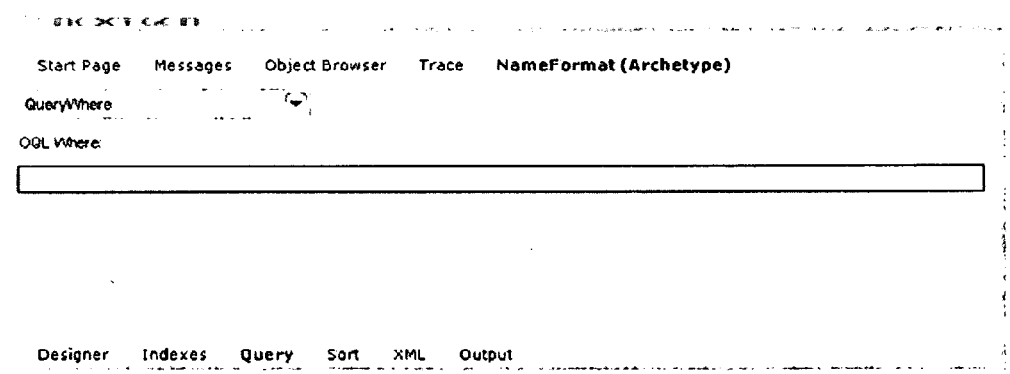

3. In the OGL Where text box, enter a static (OQL) condition to be applied to the Archetype Query definition.

4. Select SAVE to save the query.

1.14.7 Removing an Archetype

An archetype can be removed from a project without deleting it from the system. To remove an archetype from the project, do the following.

- In the Project tree in the Exemplary IDE Start Page, right-click the archetype to be removed and select Exclude From Project.

To permanently delete an archetype from the system, refer to Deleting an Archetype.

1.14.8  Deleting an Archetype

To permanently delete an archetype from the system, do the following.

Note: To remove an archetype from a project without deleting it from the system, refer to Removing an Archetype.

- In the Project tree in the Exemplary IDE Start Page, right-click the archetype to be deleted and select Delete Permanently.

1.14.9  Archetype Properties Field Definitions

Select the archetype in the Inheritance area of the Archetype Designer and then enter or modify the fields in the Properties tab as defined below.

| Field Name | Description |
|---|---|
| *Archetype Info* | |
| (ID) | This field displays the name of the archetype you entered in the Add New Archetype dialog box (refer to Adding a New Archetype) or the name of the existing archetype selected from the Select Item dialog box (refer to Adding an Existing Archetype). |
| Inherits From | This field displays the unique ID of the parent archetype from which the subject archetype inherits. The default is NxItem. To change the value, enter the ID of the parent archetype, or click the ... button to display the Select Item dialog box and select an archetype. |
| Is Stock | This read-only field indicates whether the archetype was created internally by Thomson Elite and thus cannot be edited by external users. If the user is logged in as an internal Thomson Elite user, the default value is True; otherwise, the default value is False. |
| *Captions* | |
| Caption | Enter the name of the archetype that will display wherever the archetype displays in the Exemplary Designer Interface. It is also inherited by the attributes that are created from this archetype.<br><br>Note: Although the name is entered in English, it must be assigned and stored with a GUID to support language independence. |
| *Data Type Info* | |

| Field Name | Description |
|---|---|
| Is Big List | Click in this field and select True from the drop-down list box if the archetype requires a Big List lookup control, or select False if it does not. The default is False.<br><br>An archetype that requires a Big List lookup control typically stores a large amount of data and requires the user to query to locate a value for the control.<br><br>The following applies if this field is set to True:<br><br>• Wherever the archetype displays in the Exemplary Designer Interface, it must always have a BigList control.<br><br>• Quick Find attributes must be defined for the archetype. Refer to QuickFind Query for further information. |
| Row Level Security | Click in this field and select True from the drop-down list box if the archetype is to implement security using database row-level access techniques, or select False if it is not. The default is False. |
| Support Attachments | Click in this field and select True from the drop-down list box if the archetype is required to support the framework-supplied Attachments functionality, or select False if it is not. The default is True. |
| Support Recent List | Click in this field and select True from the drop-down list box if the archetype supports the framework's Recent List functionality, or select False if it does not. The default is False.<br><br>If this property is set to True, whenever the archetype control is used on a Exemplary interface, the system must retain and display a list of the user's five most recently used values. |

Object Designer Overview

Using the Object Designer, you can create a code library that can be shared among applications. Objects based on archetypes and business logic can be developed against the created object. The defined logic can then be used to create forms and user interfaces, or as stand-alone objects to be included in processes. The objects can also be invoked through Web Services.

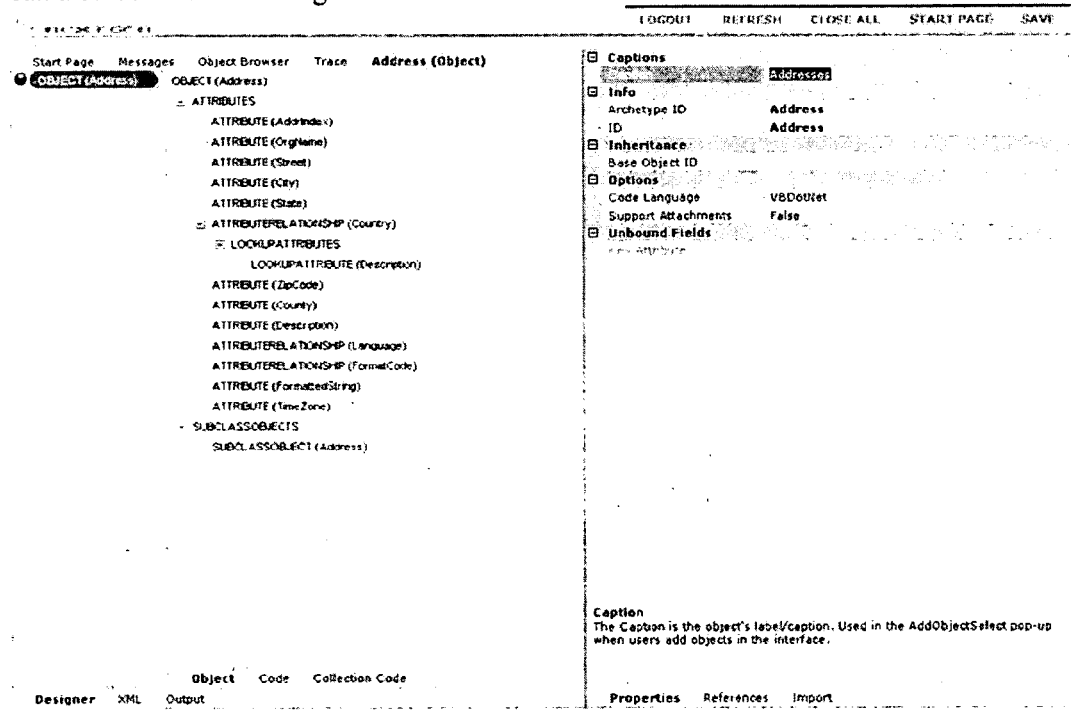

The Object Designer includes the following sections:

- Exclusive child object – The area on the left side of the designer allows you to specify the exclusive child object that can then be used as a child object in the Object Designer.

- Designer tab – This tab includes the following three tabs:

- Object tab – From this tab, attributes, child objects, subclass objects, import objects and reference objects can be added to an object. Refer to Working with Objects for further information.

- Code tab – Develop custom code for an object. Refer to Developing Custom Code for further information.

- Collection Code tab

- XML tab – Displays the XML code generated from the Object Designer. Refer to XML tab for further information.

- Output tab – Displays any error or generated code resulting from selecting the SAVE option. Refer to Output tab for further information.

- Properties tab – Add or change information about the selected object. Refer to Object Properties Field Definitions for further information.

- Import tab

1.15 Accessing the Object Designer

The Object Designer can be accessed by performing one of the following actions from the Project browser in the Exemplary IDE Start Page:

- Double-click an object listed under Object.

- Right-click a listed object and select Edit.

- Right-click Object and select either Add New Object Item or Add New – use standard XML designer. The Object Designer displays after you enter a name for the new object in the Add New Object dialog box (refer to Adding a New Object for further information).

- Right-click Object and select Add an Existing Object Item. The Object Designer displays after you select the object from the Select Item dialog box (refer to Adding an Existing Object for further information).

Once you have accessed the Object Designer and then open another designer, you can return to it by clicking the *Object Name* (Object) tab at the top left of the Exemplary window.

1.16 Working with Objects

An object contains logic, and in order to create an interface, an object must first be created. The Object tab displays when you first access the Object Designer (refer to Accessing the Object Designer for instructions). This tab displays existing objects, their child objects and subclass objects in a tree format.

```
OBJECT (CustomerObj)
 - ATTRIBUTES
     ATTRIBUTE (CustomerNumber)
     ATTRIBUTE (LastName)
     ATTRIBUTE (FirstName)
     ATTRIBUTERELATIONSHIP (Preferences)
 - CHILDOBJECTS
     CHILDOBJECT (Account)
 - SUBCLASSOBJECTS
     SUBCLASSOBJECT (Customer)
```

Object   Code   Collection Code

By right-clicking the OBJECT(*ObjectName*) parent node of the displayed object and selecting one of the following options, you can add a header node as a child in the object tree, and then add associated objects.

- ATTRIBUTES – Add an ATTRIBUTES header node. An attribute, attribute relationship or calculated attribute can then be added to the object. Refer to Adding Attributes to an Object for further information.

- CHILDOBJECTS – Add a CHILDOBJECTS header node. Adding a child object allows you to display the child's as well as the parent's objects on a form. Refer to Adding a Child Object to an Object for further information.

- SUBCLASSOBJECTS – Add a SUBCLASSOBJECTS header node. Adding a subclass to an object defines the added subclass object as a creatable object. Refer to Adding a Subclass Object to an Object for further information.

- IMPORTS – Add an IMPORTS header node. Adding an import object allows external files to be imported and used within the object. Refer to Adding an Import Object to an Object for further information.

- REFERENCES – Add a REFERENCES header node. Refer to Adding a Reference Object to an Object for further information.

The area on the left side of the Object Designer allows you to specify the exclusive child object to be used as a child object in the Object Designer. Exclusive child objects are used when the code in a child object needs to have access to the parent object. Refer to Working with Exclusive Child Objects for further information.

● OBJECT (LgFolderObj)

1.16.1 Adding a New Object

To add a new object to the project, do the following.

Note: To add a new object using the standard XML designer, refer to Adding a New Object using the XML Designer.

1. In the Project tree in the Exemplary IDE Start Page, right-click Object and select Add New Object Item.

2. The Add New Object dialog box displays. Enter a name for the object in the Item ID field and then choose OK, or choose Cancel to close this dialog box without creating a new object.

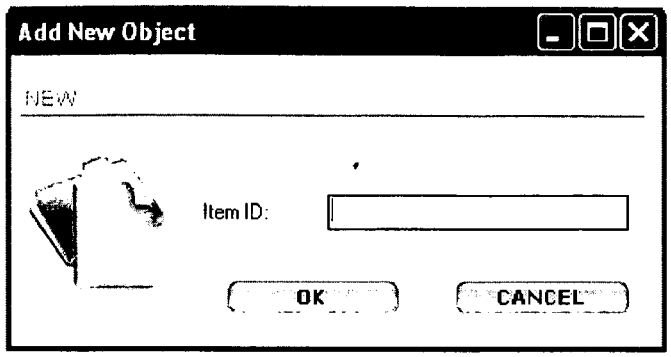

3. The new object displays in the Object Designer.

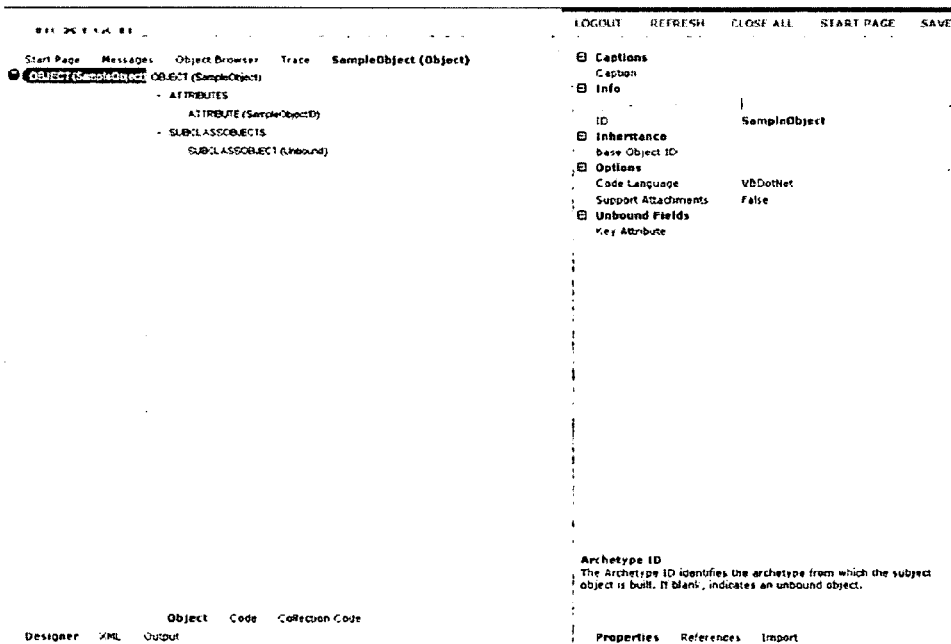

- Refer to Object Properties Field Definitions for information about the fields in the Properties tab.

- For information about exclusive child objects, refer to Working with Exclusive Child Objects.

- To add attributes to the object, refer to Adding Attributes to an Object.

- To add objects to the object, refer to Adding Objects to an Object.

4. Click SAVE in the upper right corner of the Object Designer to save the new object.

1.16.2 Adding a New Object using the XML Designer

To add a new object to the project using the standard XML designer, do the following.

1. From the Project tree in the Exemplary IDE Start Page, right-click Object and select Add New – use standard XML designer.

2. The Add New Object dialog box displays. Enter a name for the object in the Item ID field and then choose OK, or choose Cancel to close this dialog box without creating a new object.

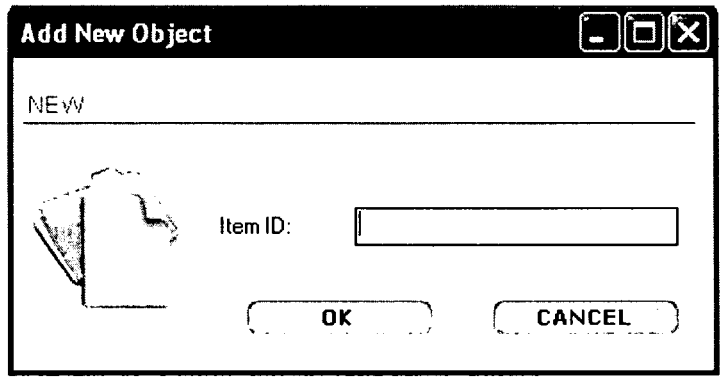

3. The new object displays in the Object Designer.

- For information about exclusive child objects, refer to Working with Exclusive Child Objects.
   - To add attributes to the object, refer to Adding Attributes to an Object.
   - To add objects to the object, refer to Adding Objects to an Object.

4. Click SAVE in the upper right corner of the Object Designer to save the new object.

1.16.3 Adding an Existing Object

To add an existing object to the project, do the following.

1. From the Project browser in the Exemplary IDE Start Page, right-click Object and select Add an Existing Object Item.

2. The Select Item dialog box displays.

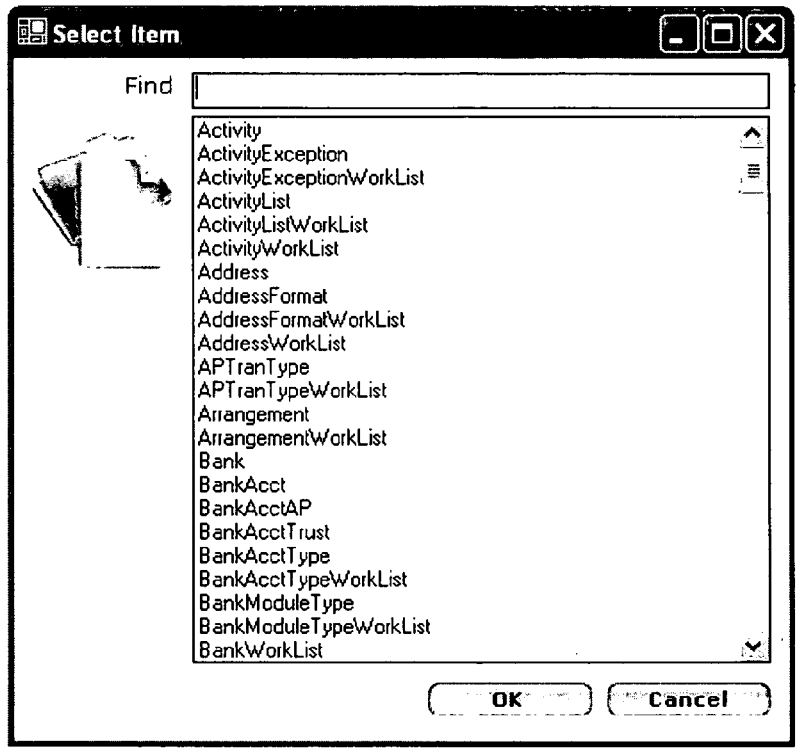

Enter the first few letters of the object name in the Find field, or use the scroll bar to locate the object.

3. Select the object and choose OK, or choose Cancel to close this dialog box without adding an existing object.

4. The selected object displays in the tree in the Project browser.

- For information about adding exclusive child objects, refer to Working with Exclusive Child Objects.

- To add attributes to the object, refer to Adding Attributes to an Object.

- To add objects to the object, refer to Adding Objects to an Object.

5. Click SAVE in the upper right corner of the Object Designer to save the object.

1.16.4 Removing an Object

An object can be removed from a project without being deleted from the system. To remove an object from the project, do the following.

- In the Project tree in the Exemplary IDE Start Page, right-click the object to be removed and select Exclude From Project.

1.16.5 Object Properties Field Definitions

Select OBJECT(*ObjectName*) in the Object tab of the Object Designer and then enter or modify the fields in the Properties tab as defined below.

| Field Name | Description |
| --- | --- |
| *Captions* | |
| Caption | Enter a caption (label) for the object. The caption displays in the Add Object Select page, which prompts the end user to select the type of subclass to create when adding a new object through the interface/form. |
| | Although the caption is entered in English, it is stored and managed as a GUID to support language independence. |
| | If a caption was entered in the Archetype Designer, it automatically displays in this field. |
| *Info* | |
| Archetype ID | Enter the unique ID of the archetype from which the subject object is built, or click in this field and then choose the ... button to select the ID. |
| ID | Enter the unique ID of the object. |
| *Inheritance* | |
| Base Object ID | Enter the unique ID of the object from which the exclusive child object inherits. |
| *Options* | |
| Code Language | Click in this field and from the drop-down list, select one of the following coding languages to be used to write the logic for the object:<br>• VBDotNet. This is the default value.<br>• Csharp |
| Support Attachments | Click in this field and select True from the drop-down list if the object must support the Exemplary attachments functionality. The default is False. |
| *Unbound Fields* | |

| Key Attribute | · |
|---|---|

1.16.6 Working with Exclusive Child Objects

The area on the left side of the Object Designer allows you to specify the exclusive child object to be used as a child object. Exclusive child objects are used when the code in a child object needs to have access to the parent object. Once an object is defined as an exclusive child, the system builds the child DLL into the parent DLL, and the child object can only exist in the context of its parent.

- Adding an Exclusive Child Object
- Deleting an Exclusive Child Object

*1.16.6.1 Adding an Exclusive Child Object*

To add an exclusive child object, do the following.

1. Display the Object Designer as described in Accessing the Object Designer.

2. If an EXCLUSIVEOBJECTS header node does not already display below the parent object **OBJECT(*ObjectName*) in the Designer tab, right-click OBJECT(*ObjectName*) and select Add>EXCLUSIVEOBJECTS**.

The EXCLUSIVEOBJECTS header node displays below the parent object.

3. Right-click the EXCLUSIVEOBJECTS header node and select Add>EXCLUSIVEOBJECT. **EXCLUSIVE OBJECT(EXCLUSIVEOBJECT*n*)** displays below the header node, where *n* indicates the number of the object.

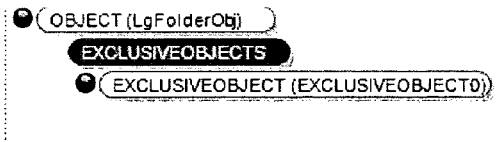

4. Click **EXCLUSIVE OBJECT(EXCLUSIVEOBJECT*n*) and then in the Properties tab, enter a unique identifier for the exclusive object in the ID** field, and other information about the attribute as necessary. Refer to Exclusive Object Properties Field Definitions for more information.

5. To add additional exclusive objects to this header node, repeat steps 3 and 4.

6. To add additional EXCLUSIVEOBJECTS header nodes, right-click **EXCLUSIVE OBJECT(*ExclusiveObjectName*) and select Add>EXCLUSIVEOBJECTS**. To add exclusive objects to the new header node, repeat steps 3 and 4.

7. When finished, click SAVE in the upper right corner of the Object Designer to save the new exclusive object(s).

*1.16.6.2  Deleting an Exclusive Child Object*

To delete an exclusive child object, do the following.

1. Display the Object Designer as described in Accessing the Object Designer.

2. Right-click the exclusive child object in the Designer tab and select Delete.

*1.16.6.3  Exclusive Object Properties Field Definitions*

Select an exclusive child object in the Designer tab of the Object Designer and then enter or modify the fields in the Properties tab as defined below.

| Field Name | Description |
|---|---|
| *Captions* | |
| Caption | Enter a caption (label) for the exclusive child object. The caption displays in the Add Object Select page, which prompts the end user to select the type of subclass to create when adding a new object through the interface/form. |
| | Although the caption is entered in English, it is stored and managed as a GUID to support language independence. |
| | If a caption was entered in the Archetype Designer, it automatically displays in this field. |
| *Info* | |
| Archetype ID | Enter the unique ID of the archetype from which the subject object is built. |
| *Inheritance* | |
| Base Object ID | Enter the unique ID of the object from which the exclusive child object inherits. |
| *Options* | |
| Code Language | Click in this field and from the drop-down list, select one of the following coding languages to be used to write the logic for the object:<br>• VBDotNet. This is the default value.<br>• Csharp |
| Support Attachments | Click in this field and select True from the drop-down list if the object must support the Exemplary attachments functionality; otherwise, select False. The default is False. |
| *Unbound Fields* | |
| Key Attribute | |

1.16.7 Adding Attributes to an Object

Attributes, attribute relationships and calculated attributes can be added to an object.

Note: Attributes can be imported into the object using the Imports tab. Refer to Importing Attributes for further information.

To add an attribute to an object, do the following.

1. Display the Object Designer page as described in Accessing the Object Designer.

2. If an ATTRIBUTES header node does not already display in the Object tab, right-click the **OBJECT(*ObjectName*) parent node and select Add>ATTRIBUTES**.

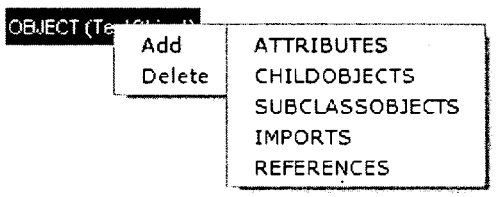

3. Right-click the ATTRIBUTES header node, select Add and then select one of the following options:

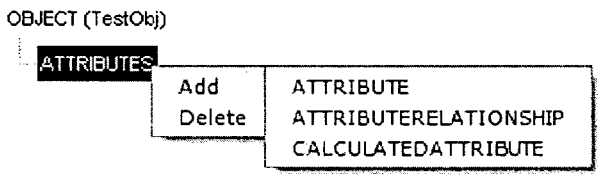

- ATTRIBUTE – Creates the new attribute node ATTRIBUTE (**ATTRIBUTE*n*)**, where *n* indicates the number of the attribute, under the ATTRIBUTES header node. To link an attribute to this attribute, refer to Adding a Linked Attribute.

- ATTRIBUTERELATIONSHIP – Creates the new attribute relationship node ATTRIBUTERELATIONSHIP (**ATTRIBUTERELATIONSHIP*n*)**, where *n* indicates the number of the attribute relationship, under the ATTRIBUTES header node. To link an attribute to this attribute relationship, refer to Adding a Linked Attribute. To add a lookup attribute to this attribute relationship, refer to Adding a Lookup Attribute.

- CALCULATEDATTRIBUTE – Creates the new attribute relationship node CALCULATEDATTRIBUTE (**CALCULATEDATTRIBUTE*n*)**, where *n* indicates the number of the calculated attribute, under the ATTRIBUTES header node. To link an attribute to this attribute, refer to Adding a Linked Attribute.

4. Click the new attribute, attribute relationship or calculated attribute node to display the attribute's properties in the Properties tab.

5. In the Properties tab, enter a unique identifier for the attribute, attribute relationship or calculated attribute node in the ID field. Refer to Object Attribute Properties Field Definitions for more information.

6. Choose SAVE to save the attribute, attribute relationship or calculated attribute node.

*1.16.7.1   Adding a Linked Attribute*

An attribute can be linked to an object's attribute, attribute relationship or calculated attribute. To add a linked attribute, do the following.

1. Add an attribute, attribute relationship or calculated attribute to an attribute as described in Adding Attributes to an Object.

2. Right-click the ATTRIBUTE, ATTRIBUTERELATIONSHIP or CALCULATEDATTRIBUTE header node and select Add>LINKEDATTRIBUTES.

OBJECT (LGSampleObject)

ATTRIBUTES

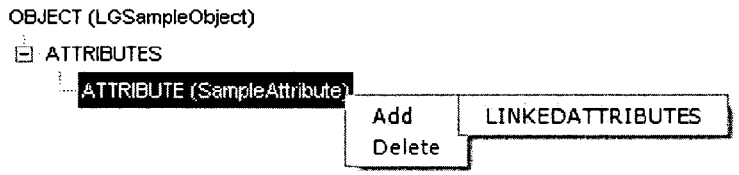

3. The header LINKEDATTRIBUTES displays below the selected header node. Right-click LINKEDATTRIBUTES and select Add>LINKEDATTRIBUTE.

OBJECT (LGSampleObject)

ATTRIBUTES

ATTRIBUTE (SampleAttribute)

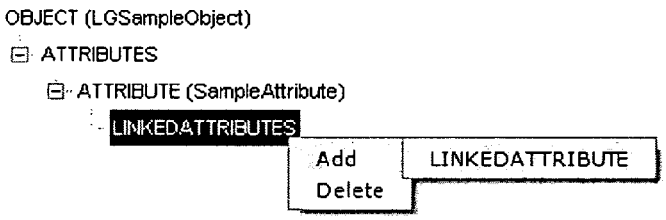

4. LINKEDATTRIBUTE displays below the LINKEDATTRIBUTES header node, and its corresponding fields display in the Property tab. Enter the fields as described in Linked Attribute Properties Field Definitions.

5. To save the linked attribute, choose SAVE.

Linked Attribute Properties Field Definitions

Select a linked attribute in the Object tab of the Object Designer and then enter or modify the fields in the Properties tab as defined below.
Refer to Adding a Linked Attribute for further information.

| Field Name | Description |
|---|---|
| *Misc* | |
| Attribute ID | Enter the unique ID of the linked attribute. |

*1.16.7.2  Adding a Lookup Attribute*

Lookup attributes and lookup attribute relationships can be added to an attribute relationship. To add a lookup attribute, do the following.

Note: Lookup attributes and lookup attribute relationships can only be added to attribute relationships. They cannot be added to attributes or calculated attributes.

1. Add an attribute relationship to an attribute as described in Adding Attributes to an Object.

2. Right-click the ATTRIBUTERELATIONSHIP header node and select Add>LOOKUPATTRIBUTES.

OBJECT (LGSampleObject)
  ATTRIBUTES

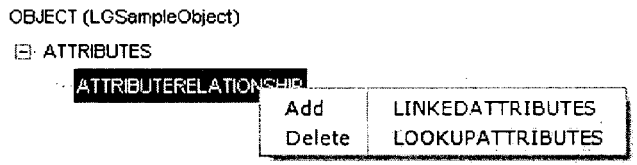

3. The header LOOKUPATTRIBUTES displays below the ATTRIBUTERELATIONSHIP header node. Right-click LOOKUPATTRIBUTES and select Add>LOOKUPATTRIBUTE or Add>LOOKUPATTRIBUTERELATIONSHIP.

OBJECT (LGSampleObject)
  ATTRIBUTES
    ATTRIBUTERELATIONSHIP

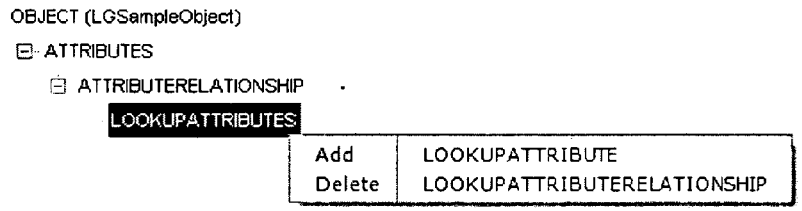

4. Depending on your selection, either LOOKUPATTRIBUTE or LOOKUPATTRIBUTERELATIONSHIP displays below the LOOKUPATTRIBUTES header node, and their corresponding fields display in the Property tab. Enter the fields as described in Lookup Attribute Properties Field Definitions.

5. To save the lookup attribute or lookup attribute relationship, choose SAVE.

Lookup Attribute Properties Field Definitions

Select a lookup attribute or lookup attribute relationship in the Object tab of the Object Designer and then enter or modify the fields in the Properties tab as defined below.
Refer to Adding a Lookup Attribute for further information.

| Field Name | Description |
|---|---|
| *Misc* | |
| Archetype Attribute ID | Enter the unique ID of the archetype attribute from which the lookup attribute or lookup attribute relationship is based. |
| CaptionID | Enter the caption (label) for this lookup attribute or lookup attribute relationship. This caption is used to label the attribute wherever it displays in the Designer Interface. |
| ID | Enter a unique identifier for the lookup attribute or lookup attribute relationship. |

*1.16.7.3 Object Attribute Properties Field Definitions*
Select an attribute in the Object tab of the Object Designer and then enter or modify the fields in the Properties tab as defined below. The properties that display depend on whether the selected attribute is an attribute, attribute relationship or calculated attribute.
Refer to Adding Attributes to an Object for further information.

Attribute Properties Field Definitions

| Field Name | Description |
|---|---|
| *Attribute Info* | |
| Access Type | Click in this field and select one of the following access types for the attribute from the drop-down list:<br>• NULL. This is the default value.<br>• Require<br>• Full<br>• ReadOnly<br>• Hidden |

| Field Name | Description |
|---|---|
| Archetype Attribute ID | Click in this field and from the drop-down list, select the unique ID of the archetype attribute from which the object attribute is based. |
| Data Type | Click in this field and select one of the following options for the object attribute's data type:<br><br>BOUND GUID<br>AUTONUMBER INTEGER<br>BOOLEAN MONEY<br>CURRENCYCODE MULTILANGUAGE<br>DATE NARRATIVE<br>DATETIME STRING<br>DECIMAL URL<br>EMAIL<br><br>Note: If the attribute was imported from a defined archetype, the object attribute's data type must be BOUND. Any object attribute whose data type is not BOUND is an unbound attribute with its specified data type. Unbound attributes must provide properties for its selected data type because it is not pre-defined in an archetype. |
| ID | Enter a unique identifier for the object attribute. |
| Is Stock | This read-only field displays True if the attribute is a Thomson Elite created attribute; otherwise, False displays. This property is pulled from the object's base archetype. |
| *Captions* | |
| Caption | Enter the caption (label) for this object attribute. This caption is used to label the object attribute wherever it displays in the Designer Interface. |
| *Data Type Info* | |
| Default Value | |

Attribute Relationship Properties Field Definitions

| Field Name | Description |
|---|---|
| *Attribute Info* | |

| Field Name | Description |
|---|---|
| Access Type | Click in this field and select one of the following access types for the attribute relationship from the drop-down list:<br>• NULL. This is the default value.<br>• Require<br>• Full<br>• ReadOnly<br>• Hidden |
| Archetype Attribute ID | Click in this field and from the drop-down list, select the unique ID of the archetype attribute from which the object attribute is based. |
| Data Type | Click in this field and select one of the following options for the attribute relationship's data type:<br>• BOUND<br>• RELATIONSHIP<br><br>Note: If the attribute was imported from a defined archetype, the object attribute's data type must be BOUND. Any object attribute whose data type is not BOUND is an unbound attribute with its specified data type. Unbound attributes must provide |
| ID | Enter a unique identifier for the attribute relationship. |
| Is Stock | This read-only field displays True if the attribute relationship is a Thomson Elite created attribute; otherwise, False displays. This property is pulled from the object's base archetype. |
| *Captions* | |
| Caption | Enter the caption (label) for this attribute relationship. This caption is used to label the attribute relationship wherever it displays in the Designer Interface. |
| *Relationship* | |
| Archetype ID | The Object ID is a read-only property. It is the unique ID of the archetype that the object is based on<br>• VBDotNet. This is the default value.<br>• Csharp |
| Relationship ID | Click in this field and select True from the drop-down list if the attribute relationship must support the Exemplary attachments functionality; otherwise, select False. The default is False. |
| Relationship Type | |

Calculated Attribute Properties Field Definitions

| Field Name | Description |
|---|---|
| *Misc* | |
| CaptionID | Enter a unique identifier for the calculated attribute. |
| Data Type | Click in this field and select one of the following options for the calculated attribute's data type:<br><br>　BOUND　　　　　GUID<br>　AUTONUMBER　INTEGER<br>　BOOLEAN　　　 MONEY<br>　CURRENCYCODE　MULTILANGUAGE<br>　DATE　　　　　NARRATIVE<br>　DATETIME　　　RELATIONSHIP<br>　DECIMAL　　　　STRING<br>　EMAIL　　　　　URL<br><br>Note: If the attribute was imported from a defined archetype, the object attribute's data type must be BOUND. Any object attribute whose data type is not BOUND is an unbound attribute with its specified data type. Unbound attributes must provide properties for its selected data type because it is not pre-defined in an archetype. |
| ID | Enter a unique identifier for the calculated attribute. |

1.16.7.4  *Importing Attributes*

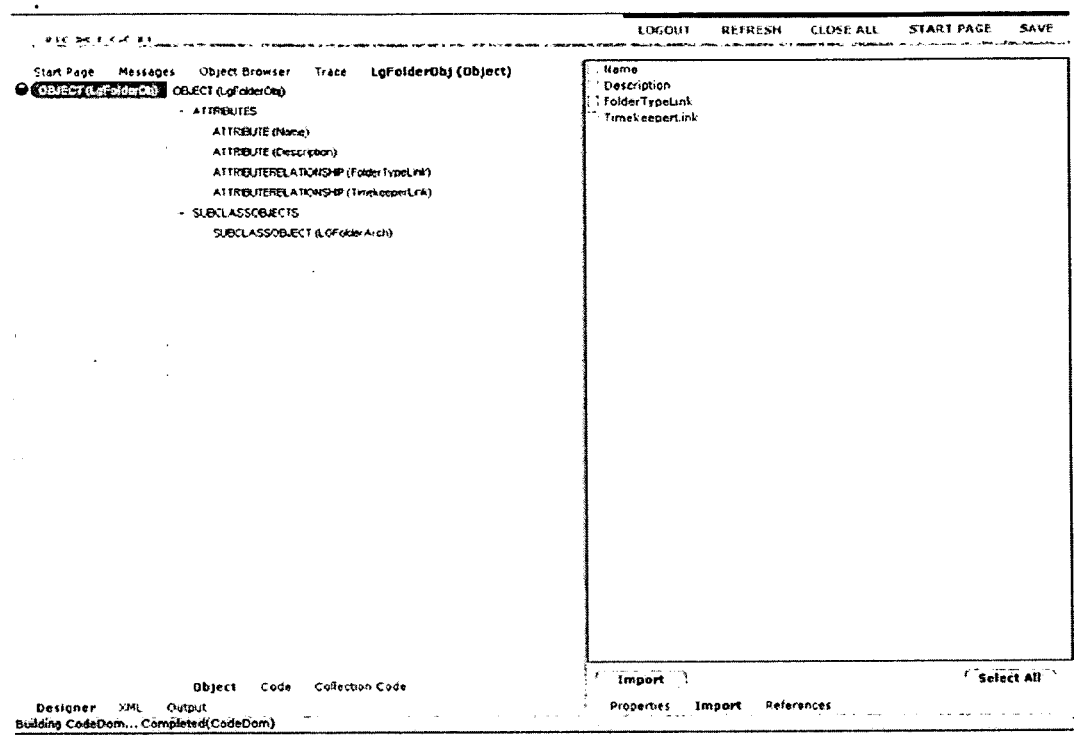

1.16.8  Adding Objects to an Object

The following types of objects can be added to an object in the Object Designer:

- Child Objects – Allow you to display the child's as well as the parent's objects on a form.

- Subclass Objects – Defines the added subclass object as a creatable object.

- Import Objects – Allow external files to be imported and used within the object.

- Reference Objects –

*1.16.8.1 Adding a Child Object to an Object*

Adding a child object to the parent node allows you to display the child's as well as the parent's objects on a form. If this object is an exclusive child (refer to Exclusive Child Object) it has access to its parent's attributes in code as well.

Multiple child objects can be added to an object.

To add a child object to an object, do the following.

1. Display the Object Designer as described in Access the Object Designer.

2. In the Object tab, right-click the **OBJECT(*ObjectName*) parent node and select Add>CHILDOBJECTS**.

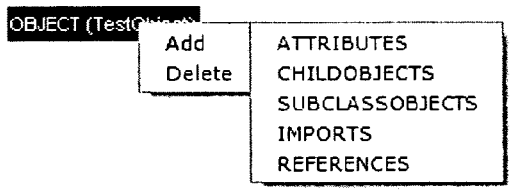

3. Right-click the CHILDOBJECTS header node and select Add>CHILDOBJECT.

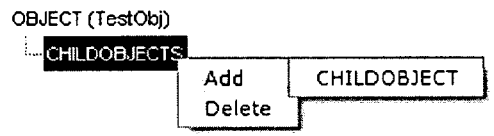

4. **CHILDOBJECT (CHILDOBJECT*n*)**, where *n* indicates the number of the child object, displays below the CHILDOBJECTS header node.

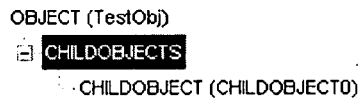

Click **CHILDOBJECT (CHILDOBJECT*n*)** to display the child object's properties in the Properties tab.

5. In the Properties tab, enter a unique identifier for the child object in the ID field, as well as other information about the child object. Refer to Child Object Properties Field Definitions for more information.

6. Choose SAVE to save the child object.

Child Object Properties Field Definitions

Select a child object in the Object tab of the Object Designer and then enter or modify the fields in the Properties tab as defined below.
Refer to Adding a Child Object to an Object for further information.

| Field Name | Description |
|---|---|
| *Child Attribute Info* | |
| ID | Enter a unique identifier for the child object. When a child object is first added, the name displays as **CHILDOBJECT*n***, where *n* indicates a number that increments as many times as necessary to uniquely identify each new child object. |
| Object ID | Enter the ID of the object from which the child object originates, or click the ... button to display the Select Item dialog box and select the parent object. |
| *Child Object Info* | |
| Rel Att ID | Click in this field and from the drop-down list, select the related attribute ID that should be used to link the child to the parent object. |

1.16.8.2 *Adding a Subclass Object to an Object*

Adding a subclass to an object defines the added subclass object as a creatable object. By default, the system automatically adds the object itself as its own subclass, allowing the object to be created.

For example, if Person and Organization inherit Entity, then Entity should not be a subclass of itself in an Entity object definition. Person and Organization should be subclasses since an Entity can only be created either through a Person or an Organization.

Only one subclass object can be added to an object.

1. Display the Object Designer page as described in Access the Object Designer.

2. Right-click the **OBJECT(*ObjectName*) parent node and select Add>SUBCLASSOBJECTS**.

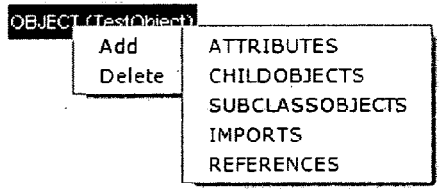

3. Right-click the SUBCLASSOBJECTS header node and select Add>SUBCLASSOBJECT.

OBJECT (TestObject)

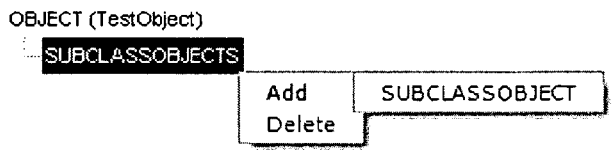

4. SUBCLASSOBJECT displays below the SUBCLASSOBJECTS header node.

OBJECT (TestObject)

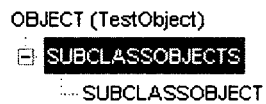
   ⋯ SUBCLASSOBJECT

Click SUBCLASSOBJECT to display the subclass object's properties in the Properties tab.

5. In the Properties tab, enter a unique identifier for the subclass object in the ID field. Refer to Subclass Object Properties Field Definitions for more information.

6. Choose SAVE to save the subclass object.

Subclass Object Properties Field Definitions

Select the subclass object in the Object tab of the Object Designer and then enter or modify the fields in the Properties tab as defined below.
Refer to Adding a Subclass Object to an Object for further information.

| Field Name | Description |
|---|---|
| *Subclass Info* | |
| Archetype ID | Enter the unique identifier of the archetype that is referenced and used to create the subclass, or choose the ... button to display the Select Item dialog box and select the archetype ID. The value entered in the Archetype ID field for the object (refer to Object Property Field Definitions) displays by default. |
| Subclass Object ID | Enter the ID of the object from which the child object originates, or click the ... button to display the Select Item dialog box and select the parent object. The value entered in the ID field for the object (refer to Object Property Field Definitions) displays by default. |

*1.16.8.3  Adding an Import Object to an Object*

Adding an import object allows external files to be imported and used within the object. Only one import object can be added to an object.

To add an import object to an object, do the following.

1. Display the Object Designer page as described in Access the Object Designer.

2. Right-click the **OBJECT(*ObjectName*) parent node and select Add>IMPORTS**.

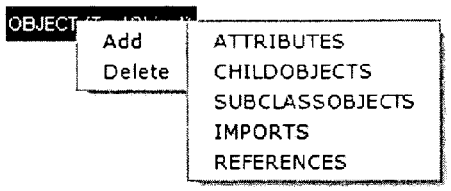

3. The IMPORTS header node displays. Right-click the IMPORTS header node and select Add>IMPORT.

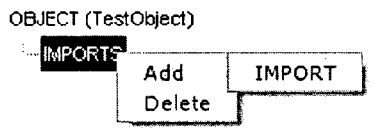

4. IMPORT displays below the IMPORTS header node.

Click IMPORT to display the import object's properties in the Properties tab.

5. In the Properties tab, enter a unique identifier for the import object in the ID field. Refer to Import Object Properties Field Definitions for more information.

6. Choose SAVE to save the import object.

Import Object Properties Field Definitions

Select an import object in the Object tab of the Object Designer and then enter or modify the fields in the Properties tab as defined below.
Refer to Adding an Import Object to an Object for further information.

| Field Name | Description |
|---|---|
| *Misc* | |
| ID | Enter a unique identifier for the import object. |

*1.16.8.4 Adding a Reference Object to an Object*

Only one reference object can be added to an object.
To add reference object to an object, do the following.

1. Display the Object Designer page as described in Access the Object Designer.

2. Right-click the **OBJECT(*ObjectName*) parent node and select Add>REFERENCES**.

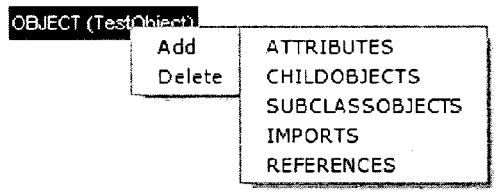

3. The REFERENCES header node displays. Right-click the REFERENCES header node and select Add>REFERENCE.

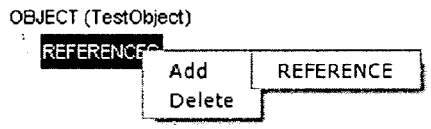

4. REFERENCE displays below the REFERENCES header node.

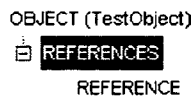

Click REFERENCE to display the reference object's properties in the Properties tab.

5. In the Properties tab, enter a unique identifier for the reference object in the ID field. Refer to Reference Object Properties Field Definitions for more information.

6. Choose SAVE to save the reference object.

Reference Object Properties Field Definitions

Select a reference object in the Object tab of the Object Designer and then enter or modify the fields in the Properties tab as defined below.
Refer to Adding a Reference Object to an Object for further information.

| Field Name | Description |
|---|---|
| *Misc* | |
| ID | Enter a unique identifier for the reference object. |

1.16.9 Adding References to an Object

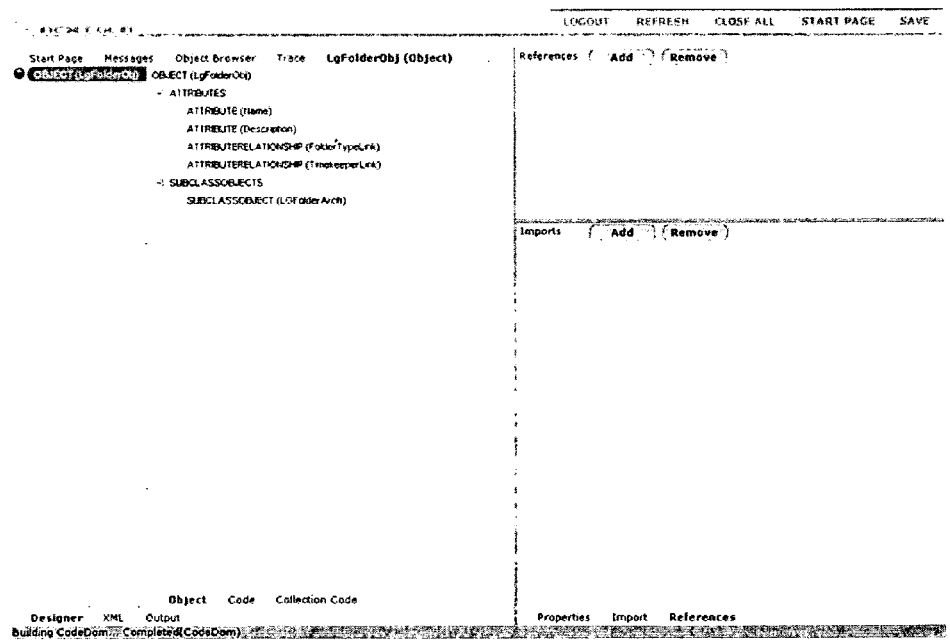

1.17 Developing Custom Code
Custom code can be developed for an object using the Code tab in the Object Designer. This allows code to be developed in a central location. Code can be inserted or developed at specific points in the transaction process.
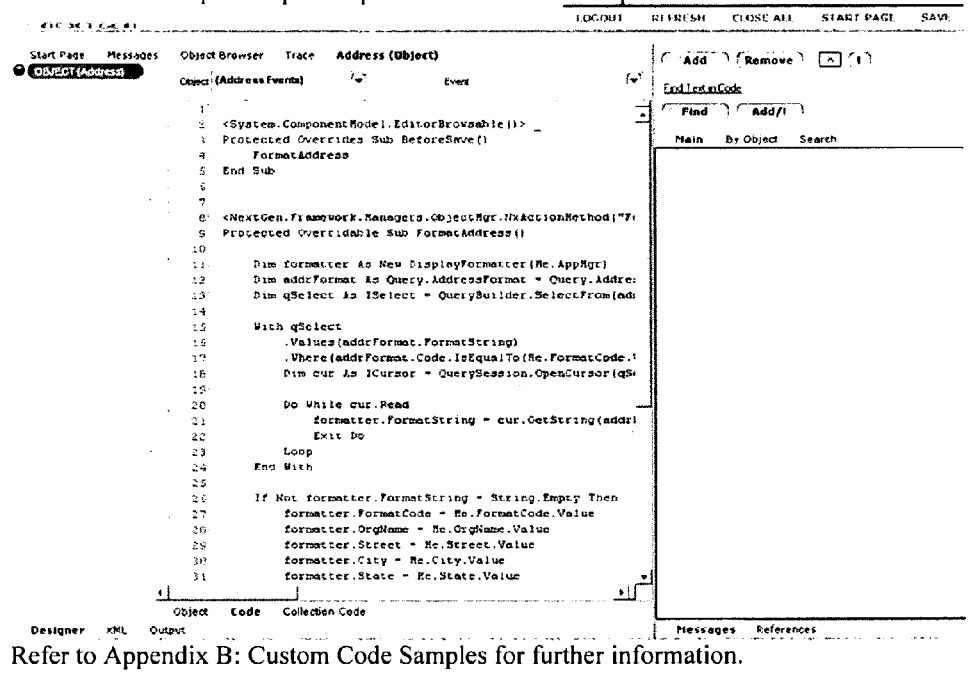
Refer to Appendix B: Custom Code Samples for further information.

1.17.1 Collection Code Tab
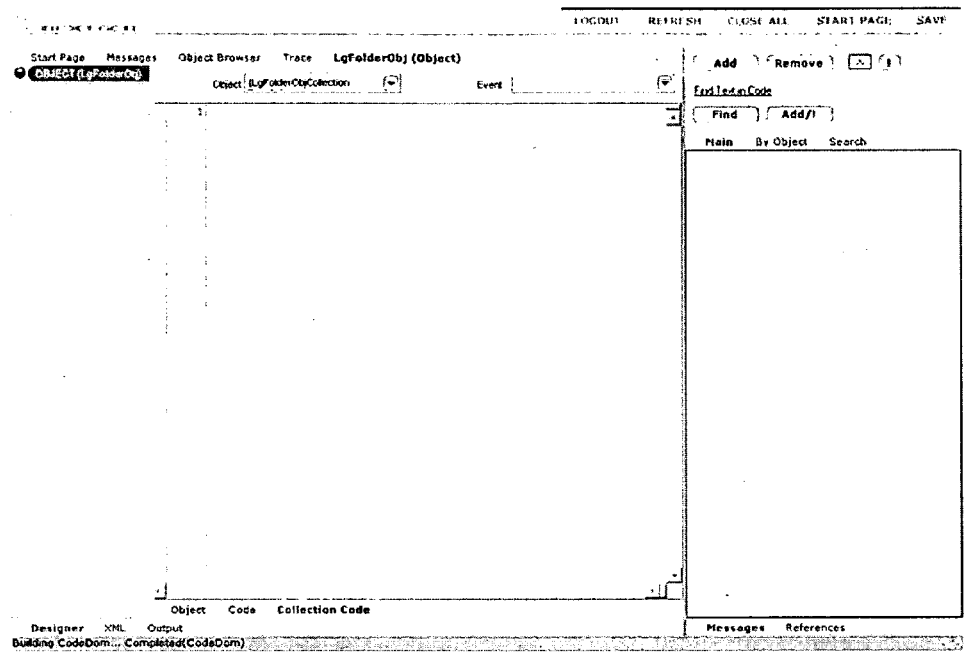

Form Designer Overview

Using the Form Designer, users can design the layout of a form, which is the user interface for an object. The forms (or views) for each object can be defined in this designer and then assigned to a view using the Page Designer (refer to Page Designer).

Forms are created by dragging and dropping controls from the Tools tab to the Designer tab. Refer to Selecting Tools for the Form for further information.

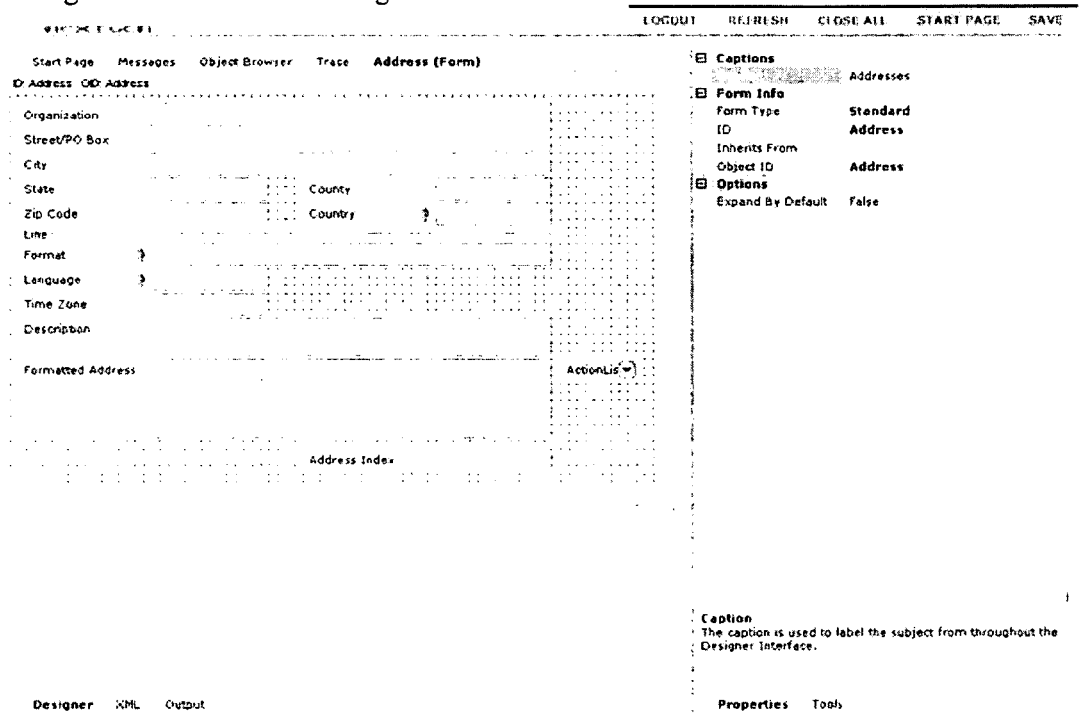

The Form Designer page is composed of the following sections:

- Designer tab – Design a form by dragging and dropping attributes, items and actions from the Tools tab into this tab.

- XML tab – Displays the XML code generated from the Form Designer. Refer to XML tab for further information.

- Output tab – Displays any error or generated code resulting from selecting the SAVE option. Refer to Output tab for further information.

- Properties tab – Add or change information about the displayed form. You can also change the form by selecting it in the Designer tab and making adjustments. Refer to Form Properties Field Definitions for further information.

- Tools tab – Displays attributes, accessory items (such as lines, labels and anchors) and actions that can be dragged and dropped into the Designer tab to design a form. Refer to Selecting Tools for the Form for further information.

1.18 Accessing the Form Designer

The Form Designer can be accessed by performing one of the following actions from the Project browser in the Exemplary IDE Start Page:

- Double-click a form listed under Form.

- Right-click a listed form and select Edit.

- Right-click Form and select either Add New Form Item or Add New – use standard XML designer. The Form Designer displays after you enter a name for the new form in the Add New Object dialog box (refer to Adding a New Form for further information).

- Right-click Form and select Add an Existing Form Item. The Form Designer displays after you select the form from the Select Item dialog box (refer to Adding an Existing Form for further information).

Once you have accessed the Form Designer and then open another designer, you can return to it by clicking the *Form Name* (Object) tab at the top left of the Exemplary window.

1.19 Working with Forms 1.19.1 Adding a New Form

To add a new form to the project, do the following.

Note: To add a new form using the standard XML designer, refer to Adding a New Form using the XML Designer.

1. In the Project tree in the Exemplary IDE Start Page, right-click Form and select Add New Object Item.

2. The Add New Form dialog box displays. Enter a name for the form in the Item ID field and then choose OK, or choose Cancel to close this dialog box without creating a new form.

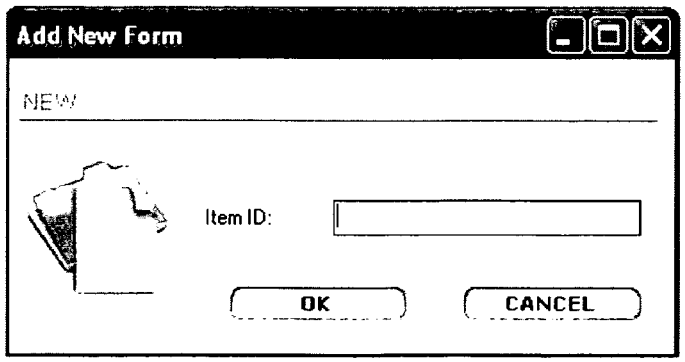

3. The new form displays in the Form Designer.

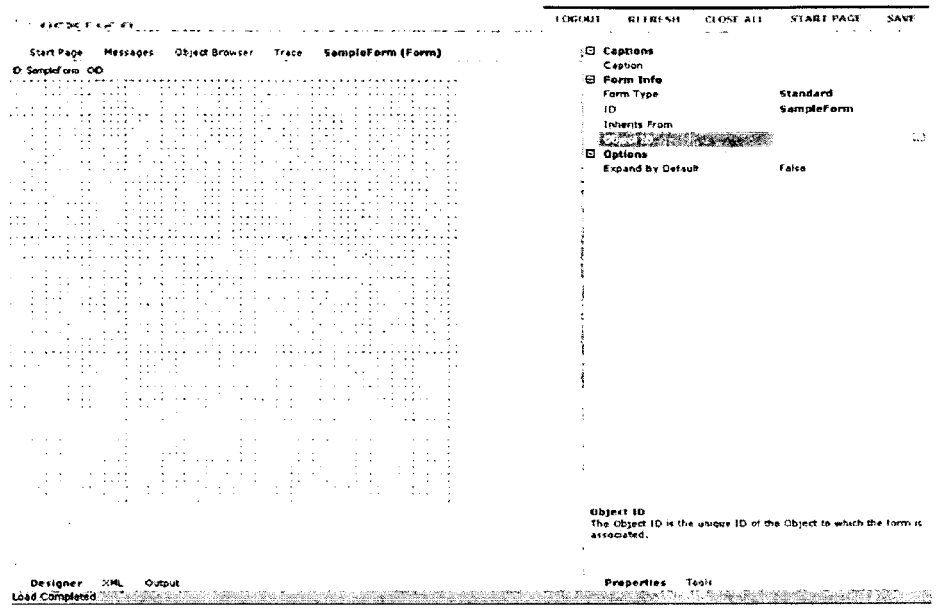
- Enter the object ID and other information about the form in the Properties tab. Refer to Form Properties Field Definitions for more information.
- For information about creating forms, refer to Designing a Form.
4. Click SAVE in the upper right corner of the Form Designer to save the new form.

1.19.2  Adding a New Form using the XML Designer

To add a new form to the project using the standard XML designer, do the following.

1. From the Project tree in the Exemplary IDE Start Page, right-click Form and select Add New – use standard XML designer.

2. The Add New Form dialog box displays. Enter a name for the form in the Item ID field and then choose OK, or choose Cancel to close this dialog box without creating a new form.

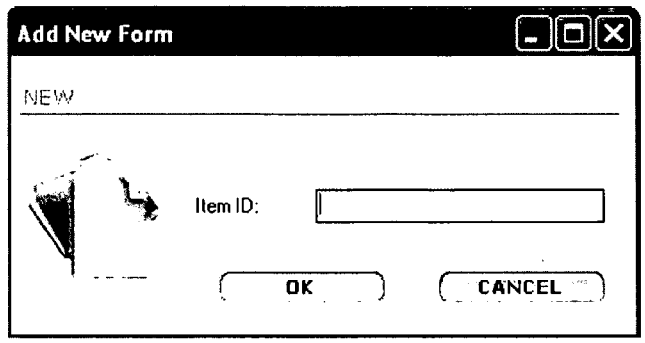

3. The new form displays in the Form Designer.

- Enter the object ID and other information about the form in the Properties tab. Refer to Form Properties Field Definitions for more information.
   - For information about creating forms, refer to Designing a Form.

4. Click SAVE in the upper right corner of the Form Designer to save the new form.

1.19.3  Adding an Existing Form

To add an existing form to the project, do the following.

1. From the Project browser in the Exemplary IDE Start Page, right-click Form and select Add an Existing Form Item.

2. The Select Item dialog box displays.

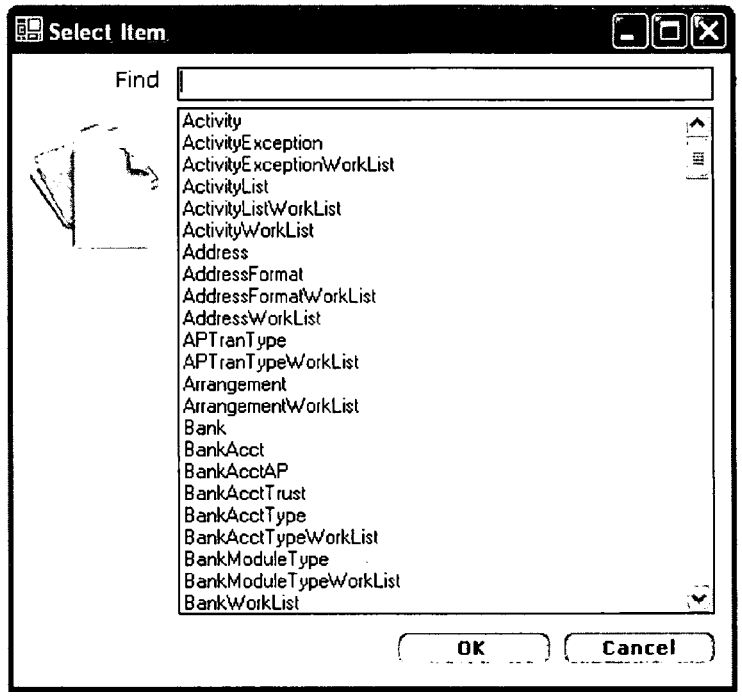

Enter the first few letters of the form name in the Find field, or use the scroll bar to locate the form.

3. Select the form and choose OK, or choose Cancel to close this dialog box without adding an existing form.

4. The selected form displays in the tree in the Project browser.

- Refer to Form Properties Field Definitions for information about the fields in the Properties tab.

- Refer to Designing a Form and Modifying a Form for further information.

5. Click SAVE in the upper right corner of the Form Designer to save the form.

1.19.4 Designing a Form

Forms are created by dragging and dropping attributes, items and actions from the Tools tab into the Designer tab in the Form Designer.
To design a form, do the following.

1. Display the Designer tab in the Form Designer as described in Accessing the Form Designer.

2. Enter or select the object ID and other form properties as described in Form Properties Field Definitions.

3. Click the Tools tab.

4. Click the down arrow at the top of the Tools tab to display a drop-down list of categories. Select one of the following categories to display the associated attributes, actions or accessory items in the Tools tab:

- ObjectAttributes – This category displays by default. It lists attributes that are defined for the object specified in the Object ID field in the Properties tab.

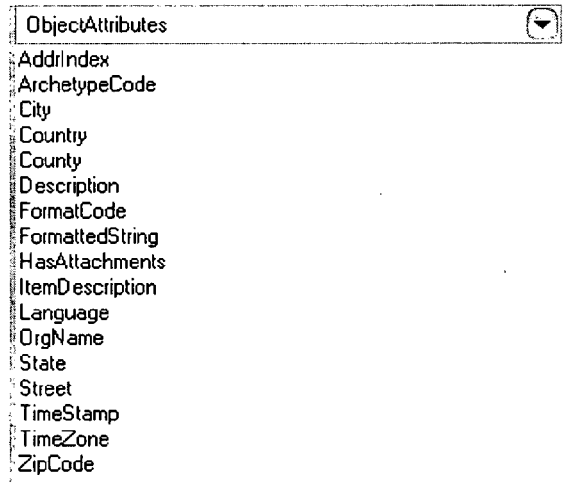

- Actions – Actions become buttons on a form. If more than one action is dragged and dropped on the same location, the button becomes an action drop-down list. Code that is created as an ActionMethod in the underlying object are the available actions on a form.

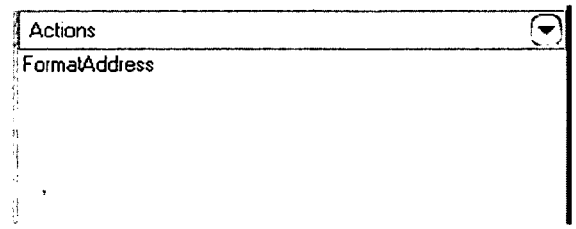

- CollectionActions – These are actions that can be taken on a collection of data (multiple rows), such as Add and Delete. The system automatically allows you to drag and drop an Add or Delete action onto the header of a form. Application developer users can restrict the access to these actions in code.

```
CollectionActions
Add
Delete
```

- AccessoryItems – Form accessories are anchors, frames, labels and lines.

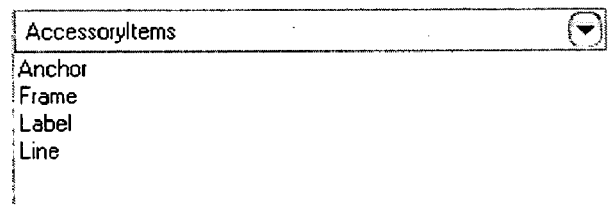

```
AccessoryItems
Anchor
Frame
Label
Line
```

- Anchor – Adds an anchor to the form. An anchor is a placeholder for the object (and the object's defined forms) on the current page. It indicates the position in which the referenced object displays in the form.

- Frame – Adds a frame to the form. The frame includes any controls it is drawn on top of.

- Label – Adds a label to the form. Enter the text to display in the label.

- Line – Adds a graphical line to the form.

3. Click the control (attribute, action or item) in the Tools tab and then drag it to the Designer tab. Drop it in the location where it should display in the form.

4. You can modify the form's controls either by selecting the control in the Designer tab and making adjustments, or by right-clicking the control, selecting Properties and then entering the information in the Properties tab. Refer to Modifying a Form for further information.

5. Click SAVE in the upper right corner of the Form Designer to save the new form.

1.19.5 Modifying a Form

You can modify the controls (attributes, actions and accessory items) in a form in the Form Designer by either selecting the control in the Designer tab and making adjustments or by right-clicking the control, selecting Properties and then entering the information in the Properties tab.

*1.19.5.1 Tab Order*

To toggle the Form Designer into tab order mode, right-click the form and select Tab Order. Tab numbers beginning with 0 (zero) display on the left side of each control.

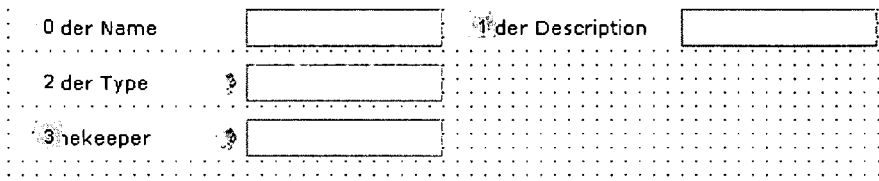

You can click the controls in sequence to assign the order in which they are to display when users tab through the form.

To automatically assign a tab order to the controls on the form, right-click the form and select Auto Tab Order. (You must first select Tab Order before the Auto Tab Order option displays.)

*1.19.5.2 Resizing the Form*

You can change the height or width of the form using one of the following methods:

- Click the form and then click and drag a blue square until the form is the size you want, or

- Right-click the form and select Properties. In the Properties tab, change the values in the Height and Width fields.

*1.19.5.3 Resizing a Control*

You can increase or decrease the size of a control in a form using one of the following methods:

- Click the control and then click and drag a blue square until the control is the size you want.

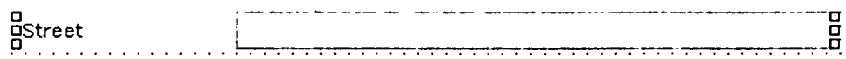

- Alternatively, right-click the control and select Properties. In the Properties tab, enter the width in the Width field. Refer to Form Properties Field Definitions for further information.

*1.19.5.4 Removing a Control from the Form*

Right-click the control and select Delete to remove it permanently from the form.

*1.19.5.5 Cutting and Pasting a Control on the Form*

To cut-and-paste an control, do the following.

1. Right-click the control and select Cut.

2. Right-click the location on the form where you want to place the control and select Paste.

*1.19.5.6 Making Controls the Same Size*

To make a control the same size as the last selected control, right-click the control to be resized and select Same Size.

*1.19.5.7 Aligning Controls on the Form*

To align multiple controls on the form, press CTRL and click the controls to be aligned. Right-click and select Align>Left to align the selected controls on the left side of the form, or select Align>Top to align the controls on the top of the form.

*1.19.5.8 Evenly Spacing Controls on the Form*

To evenly space multiple controls on the form, press CTRL and click the controls to be evenly spaced. Right-click and select Space Evenly>Across to space the selected controls evenly across the form, or select Space Evenly>Down to evenly space the selected controls vertically on the form.

*1.19.5.9 Form Control Properties Field Definitions*

Select a control in the Designer tab of the Form Designer and then enter or modify the fields in the Properties tab as defined below.

Note: Refer to Form Properties Field Definitions for information about the properties that display when you select FORM (*FormName*). Refer to Form Display Area Properties Field Definitions for information about the properties that display when you select the form.

| Field Name | Description |
|---|---|
| *Control Info* | |
| Attribute ID | Note: This field displays only if you selected an object attribute control.<br><br>This field displays the unique identifier of the attribute displayed in the control, which originates from the object attribute's properties (refer to Attribute Properties Field Definitions for further information). This field cannot be modified. |
| Data Type | Note: This field displays only if you selected an object attribute control.<br><br>This field displays the attribute's data type for the selected control. This value originates from the object attribute's data type (refer to Attribute Properties Field Definitions for further information). This field cannot be modified. |
| Control Type | Note: This field displays only if you selected an anchor, line or label accessory item.<br><br>This field indicates the control's type: Anchor, Line or Label. This field cannot be modified. |
| Relationship ID | Note: This field displays only if you selected an anchor accessory item.<br><br>Click in this field and select the relationship ID from the drop-down list. This field is only required if the form has more than one child of the same object type.<br><br>The relationship ID uniquely identifies the object being referenced by the anchor by assigning an ID for the relationship the anchor has to the reference object. This is necessary when two anchors on a form reference the same object but the contents of the form built on the object are distinct and thus need a unique identifier.<br><br>For example, two anchors on a form using the entity object can display friend vs. enemy attributes. Therefore each anchor must have a unique relationship ID: Friend for one anchor, and Enemy for the other. |

| Field Name | Description |
|---|---|
| Line Style | Note: This field displays only if you selected a line accessory item.<br><br>Click in this field and select Single from the drop-down list for a single-line format, or Double for a double-line format. The default is Single. |
| Orientation | Note: This field displays only if you selected a line accessory item.<br><br>Click in this field and select Horizontal from the drop-down list to display the line across the form, or select Vertical to display the line vertically on the form. The default is Horizontal. |
| Style | Note: This field displays only if you selected an line or label accessory item.<br><br>To use a custom HTML style, enter the string. For example, border: solid 1px black. |
| *Captions* | |
| Caption | Note: This field displays only if you selected an action control or accessory item. They do not display if you selected an object attribute control.<br><br>Enter a label for the action or item. |
| *Label Info* | |
| Label Align | Click in this field and from the drop-down list, select the alignment of the label portion of the control:<br>• Top – Align the label with the top of the control.<br>• Left – Align the label with the left side of the control. This is the default.<br>• None – Do not align the label. |
| Label Width | Enter the width (in pixels) that must be allotted to the label portion of the control. The default is 128. |
| *Layout Info* | |
| Height | Note: This field displays only if you selected a frame control.<br><br>Enter the height of the frame control in pixels. |
| Left | Enter the "X" coordinate of the left side of the control. |
| Tab Order | Enter a number indicating the order in which the control is selected when the user tabs through the form. |
| Top | Enter the "Y" coordinate of the top side of the control. |
| Width | Enter the width of the control in pixels. |

| Field Name | Description |
|---|---|
| Top | Click in this field and select True from the drop-down list if the form should be expanded by default when it displays on the page. If the form should be collapsed by default, select False. The default is False. |

1.19.6 Removing a Form

A form can be removed from a project without being deleted from the system. To remove a form from the project, do the following.

- In the Project tree in the Exemplary IDE Start Page, right-click the form to be removed and select Exclude From Project.

1.19.7 Form Display Area Properties Field Definitions

Select the form in the Designer tab of the Form Designer and then enter or modify the fields in the Properties tab as defined below.

Note: Refer to Form Properties Field Definitions for information about the properties that display when you select FORM (*FormName*). Refer to Form Control Properties Field Definitions for information about the properties that display when you select a form control.

| Field Name | Description |
|---|---|
| *Form Display Info* | |
| Height | Enter the height of the form in pixels. The default is 504. |
| ID | The form's unique identifier displays. This field cannot be modified. |
| Width | Enter the width of the form in pixels. The default is 504. |

1.19.8  Form Properties Field Definitions

Select FORM (*FormName*) in the Designer tab of the Form Designer and then enter or modify the fields in the Properties tab as defined below.

Note: Refer to Form Control Properties Field Definitions for information about the properties that display when you select a form control. Refer to Form Display Area Properties Field Definitions for information about the properties that display when you select the form.

| Field Name | Description |
| --- | --- |
| *Captions* | |
| Caption | Enter a caption for the form. This caption displays in the title bar when the form is accessed. |
| | If an object ID was entered in the Object ID property, the object's caption is brought forward as the form's caption. |
| *Form Info* | |
| Form Type | Click in this field and select one of the following form types from the drop-down list:<br>• Standard – This is the default.<br>• Grid<br>• Worklist |
| ID | Enter a unique identifier for the form. This field is required. |
| Inherits From | Enter the name of the form from which the subject form inherits, or click in this field and then click the ... button to select the form. |
| Object ID | Enter the unique ID of the object to which the form is associated, or click in this field and then click the ... button to select the object. This field is required. |
| *Options* | |
| Expand by Default | Click in this field and select True from the drop-down list if the form should be expanded by default when it displays on the page. If the form should be collapsed by default, select False. The default is False. |

Page Designer Overview

Using the Page Designer, you can define different "views" for each parent and child object defined for the page's base object. Each view is defined as a *VIEWMAP* (a combination of the archetype/object and form ID) for each object in the base object. Pages are defined by associating existing objects with a page definition and then selecting the form(s) that must be displayed for each object included on the page. Any number of forms that must be displayed for a given object can be included on a page. Therefore although page definitions can consist of the same objects, the interface created by each page definition can differ. By selecting different forms (views) for each object, different interfaces can be created.

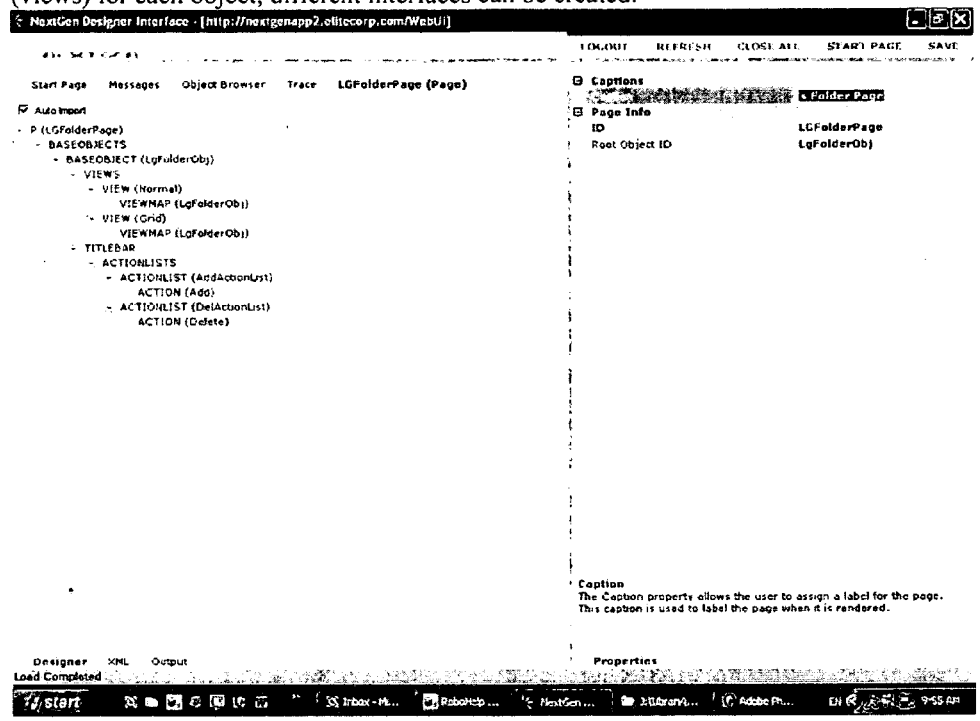

The Page Designer is composed of the following sections:

- Designer tab – Define pages by associating existing objects with a page definition and then selecting the form(s) that must be displayed for each object included on the page. Refer to Adding Objects to a Page for further information.

- XML tab – Displays the XML code generated from the Page Designer. Refer to XML tab for further information.

- Output tab – Displays any error or generated code resulting from selecting the SAVE option. Refer to Output tab for further information.

- Properties tab – Add or change information about the displayed page. Refer to Page Properties Field Definitions for further information.

1.20 Accessing the Page Designer

The Page Designer can be accessed by performing one of the following actions from the Project browser in the Exemplary IDE Start Page:

- Double-click a page listed under Page.

- Right-click a listed page and select Edit.

- Right-click Page and select either Add New Page Item or Add New – use standard XML designer. The Page Designer displays after you enter a name for the new page in the Add New Page dialog box (refer to Adding a New Page for further information).

- Right-click Page and select Add an Existing Page Item. The Page Designer displays after you select the page from the Select Item dialog box (refer to Adding an Existing Page for further information).

Once you have accessed the Page Designer and then open another designer, you can return to it by clicking the *Page Name* (Page) tab at the top left of the Exemplary window.

1.21 Working with Pages 1.21.1 Adding a New Page

To add a new page to the project, do the following.

Note: To add a new page using the standard XML designer, refer to Adding a New Page using the XML Designer.

1. In the Project tree in the Exemplary IDE Start Page, right-click Page and select Add New Page Item.

2. The Add New Page dialog box displays. Enter a name for the page in the Item ID field and then choose OK, or choose Cancel to close this dialog box without creating a new page.

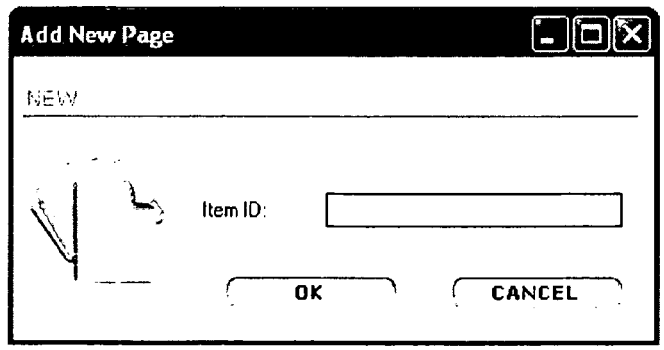

3. The new page displays in the Page Designer.
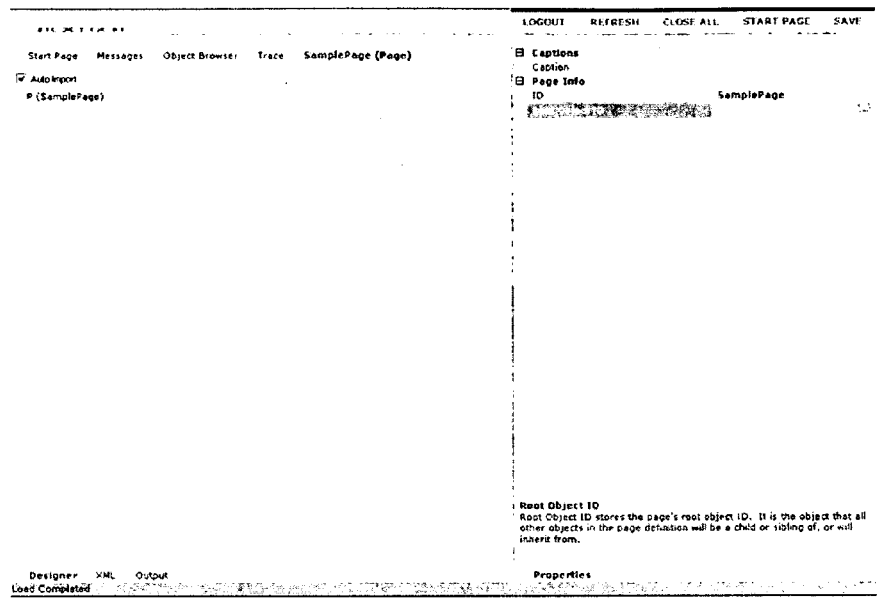
- Refer to Page Properties Field Definitions for information about the fields in the Properties tab.
- Refer to Defining a Page for information about creating pages.
4. Click SAVE in the upper right corner of the Page Designer to save the new page.

1.21.2 Adding a New Page using the XML Designer

To add a new page to the project using the standard XML designer, do the following.

1. From the Project tree in the Exemplary IDE Start Page, right-click Page and select Add New – use standard XML designer.

2. The Add New Page dialog box displays. Enter a name for the page in the Item ID field and then choose OK, or choose Cancel to close this dialog box without creating a new page.

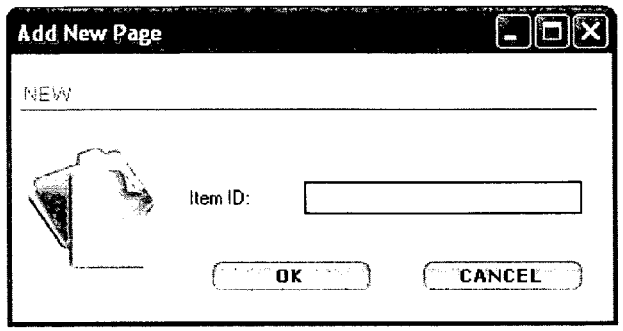

3. The new page displays in the Page Designer.

- Refer to Page Properties Field Definitions for information about the fields in the Properties tab.

- Refer to Defining a Page for information about creating pages.

4. Click SAVE in the upper right corner of the Page Designer to save the new page.

1.21.3 Adding an Existing Page

To add an existing page to the project, do the following.

1. From the Project browser in the Exemplary IDE Start Page, right-click Page and select Add an Existing Page Item.

2. The Select Item dialog box displays.

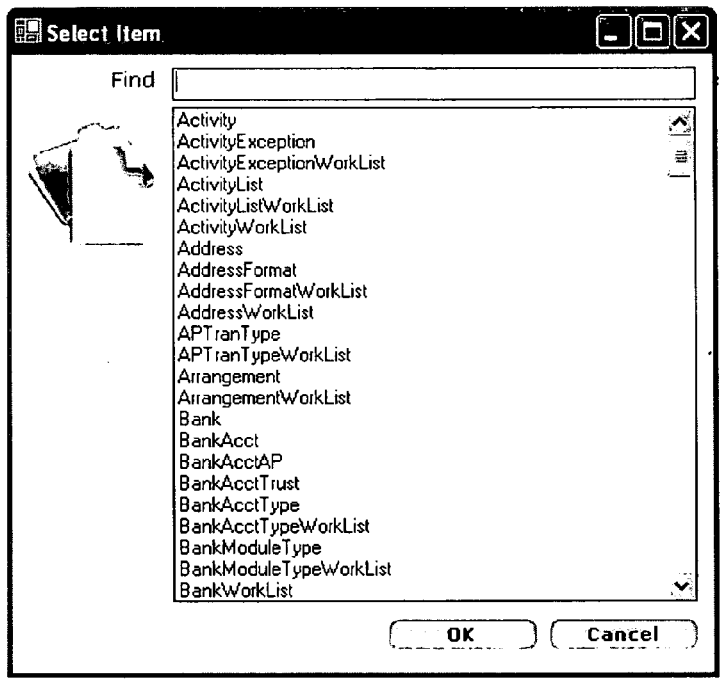

Enter the first few letters of the page name in the Find field, or use the scroll bar to locate the page.

3. Select the page and choose OK, or choose Cancel to close this dialog box without adding an existing form.

4. The selected page displays in the tree in the Project browser.

- Refer to Page Properties Field Definitions for information about the fields in the Properties tab.

- Refer to Defining a Page for information about creating pages.

5. Click SAVE in the upper right corner of the Page Designer to save the page.

1.21.4 Adding Objects to a Page

To add an objects to a page, do the following.

1. Display the Page Designer as described in Accessing the Page Designer.

2. The PAGE (*PageName*) header node displays in the tree in the Designer tab. It represents the parent-level page of the interface created by the page definition. Click this header node and then enter information in the Properties tab (refer to Page Properties Field Definitions for descriptions of each field). The entry in the Root Object ID field is the object which all other objects in the page definition are a child or sibling of, or inherit from.

3. To create a BASEOBJECTS header node if one does not already display below the PAGE (*PageName*) header node, right-click the PAGE (*PageName*) header and select Add>BASEOBJECTS.

The BASEOBJECTS header node displays below the PAGE (*PageName*) header node.

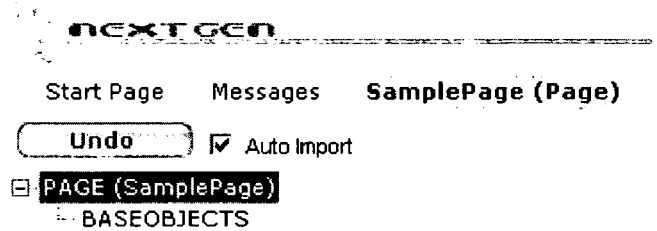

4. Create a base object, which is a child of, sibling to or inherited from the page's root object. Right-click the BASEOBJECTS header node and select Add>BASEOBJECT. BASEOBJECT displays below the BASEOBJECTS header node.

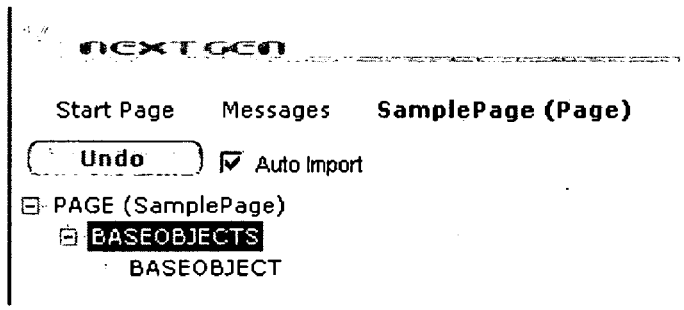

5. Click BASEOBJECT and then in the Properties tab, enter information about this base object, including a unique identifier in the ID field. Refer to Base Object Properties Field Definitions for more information.

6. To add a view to the base object, right-click BASEOBJECT and select Add>VIEWS. VIEWS displays below the BASEOBJECT header node.

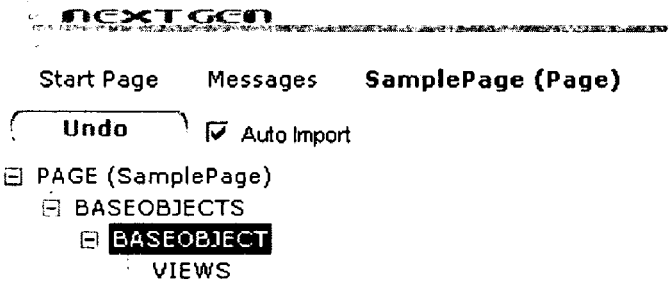

7. Right-click the VIEWS header node and select Add>VIEW. VIEW (NewView*n*) displays below the header node, where *n* indicates the number of the view.

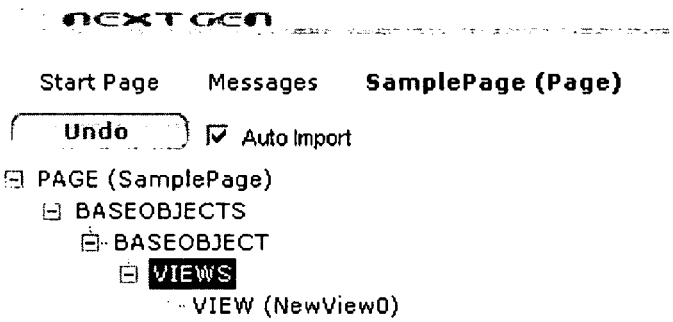

8. Click **VIEW (NewView*n*) and then in the Properties tab, enter information about this view, including a unique identifier in the ID** field. Refer to View Properties Field Definitions for more information.

9. To add a view map to the view, right-click VIEW (*ViewName*) and select Add>VIEWMAP. VIEWMAP displays below VIEW (*ViewName*).

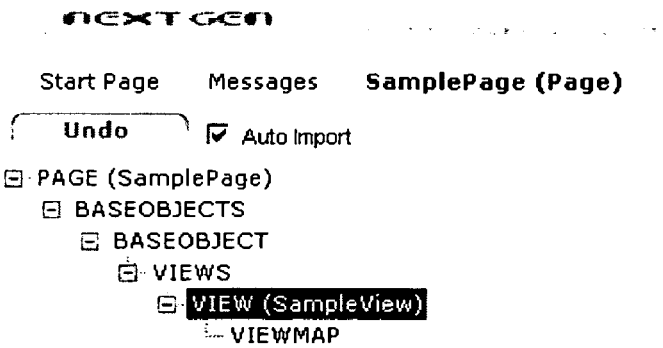

10. Click VIEWMAP and then in the Properties tab, enter a unique identifier for the view map in the Object Id field. Refer to View Map Properties Field Definitions for more information.

11. To add additional views and associated view maps, repeat steps 7 - 9.

12. When finished, click SAVE in the upper right corner of the Page Designer to save the new objects, views and view maps.

*1.21.4.1    Automatically Importing Objects into a Page*

To automatically import all objects associated with the base object into a page, do the following.

1. Display the Page Designer as described in Accessing the Page Designer.

2. Select the Auto Import check box.

*1.21.4.2    Base Object Properties Field Definitions*

Select BASEOBJECT in the Designer tab of the Page Designer and then enter or modify the fields in the Properties tab as defined below.

| Field Name | Description |
|---|---|
| *Object Info* | |
| Expand by Default | Click in this field and select True from the drop-down list if the object's associated form should be expanded by default when it displays on the page. If the form should be collapsed by default, select False. The default is True. |
| ID | Enter the unique ID of the base object, or click in this field and then click the ... button to select the base object. This field is required. |

*1.21.4.3    View Properties Field Definitions*

Select **VIEW (NewView*n*)** in the Designer tab of the Page Designer and then enter or modify the fields in the Properties tab as defined below.

| Field Name | Description |
|---|---|
| *Form Info* | |
| Is Collection View | Click in this field and select True from the drop-down list if the forms specified for this view are collection forms (grids, calendars, etc.). The default is False. |
| List Mode | Click in this field and select one of the following options from the drop-down list:<br>• Single – Display the form<br>• Repeat – Display the form in a list with repeated default forms for each record in the collection.<br>This field cannot be modified for grid-type forms. |
| *Misc* | |
| Caption | Enter a caption for the view. This caption displays in the View drop-down list in the header/title bar of the form. |
| ID | Enter a unique identifier for the view. |

*1.21.4.4   View Map Properties Field Definitions*

Select BASEOBJECT in the Designer tab of the Page Designer and then enter or modify the fields in the Properties tab as defined below.

| Field Name | Description |
|---|---|
| *Object Info* | |
| Form ID | This field displays the form that should display for the object specified in the object or archetype ID for this view map. |
| Object ID | This field displays the form that should display for the object specified in the Form ID field. |

1.21.5   Removing a Page

A page can be removed from a project without being deleted from the system. To remove a page from the project, do the following.

- In the Project tree in the Exemplary IDE Start Page, right-click the page to be removed and select Exclude From Project.

1.21.6   Page Properties Field Definitions

Select the PAGE (*PageName*) header in the Designer tab of the Page Designer and then enter or modify the fields in the Properties tab as defined below.

| Field Name | Description |
|---|---|
| *Captions* | |
| Caption | Enter a caption for the page. This caption displays in the title bar when the page is accessed. |
| *Page Info* | |
| ID | Enter a unique identifier for the page. This field is required. |
| Root Object ID | The root object is the object of which all other objects in the page are a child or sibling, or the object from which the child or siblings inherit. Enter the unique ID of the root object, or click in this field and then click the ... button to select the root object. This field is required. |

Process Designer Overview
The Process Designer allows you to configure and deploy custom business work flow processes for Exemplary. The processes can contain collections of process steps, complete with routing rules that lead to designated outputs. Each configured process step displays as a group of its components. A step can be a user or system interaction. At a minimum, it is composed of a description, process rule and process output. A work flow is built on a series of steps, one decision point leading to the next step with its own rules and decision points.

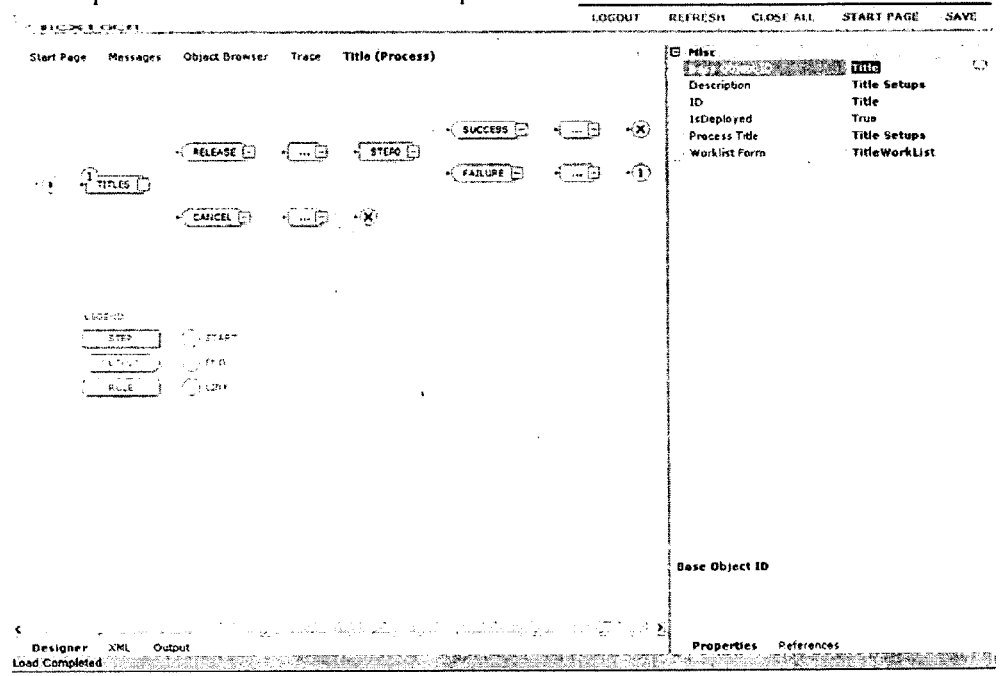

The Process Designer is composed of the following sections:

- Designer tab – Design a process by adding a collection of steps. Refer to Working with Processes for further information..

- XML tab – Displays the XML code generated from the Process Designer. Refer to XML tab for further information.

- Output tab – Displays any error or generated code resulting from selecting the SAVE option. Refer to Output tab for further information.

- Properties tab – Add or change information about the displayed process. Refer to Process Properties Field Definitions for further information.

- References tab – Add and remove references when coding rules. Refer to Adding References to a Rule for further information.

1.22 Accessing the Process Designer

The Process Designer can be accessed by performing one of the following actions from the Project browser in the Exemplary IDE Start Page:

- Double-click a process listed under Process.
- Right-click a listed process and select Edit.
- Right-click Process and select either Add New Process Item or Add New – use standard XML designer. The Process Designer displays after you enter a name for the new process in the Add New Process dialog box (refer to Adding a New Process for further information).
- Right-click Process and select Add an Existing Process Item. The Process Designer displays after you select the process from the Select Item dialog box (refer to Adding an Existing Process for further information).

Once you have accessed the Process Designer and then open another designer, you can return to it by clicking the *Process Name* (Process) tab at the top left of the Exemplary window.

1.23 Working with Processes

Processes can contain collections of process steps, complete with routing rules that lead to designated outputs. Each configured process step displays as a group of its components. A step can be a user or system interaction. At a minimum, it is composed of a description, process rule and process output.

1.23.1 Adding a New Process

To add a new process to the project, do the following.

Note: To add a new process using the standard XML designer, refer to Adding a New Form using the XML Designer.

1. In the Project tree in the Exemplary IDE Start Page, right-click Form and select Add New Process Item.
2. The Add New Process dialog box displays. Enter a name for the process in the Item ID field and then choose OK, or choose Cancel to close this dialog box without creating a new process.

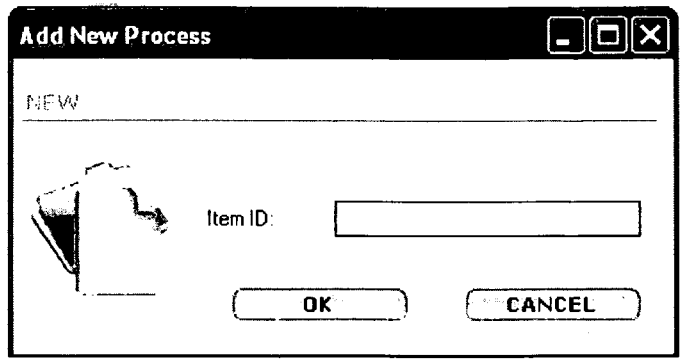
3. The new process displays in the Process Designer.
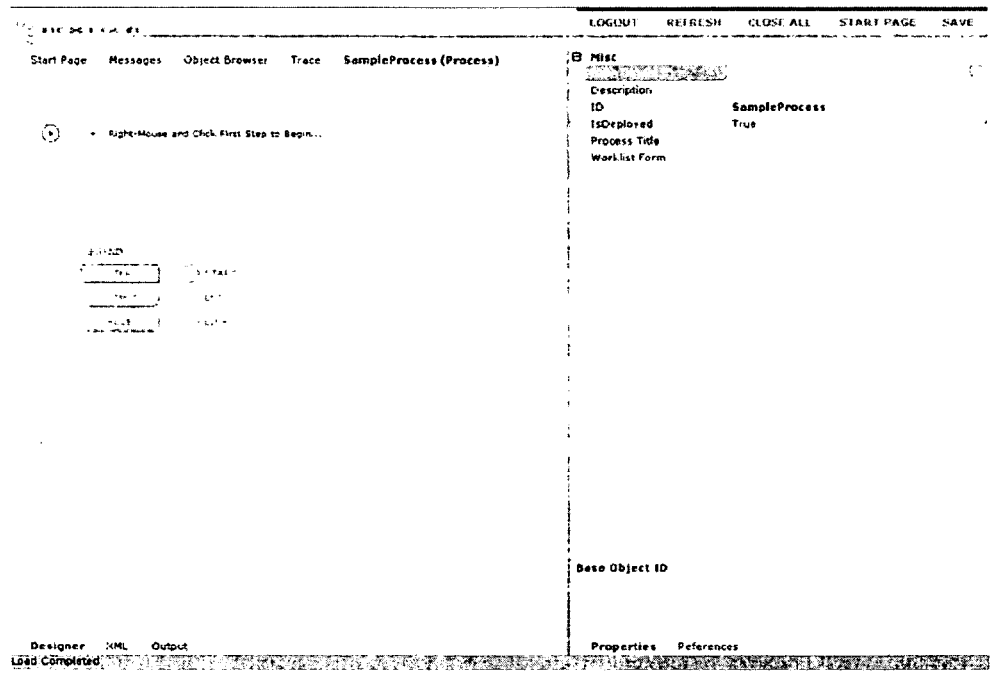
- Refer to Process Properties Field Definitions for information about the fields in the Properties tab.
- For information about creating a process, refer to Adding Steps to a Process.
4. Click SAVE in the upper right corner of the Process Designer to save the new process.

1.23.2 Adding a New Process using the XML Designer

To add a new process to the project using the standard XML designer, do the following.

1. From the Project tree in the Exemplary IDE Start Page, right-click Process and select Add New – use standard XML designer.

2. The Add New Process dialog box displays. Enter a name for the process in the Item ID field and then choose OK, or choose Cancel to close this dialog box without creating a new process.

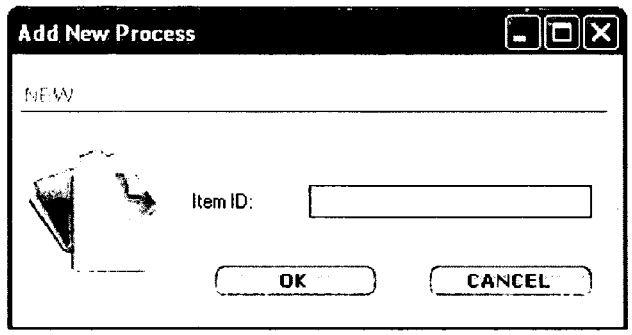

3. The new process displays in the Process Designer.

- Refer to Process Properties Field Definitions for information about the fields in the Properties tab.

- For information about creating a process, refer to Adding Steps to a Process.

4. Click SAVE in the upper right corner of the Process Designer to save the new process.

1.23.3  Adding an Existing Process

To add an existing process to the project, do the following.

1. From the Project browser in the Exemplary IDE Start Page, right-click Page and select Add an Existing Process Item.

2. The Select Item dialog box displays.

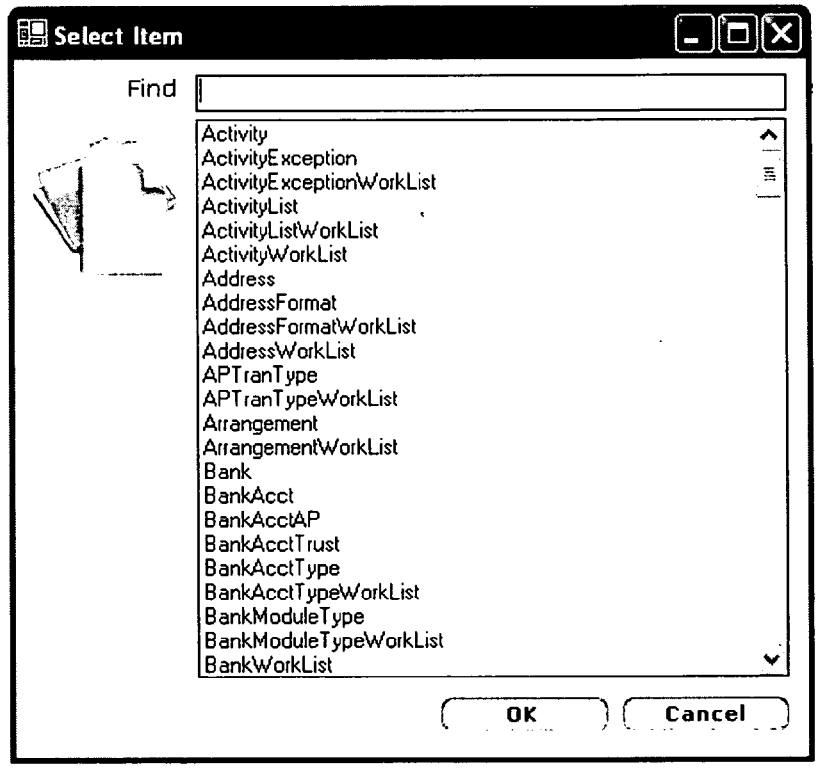

Enter the first few letters of the process name in the Find field, or use the scroll bar to locate the process.

3. Select the page and choose OK, or choose Cancel to close this dialog box without adding an existing process.

4. The selected page displays in the tree in the Project browser.

- Refer to Process Properties Field Definitions for information about the fields in the Properties tab.

- For information about creating a process, refer to Adding Steps to a Process.

5. Click SAVE in the upper right corner of the Process Designer to save the process.

1.23.4 Adding Steps to a Process

To add steps to a process, do the following.

1. Display the Process Designer as described in Accessing the Process Designer.

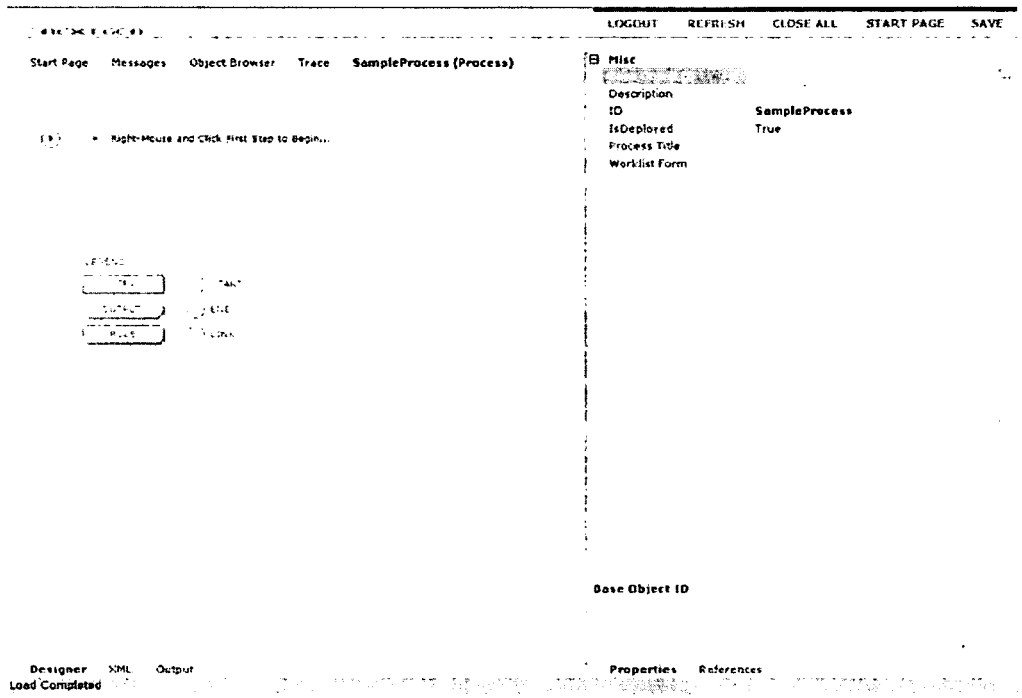

2. Assign the base object ID and worklist form for this process in the Properties tab as described in Process Properties Field Definitions.

Note: The worklist is currently the only service supported.

3. Right-click the ⊙ icon and select First Step.

4. A menu displays all the forms and business objects associated with the assigned base object ID (Address in the following example).

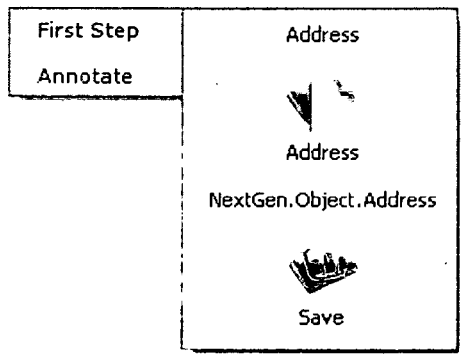

Select one of the following options:

- *Base Object ID Name*

- Save – There are two outputs: a successful save or a failed save.

4. The FIRSTSTEP step icon displays in the Designer tab.

Type a name for this step in the step icon, or enter the name in the ID field in the Properties tab. Refer to Step Properties Field Definitions for more information. Press ENTER to continue.

5. Right-click the step icon and select New Output, and then select one of the following options:

- Custom – Create customized output for this step. Refer to Adding Custom Output to a Step for more information.

- Release - Cancel – Refer to Adding Release-Cancel Output to a Step for more information.

- Accept - Reject – Refer to Adding Accept-Reject Output to a Step for more information.

6. To add another step, right-click the appropriate icon and select Next Step.

7. A menu displays all the forms and business objects associated with the selected base object ID (Address in the following example).

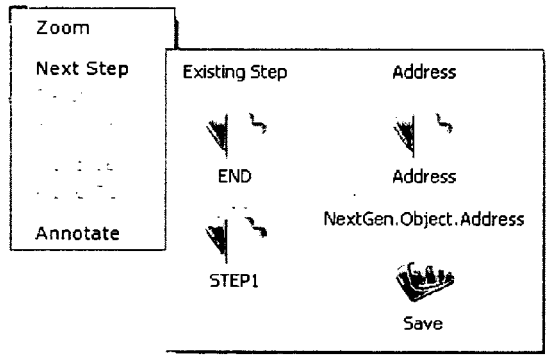

Select one of the following options:

- END – End the current process at this step. An arrow and the ⊗ icon display to the right of the step.

- *Step Name* – need definition. An arrow and an icon containing the step number display to the right of the step (for example, ①).

- *Base Object ID Name* –

- *Save* – There are two outputs: a successful save or a failed save.

8. To add additional steps, repeat steps 6 and 7.

9. When finished, click SAVE in the upper right corner of the Process Designer to save the process.

*1.23.4.1   Adding Notes to Steps*

Notes can be added to any step or output control in the Process Designer by doing the following.

1. Right-click the step or control and select Annotate.

2. A text box in which you can enter notes displays below the step or control.

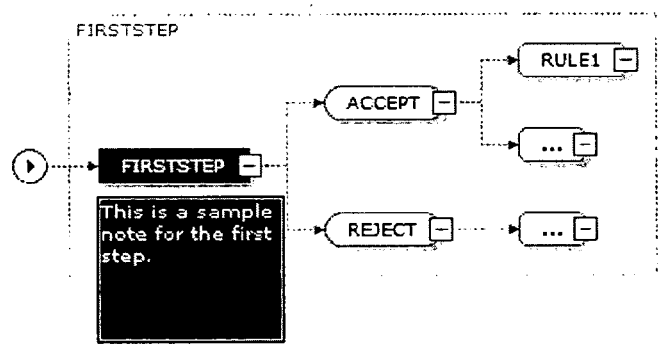

3. Enter a note and then press ENTER. The note displays below the step or control.

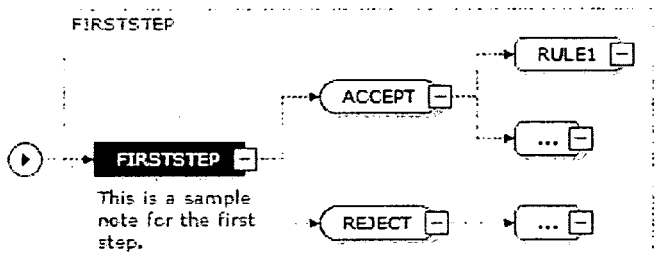

*1.23.4.2   Adding an Output Step*

An output step in the Process Designer represents the paths from the current step for the user (if the step contains a user interface) or the system (if the step contains a business object). Output steps that are appended to a step display as process actions in the Process Action menu in the user interface. A process step can have at least one output per step.
The following types of output steps can be added. Refer to Adding Steps to a Process for further instructions.

- Custom
- Release - Cancel
- Accept - Reject

Adding a Custom Output Step

A custom output step can be created in the Process Designer for processes that do not require a Release-Cancel or Accept-Reject output step.
To add a custom output step, do the following.

1. Display the Process Designer as described in Accessing the Process Designer.

2. Add a step as described in Adding Steps to a Process.

3. Right-click the step icon to which you want to add custom output and select New Output>Custom.

4. OUTPUT1 displays in an output icon linked to the step icon. Type a name for this output in the icon, or enter the name in the ID field in the Properties tab. Refer to Output Step Properties Field Definitions for more information. Press ENTER to continue.

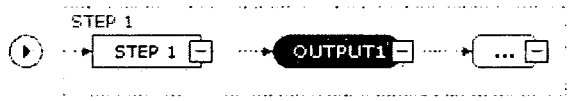

5. Enter the remaining fields in the Properties tab as described in Output Step Properties Field Definitions.

6. To create a new rule control for the output, right-click the output icon and select New Rule. A rule control represents the condition that must be satisfied before the process can proceed to the next step.

Note: For every rule that handles a success condition, there must be a corresponding rule that handles a failure condition, and the last output condition must be ELSE.

7. RULE1 displays in a rule icon linked to the output icon. Enter a name for this rule in the ID field in the Properties tab and press ENTER. Refer to Rule Properties Field Definitions for more information.

8. Enter the remaining fields in the Properties tab as described in Rule Properties Field Definitions.

9. To add another step to the rule icon or the ⎡⋯⎤ (else) icon, right-click the icon and select Next Step.

10. A menu displays all the forms and business objects associated with the selected base object ID (Address in the following example).

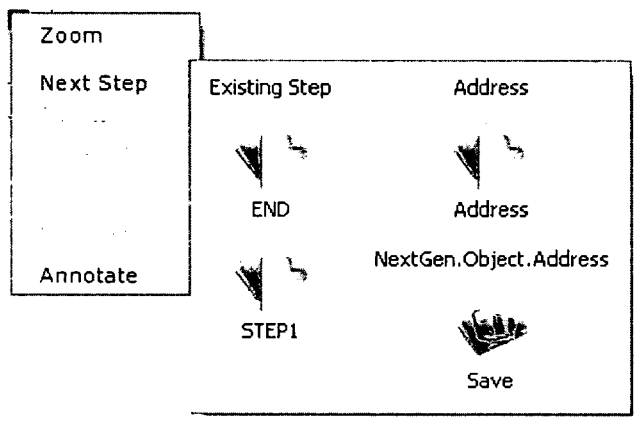

Select one of the following options:

- END – Terminate the current process at this step. An arrow and the ⊗ icon display to the right of the step.

- *Step Name* – Return to the indicated step. An arrow and an icon containing the step number display to the right of the step (for example, ①).

- *Base Object ID Name* – .

- Save – There are two outputs: a successful save or a failed save.

Note: If the next step is already used by another step, a link control is automatically created for the selected item.

11. When finished, click SAVE in the upper right corner of the Process Designer to save the process.

Adding a Release-Cancel Output Step

To add a Release-Cancel output step in the Process Designer, do the following.

1. Display the Process Designer as described in Accessing the Process Designer.

2. Add a step as described in Adding Steps to a Process.

3. Right-click the step icon to which you want to add a Release-Cancel output step and select New Output>Release-Cancel. Output icons for RELEASE and CANCEL are linked to the step icon.

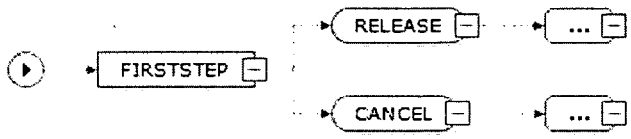

4. To create a new rule control for the output, right-click the output icon and select New Rule. A rule control represents the condition that must be satisfied before the process can proceed to the next step.

Note: For every rule that handles a success condition, there must be a corresponding rule that handles a failure condition, and the last output condition must be ELSE.

5. RULE1 displays in a rule icon linked to the output icon. Enter a name for this rule in the ID field in the Properties tab and press ENTER. Refer to Rule Properties Field Definitions for more information.

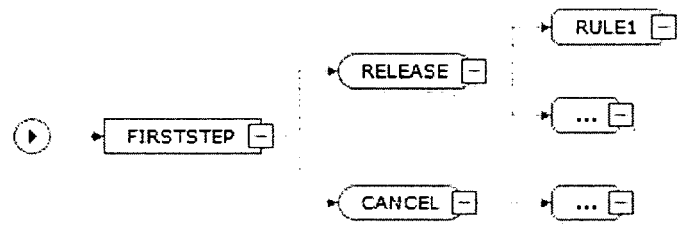

6. Enter the remaining fields in the Properties tab as described in Rule Properties Field Definitions.

7. To add another step to the rule icon or the ⬚ (else) icon, right-click the icon and select Next Step.

8. A menu displays all the forms and business objects associated with the selected base object ID (Address in the following example).

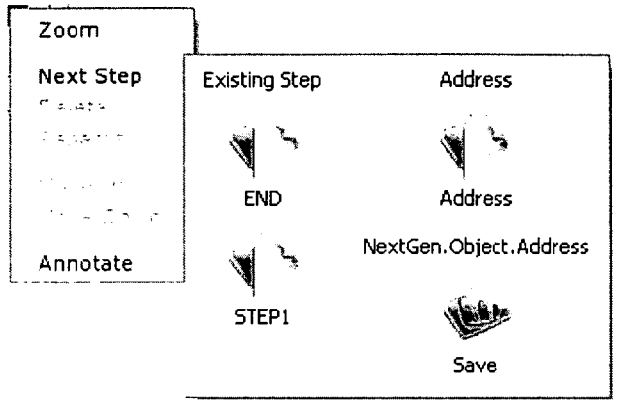

Select one of the following options:

- END – Terminate the current process at this step. An arrow and the ⊗ icon display to the right of the step.

- *Step Name* – Return to the indicated step. An arrow and an icon containing the step number display to the right of the step (for example, ①).

- *Base Object ID Name* – .

- Save – There are two outputs: a successful save or a failed save.

Note: If the next step is already used by another step, a link control is automatically created for the selected item.

11. When finished, click SAVE in the upper right corner of the Process Designer to save the process.

Adding an Accept-Reject Output Step

To add an Accept-Release output step in the Process Designer, do the following.

1. Display the Process Designer as described in Accessing the Process Designer.

2. Add a step as described in Adding Steps to a Process.

3. Right-click the step icon to which you want to add an Accept-Reject output step and select New Output>Accept - Reject. Output icons for ACCEPT and REJECT are linked to the step icon.

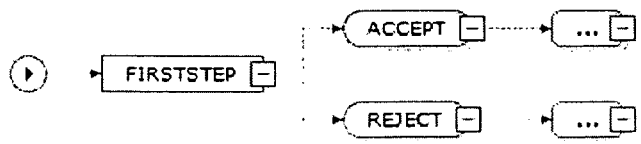

4. To create a new rule control for the output, right-click the output icon and select New Rule. A rule control represents the condition that must be satisfied before the process can proceed to the next step.

Note: For every rule that handles a success condition, there must be a corresponding rule that handles a failure condition, and the last output condition must be ELSE.

5. RULE1 displays in a rule icon linked to the output icon. Enter a name for this rule in the ID field in the Properties tab and press ENTER. Refer to Rule Properties Field Definitions for more information.

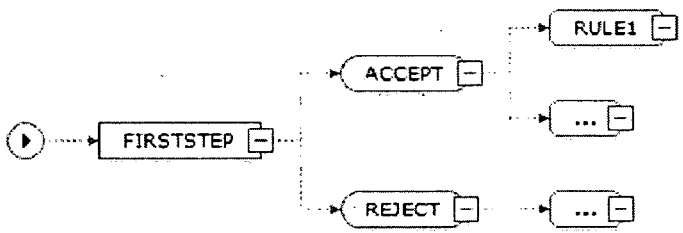

8. Enter the remaining fields in the Properties tab as described in Rule Properties Field Definitions.

9. To add another step to the rule icon or the ⌞…⌟ (else) icon, right-click the icon and select Next Step.

10. A menu displays all the forms and business objects associated with the selected base object ID (Address in the following example).

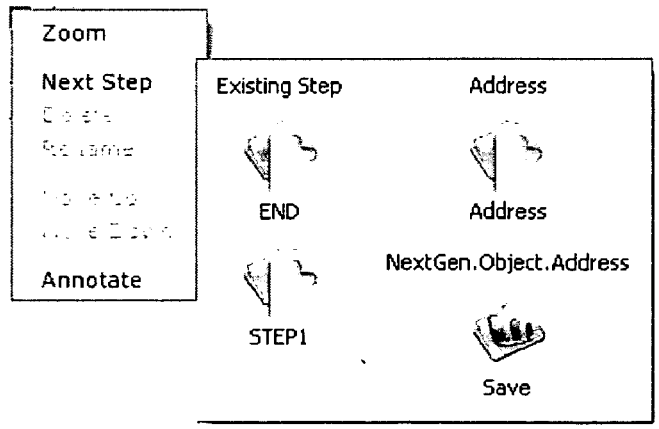

Select one of the following options:

- END – Terminate the current process at this step. An arrow and the  icon display to the right of the step.

- *Step Name* – Return to the indicated step. An arrow and an icon containing the step number display to the right of the step (for example, ).

- *Base Object ID Name* – .

- Save – There are two outputs: a successful save or a failed save.

Note: If the next step is already used by another step, a link control is automatically created for the selected item.

11. When finished, click SAVE in the upper right corner of the Process Designer to save the process.

Output Step Properties Field Definitions

Select an output step in the Designer tab of the Process Designer and then enter or modify the fields in the Properties tab as defined below.

| Field Name | Description |
| --- | --- |
| *Misc* | |
| Caption | Enter a label for the output step. The label displays in the process output step in the user interface. This field is required. |
| ID | Enter a unique identifier for this output step. This field is required. |
| IsDataValidated | Click in this field and select TRUE if the data is to be validated. |
| Remove Unchanged Row | Click in this field and select TRUE if an unchanged row should be removed. |

Rule Properties Field Definitions

Select a rule in the Designer tab of the Process Designer and then enter or modify the fields in the Properties tab as defined below.

| Field Name | Description |
| --- | --- |
| *Misc* | |
| ID | Enter a unique identifier for the rule. This field is required. |

| | |
|---|---|
| IsAggregate | Click in this field and select True from the drop-down list if the rule's formula is applied to the entire collection of items on the worklist. Select False if the formula is applied to each worklist item only. The default is False. |
| IsComplex | Click in this field and select True from the drop-down list if the rule's formula needs to be parsed. The default is False. |
| Priority | Click in this field and select LOW, MEDIUM or HIGH from the drop-down list to indicate the rule's priority. |

*1.23.4.3 Step Properties Field Definitions*

Select a step in the Designer tab of the Process Designer and then enter or modify the fields in the Properties tab as defined below.

| Field Name | Description |
|---|---|
| *Misc* | |
| Custom Process Page | If a custom page was created outside of the Exemplary Designer Interface, enter the name of the custom page. Pages and interfaces created outside of the program can be included in the Exemplary workflow process. |
| ID | Enter a unique identifier for this step. The identifier can also be entered or modified in the step icon in the Designer tab. The default identifier for the first step in the process is FIRSTSTEP. The default identifier for each subsequent step is STEP*n*, where *n* is a sequential number that uniquely identifies each step. |
| Page ID | Enter a unique identifier for the page that was selected and assigned to the step. This field is required. |

1.23.5 Removing a Process

A process can be removed from a project without being deleted from the system. To remove a process from the project, do the following.

- In the Project tree in the Exemplary IDE Start Page, right-click the process to be removed and select Exclude From Project.

1.23.6 Adding References to a Process

References such as objects and business objects can be added in the Process Designer when coding the rules for an object.
To add references to a process, do the following.

1. Display the Process Designer as described in Accessing the Process Designer.

2. Click the References tab in the lower right area of the page.
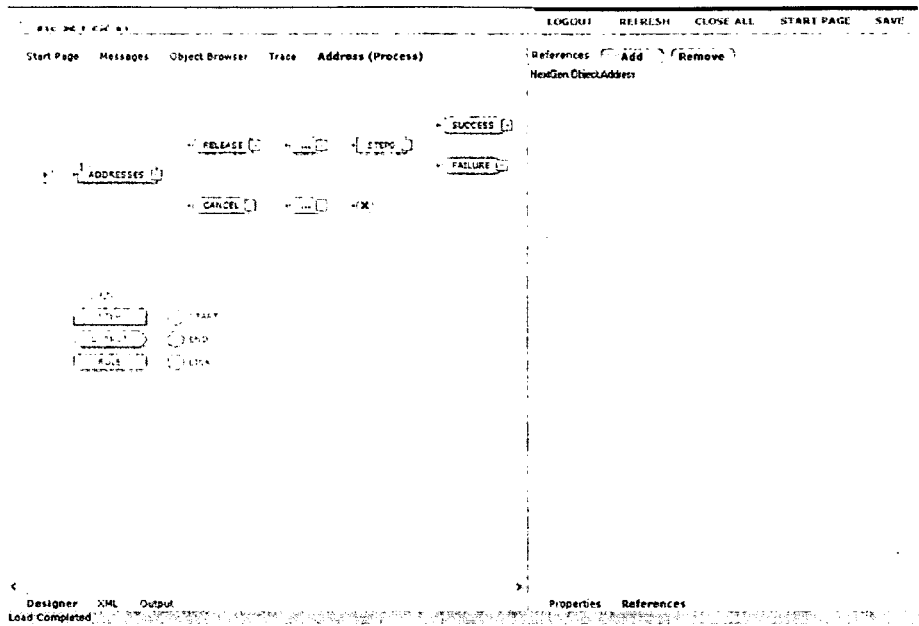
3. Note that the base object automatically displays. Choose the Add button to add a reference.
4. The Add Reference dialog box displays.

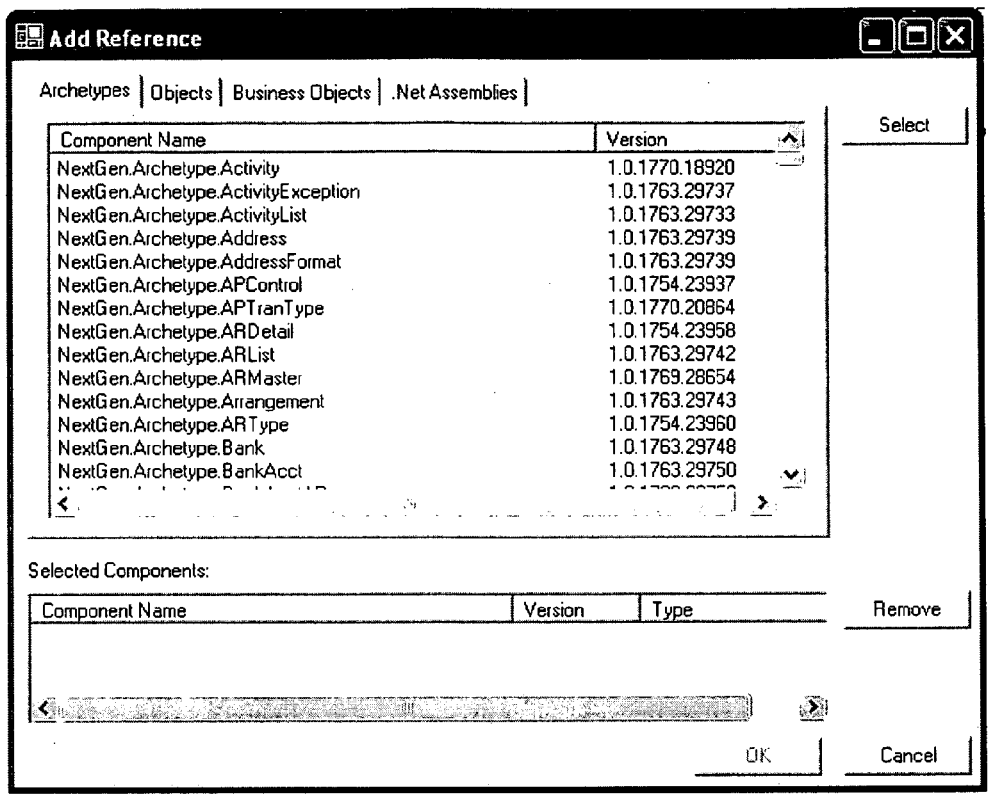

1.23.7  Process Properties Field Definitions

Select the process in the Designer tab of the Process Designer and then enter or modify the fields in the Properties tab as defined below.

| Field Name | Description |
|---|---|
| *Misc* | |
| Base Object ID | A base object is the object from which the process inherits. Enter the unique ID of the base object, or click in this field and then click the ... button to select the base object. This field is required. |
| Description | Enter a description of the process. |
| ID | Enter a unique identifier for the process. This field is required. |
| IsDeployed | Click in this field and select True from the drop-down list if this process should display in the Process menu once it has been released to general system availability. The default is True. This is a required field. |
| Process Title | Enter a title for the process. The title displays on the home page and identifies the process being designed. |
| Worklist Form | Enter the name of the worklist form associated with the process in the Framework Services area when Worklist Service is selected, or click in this field and then click the ... button to select the form. |

2 Business Object Designer Overview (This section is still under construction.)
The Business Object Designer allows you to define a business object that can be used throughout the Exemplary application suite. A business object contains the logic and computation required to implement work flow processes.

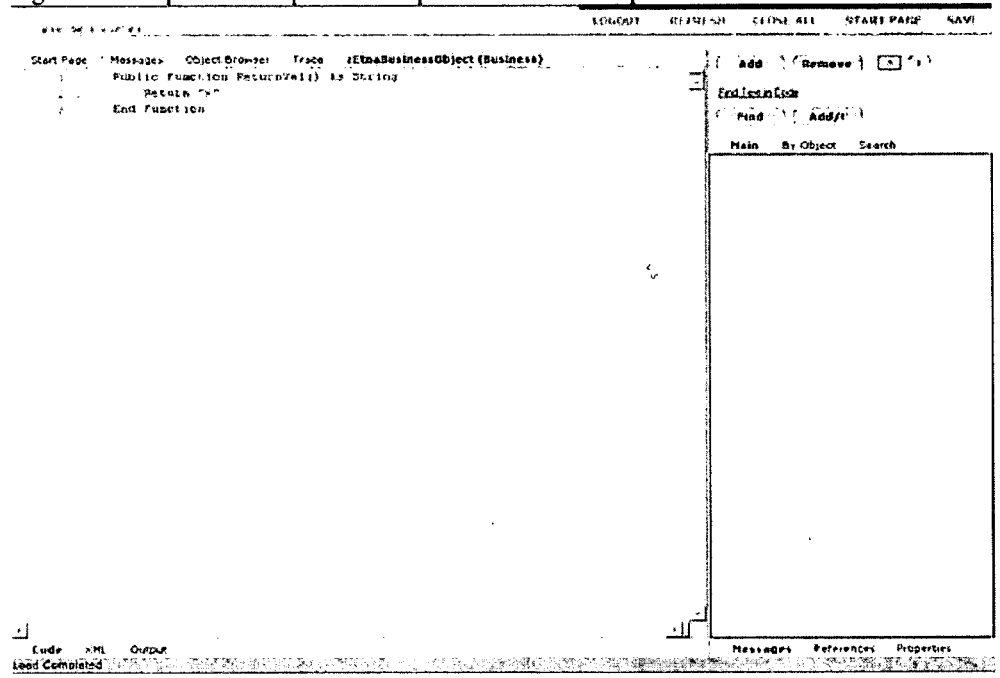

The Business Object Designer is composed of the following sections:

- Code tab – Develop code. Refer to Working with Business Objects for further information..

- XML tab – Displays the XML code generated from the Business Object Designer. Refer to XML tab for further information.

- Output tab – Displays any error or generated code resulting from selecting the SAVE option. Refer to Output tab for further information.

- Messages tab –

- References tab – Add and remove references when coding rules. Refer to References Tab for further information.

- Properties tab – Add or change information about the displayed process. Refer to Business Object Properties Field Definitions for further information.

2.1  Accessing the Business Object Designer

The Business Object Designer can be accessed by performing one of the following actions from the Project browser in the Exemplary IDE Start Page:

- Double-click an object listed under Business Object.

- Right-click a listed business object and select Edit.

- Right-click Business Object and select either Add New Business Object Item or Add New – use standard XML designer. The Business Object Designer displays after you enter a name for the new business object in the Add New Business Object dialog box (refer to Adding a New Business Object for further information).

- Right-click Business Object and select Add an Existing Business Object Item. The Business Object Designer displays after you select the object from the Select Item dialog box (refer to Adding an Existing Object for further information).

Once you have accessed the Business Object Designer and then open another designer, you can return to it by clicking the *Business Object Name* (Business Object) tab at the top left of the Exemplary window.

2.2  Working with Business Objects 2.2.1  Adding a New Business Object

To add a new business object to the project, do the following.

Note: To add a new business object using the standard XML designer, refer to Adding a New Business Object using the XML Designer.

1. In the Project tree in the Exemplary IDE Start Page, right-click Business Object and select Add New Business Object Item.

2. The Add New Business Object dialog box displays. Enter a name for the object in the Item ID field and then choose OK, or choose Cancel to close this dialog box without creating a new object.

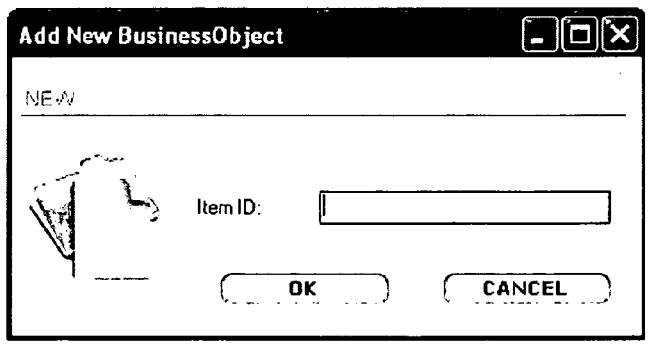

3. The new business object displays in the Business Object Designer.

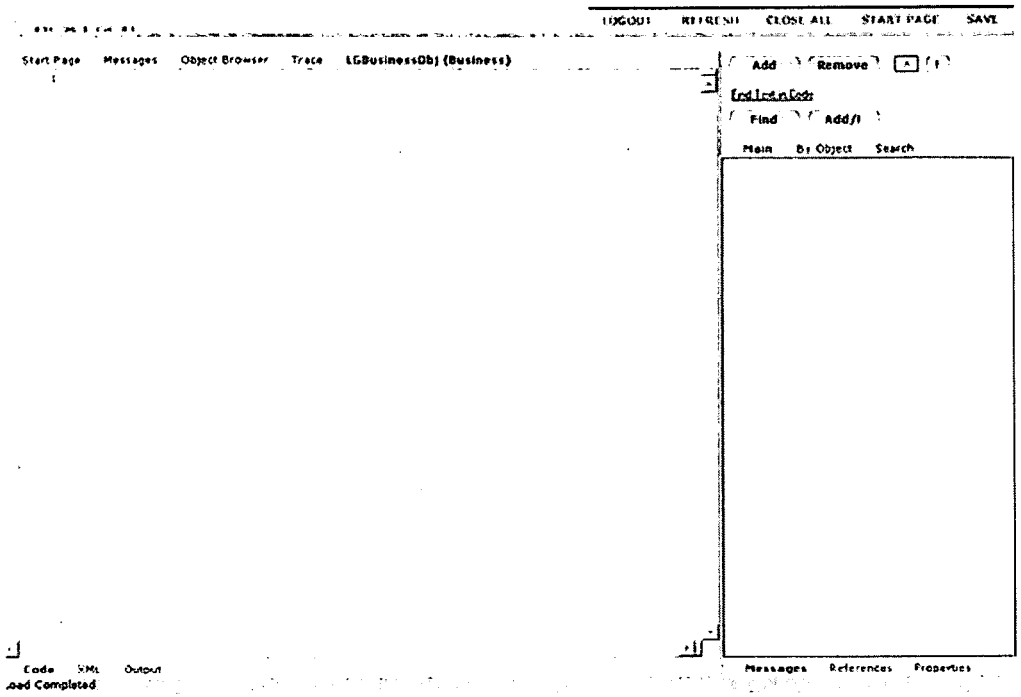

- Refer to Business Object Properties Field Definitions for information about the fields in the Properties tab.

4. Click SAVE in the upper right corner of the Business Object Designer to save the new business object.

2.2.2  Adding a New Business Object using the XML Designer

To add a new business object to the project using the standard XML designer, do the following.

1. From the Project tree in the Exemplary IDE Start Page, right-click Business Object and select Add New – use standard XML designer.

2. The Add New Business Object dialog box displays. Enter a name for the business object in the Item ID field and then choose OK, or choose Cancel to close this dialog box without creating a new business object.

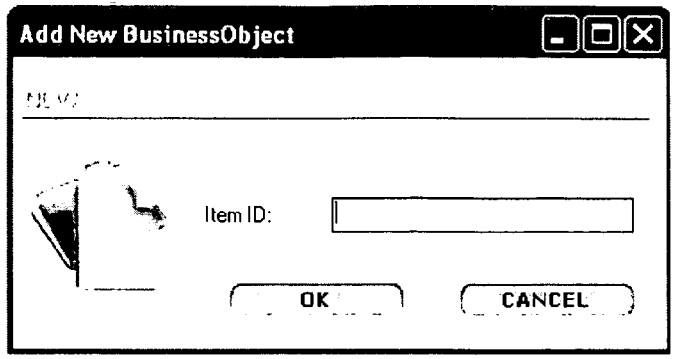

3. The new business object displays in the Business Object Designer.

4. Click SAVE in the upper right corner of the Business Object Designer to save the new business object.

2.2.3 Adding an Existing Business Object

To add an existing business object to the project, do the following.

1. From the Project browser in the Exemplary IDE Start Page, right-click Business Object and select Add an Existing Business Object Item.

2. The Select Item dialog box displays.

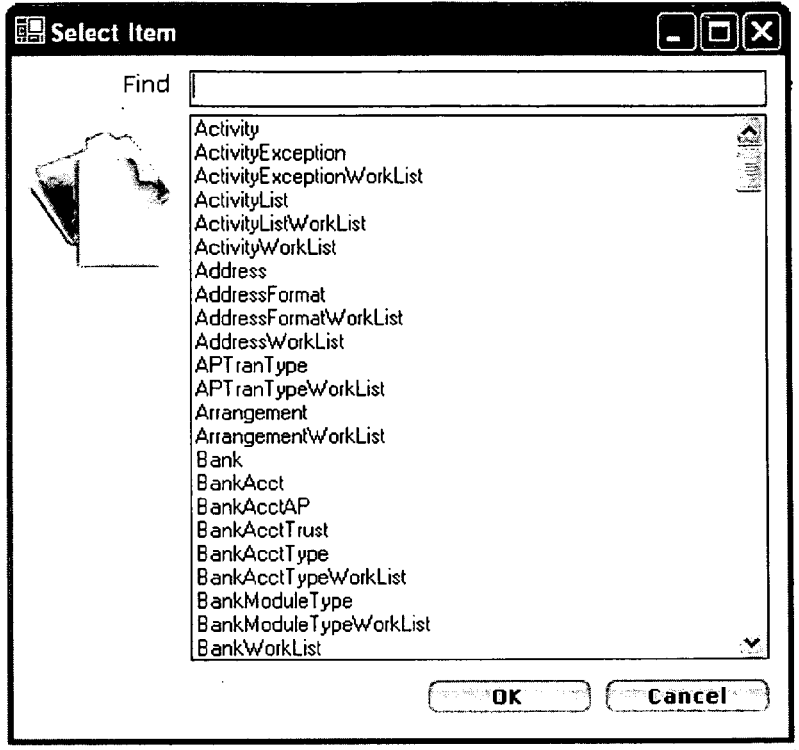

Enter the first few letters of the business object name in the Find field, or use the scroll bar to locate the business object.

3. Select the business object and choose OK, or choose Cancel to close this dialog box without adding an existing business object.

4. The selected business object displays in the tree in the Project browser.

5. Click SAVE in the upper right corner of the Business Object Designer to save the business object.

2.2.4  Removing a Business Object

A business object can be removed from a project without being deleted from the system. To remove a business object from the project, do the following.

- In the Project tree in the Exemplary IDE Start Page, right-click the business object to be removed and select Exclude From Project.

2.2.5 Business Object Properties Field Definitions

Select *BusinessObjectName* (Business) in the Object tab of the Business Object Designer and then enter or modify the fields in the Properties tab as defined below.

| Field Name | Description |
|---|---|
| *Misc* | |
| ID | |
| *Options* | |
| Code Language | |

3 Message Designer Overview

This section is under construction.

4 XML Tab

Note: The XML tab only displays in the internal version of Exemplary.

The XML tab displays the XML code that is generated from the selected designer. It allows you to review the XML code and edit it if necessary. Any modifications made in this tab are reflected in the selected designer if the XML code successfully validates against the schema.

5 Output Tab

Note: The Output tab only displays in the internal version of Exemplary.

The Output tab displays any error or generated code resulting from selecting the SAVE option in the selected designer.

6 References Tab

This section is under construction.

7 Import Tab

This section is under construction.

Appendix A: Sample Exemplary Application

This section is under construction.

8 Appendix B: Custom Code Samples

This section is under construction.

9

10 Appendix C: Exemplary Controls

Exemplary data controls include dates, narrative, small lists and big lists, as well as other common controls such as title bars.

10.1 Page Controls

The page control specification details the user interactions and the system rules for all Exemplary data controls. Exemplary control behaviors are framework-prescribed by data type designation. Therefore a specific instance of the control cannot be customized.

Note: If a control is defined as required on a form, the control's label displays an asterisk (*).

Note: A text box that is dependent on a parent text box must be disabled until the parent text box is propagated. This dependency is defined in the data object and lookup definitions. If argument values are defined for either a data object or a lookup definition, then the dependent functionality is enabled.

10.1.1 Page Properties Elements

| Control Type | Description | Elite (Data) Type | Condition Statement |
|---|---|---|---|
| Textbox | The Textbox control allows users to update the value of text strings. It automatically wraps text prior to displaying it if the alphanumeric string is too large to be displayed across the length of the control. The system can index narrative data to facilitate fully indexed context searches.<br>If a Textbox control is a dependent control, it must remain disabled until the parent control is populated. | EliteString | |
| Small List (Drop Down) | The Small List control is a text box control with special functionality used to "lookup" values in the designated archetype. It is a combo-box control that displays a list of alphanumeric values for users to select from. A text box displays as a Small List control if the archetype's IsBigList property is set to False.<br>The Small List control is only propagated with one value, regardless of the number of columns/attributes defined to be rendered in the small list/drop down control. The control's associated archetype query definition determines the list of available value(s) in the small list/drop down. These values are selected from the list of Query Result values in the archetype's query definition.<br>A filter can be defined for the small list when its archetype is created. To implement specific business logic associated with small list controls, the application developer can also define custom filters to apply to the drop down | RELATIONSHIP | To an archetype where the IsBigList property = FALSE. |

| Control Type | Description | Elite (Data) Type | Condition Statement |
|---|---|---|---|
| | (at the archetype level).<br>When entering a process (page), if a small list contains a value that is no longer valid, the system retains the invalid value. If users select the control with the invalid value, the system only makes available the currently valid values in the small list. Users must cancel the edit action or exit the process page to avoid changing and persisting the control's value.<br>When users enter a value in the control, the system uses type ahead to filter the available options in the drop down. If users enter a value that exactly matches a value in the drop-down list, the system propagates the matched value in the control.<br>Selecting a small list control renders a drop- down list of all attribute(s) defined to display in a drop down. If the small list control has associated filters, they are applied prior to rendering the value for the small list. The control displays such that the current value is maintained while the valid values are listed in the drop-down combo box.<br>Valid values for a small list control are all the configured, valid values defined for the subject archetype or null if the control does not require a value. The values should be rendered in the base configured language. | | |
| Big List (Text Box) | The Big List control is a text box control that displays alphanumeric values and is associated with a lookup query (a query that allows users to provide criteria to search for existing data). A text box | RELATIONSHIP | To an archetype where the IsBigList property = TRUE |

| Control Type | Description | Elite (Data) Type | Condition Statement |
|---|---|---|---|
| | displays as a big list control if its associated archetype's IsBigList property is set to True. Archetypes that create big list controls must have defined quick find fields. Big list controls must always be associated with a Query Definition and a Quick Find List. For example, a Matter big list control has matter number, matter alias and matter description as quick finds. If users do not know exactly what they are searching for and enter the matter alias, the control is populated with the correct matter number using the matter archetype description attribute. Users can directly enter data into the big list control or use the control's lookup query feature. Choosing the control's Query button displays the LookupQuery interface in a new window propagated with any string existing in the text box control. When users return to the subject process page, the big list control is updated with the selected value from the LookupQuery process, if any. The system can index narrative data to facilitate fully indexed context searches. Any selected value(s) in a big list control must be viable system items. For example, if the big list control is to contain a supervisor, the value in the control must be a viable, active person entity. | | |
| Date (Text Box) | The Date control displays local system- formatted dates and is associated with a GUI calendar control that allows users to select a date. | EliteDate | |

| Control Type | Description | Elite (Data) Type | Condition Statement |
|---|---|---|---|
| | Users can manually enter a date in the local system date format or use the control's associated Calendar control to select a date in a valid date format. Choosing the Calendar button displays a control that allows users to select a date. When users return to the subject process page, the control is updated with the selected value, if a selection was made.<br>For pages that contain starting and ending date controls, if these dates are entered, the starting date must always be prior to the ending date. For pages that contain effective dated fields, the effective date must be unique in each collection of effective dated items. | | |
| Date Time (Text Boxes) | The Date Time controls are associated controls that display the date and time in the local system format.<br>Users can manually enter the date and time, or use the system's GUI to select a date and time. All date control values are saved in the database as Date Time values in an installation-defined common time period. | EliteDateTime | |
| Checkbox | The Checkbox control indicates whether the associated attribute is true or false.<br>If the check box is selected, the system records that the associated attribute is true; otherwise it records that the attribute is false. EliteBoolean data items must always have a 0 (FALSE) or 1 (TRUE) value; no null values are allowed.<br>You can specify whether the Checkbox control's caption should be displayed to the left or the right | EliteBoolean | |

| Control Type | Description | Elite (Data) Type | Condition Statement |
|---|---|---|---|
| | of the control. | | |
| Integer (Text Box) | The Integer control displays raw numeric values without any applied formatting. | EliteInteger | |
| Decimal (Text Box) | | EliteDecimal | |
| Money (Text Box) | The Money control displays monetary values in fractional number, in a format that is user/instance specific.<br>The system displays money in a format associated with the user or instance. For example, if users are entering or viewing amounts in pounds (GBP), the £ sign displays before the amount. The number of decimals allowed is determined by the defined currency code.<br>The Money control must be associated with a currency code, an operating unit and a conversion date. | EliteMoney | |
| MoneyNoRound (Text Box) | The MoneyNoRound control allows entry and display of a currency field with multiple decimal places, regardless of the currency code designation. | EliteMoneyNoRound | |
| Narrative | The Narrative control displays and allows users to interact with a very long text string. It allows users to review and enter formatted text (bolding, line breaks, underlining, etc.)<br>The system can index narrative data to facilitate fully indexed context searches.<br>Note: Currently an archetype attribute can be created of a Narrative data type, but - the Narrative control is not supported at the object and form levels. | EliteNarrative | |
| MultiLine (Text Box) | The MultiLine control displays alphanumeric strings that can include return/carriage return characters. It allows the system to | EliteMultiLineString | |

| Control Type | Description | Elite (Data) Type | Condition Statement |
|---|---|---|---|
| | retain the formatted text. For example, this control is ideal for formatted address information. | | |
| MultiLanguage (Textbox) | The MultiLanguage control allows users to create values for the same control in many languages. A MultiLanguage text box is similar to a standard text box with the exception of an additional control that allows users to access the Descriptions In Other Languages control.<br>When a Multilangauge control is added as an attribute to an archetype, the string is a GUID that points to the actual Multilanguage values. The MultiLanguage string attribute can be set as an alias attribute in an archetype definition and displays the language according to the users' locale. If the locale does not have a matching language, the system-configured language display rules apply.<br>Selecting the Descriptions in Other Languages control displays the MultiLanguage pop-up window. this window allows users to provide values for the MultiLanguage control in the languages defined in the system. | MultiLanguage | |

| Control Type | Description | Elite (Data) Type | Condition Statement |
|---|---|---|---|
| EliteRelation- ship | The EliteRelationship data type allows users to indicate the archetype attribute looks up another archetype. An attribute that has an EliteRelationship data type derives its data type from the attribute it is related to in the other archetype.<br>If an attribute is designated as a relationship, the system joins the subject attribute to the destination archetype's key attribute: i.e., the system must inherently understand how one archetype is related to another. The system joins the source archetype attribute to the target archetype's key attribute. | EliteRelationship | |
| EliteIdentity | The EliteIdentity data type is a numeric sequence that allows auto numbering. EliteIdentity attributes are sometimes assigned as the key attribute on archetypes to prevent joins and result sets that include large EliteID (GUID). | EliteIdentity | |
| EliteID | The EliteID data type is a system-generated unique identifier (GUID) associated with every row in the system. This enables all records to be monitored across the system whether they be in draft, in a process or stored in the database. For every archetype created in Exemplary, an EliteID data type attribute is automatically added to the archetype definition, and is also automatically set as the archetype's key attribute. The name of the attribute is *TableName*ID. For example, the entity archetype's EliteID attribute is EliteID. | EliteID | |
| Segmented Control | The Segmented Control displays a single control that is composed of multiple attributes within an | RELATIONSHIP | To a Segmented Archetype |

| Control Type | Description | Elite (Data) Type | Condition Statement |
|---|---|---|---|
| | archetype. For example, a GL account number could be composed of the natural number, company code, office code and unit.<br>If an attribute is a RELATIONSHIP to the segmented archetype, the segmented control displays like a standard text box, with each segment delimited by the delimiter defined for the destination archetype. The width of each segment within the segmented control is determined by the segment's defined length.<br>In a grid, by default, segmented controls display in full. If the column width is smaller than the length of the segmented control, the value is truncated.<br>For a Big List control, users can query on the entire segmented control or press CTRL-Q to query on each segment individually. | | |
| Button_Action | The Action Method button allows developers to associate and execute custom code under a button control. The button can be added to the form and take action on more than one item. For example, in the Grid control, an associated custom code can be defined that adds 10 rows to the grid.<br>Adding one action method to a form in the Form Designer creates a button on the form. Adding another action method on top of the previous action method converts the control into a drop-down control that lists the action methods. | ActionMethod | |
| Button_Quer | The Query Launch button launches | Query Launch | |

| Control Type | Description | Elite (Data) Type | Condition Statement |
|---|---|---|---|
| y | a specified query process that returns a value or values.. | | |
| Button_Process | The Process Launch launches a specified process or sub-process and expects a return value. Additional actions, such as update controls on a page, can be performed on the returned value by calling the Action Method button. | Process Launch | |
| Hyperlink | The Hyperlink control offers users a method of navigating to a new or different process or sub-process from the current process page. For example, clicking a hyperlink can display a new browser window with a list of existing entities or refresh the current process page to display a sub-process page. Selecting the hyperlink refreshes the current page to display a new page with the destination defined for the subject hyperlink. | Form Control | |
| Label | The Label control displays static text. Its value should be able to be overridden.<br>For example, if a code has an associated description in another language, the label should display the static text, "You have descriptions in other languages." Otherwise the label should display the static text, "You have NO descriptions in other languages." | Form Control | |
| Line | The line is a static framework-provided graphic that offers no user interaction. The location, orientation and length are set at the form level for each instance of a line. | Form Control | |
| Frame | The frame is a static framework graphic that serves as a container for other controls on a page. The framework does not provide any user interaction. The size and | Form Control | |

| Control Type | Description | Elite (Data) Type | Condition Statement |
|---|---|---|---|
| | position of the frame are set at the form level for each instance of a frame. | | |
| Grid | Refer to Grid Controls. | Form Control | |
| List Drop Down | This is a drop-down control (for example, AttachmentType or RoundingMethod) whose available options are defined by internal Thomson Elite users/developers. The options are typically configured in the list type setup table. The values in the list can only be modified by Thomson Elite users/developers since core system behavior and logic are contingent on the values in these lists. | Form Control | |

10.2 Grid Controls

Exemplary grids are key display controls used for the display of both read-only and active information. Although there are special types of grid controls such as WorkList Grids, Result Grids and Effective Dated Grids, all grids should exhibit consistent behavior, providing users with a familiar and consistent user experience.

Note: Exemplary does not currently allow buttons in grids.

10.2.1 Page Properties Elements

| Grid Component | Condition | Description |
|---|---|---|

| Grid Component | Condition | Description |
|---|---|---|
| Column/Row Header | Required cell/field | If a field is required in all the records displayed in the grid, the column header name is appended with an asterisk (*). For example, if the currency field is required in a rates grid, the label for the currency column displays as * Currency. |
| Row | Colors | Every other row on a grid is highlighted with a background color. |
| | Deleted row | All rows staged for deletion are grayed out. All the data in the row, along with the corresponding status/number column, displays in gray text and cannot be edited. |
| | Adding a row | For users with the security authorization to add rows to grids, a distinct Adding Row control must display at the top of the grid control. When users select this control, the grid is put in edit mode so users can enter values for the row to be added to the grid. The new row is inserted into the grid in the current sort order, if specified. To group newly inserted rows together, users can re-sort the grid by status. The following keys help users enter values in a new row.<br><br>• TAB or ENTER – Move to the next cell. If it is the last cell in the row, a new row is added to the grid in the correct sort order, if specified.<br><br>• ESC – Cancels all user modifications and refreshes the row to an empty/ready state, highlighting the first cell in the row. |
| | New/empty grids | A new grid is one that currently has no data, such as when a page first displays for data entry. It displays with one empty data row, ready for user input. |
| Cell | Right-mouse-click actions | If a cell has associated right-click actions, when users right-click the control, the default action is bolded. |
| Hot Keys – Select Mode | Select mode | The select mode is the default mode in a grid control. When users press F2 or begin to enter information in a cell, the mode switches to edit mode.<br>The following hot keys help users move |

| Grid Component | Condition | Description |
|---|---|---|
| | | around in a grid in select mode.<br><br>• Arrow keys – Select and move focus up, down, left or right one cell and highlight the selected cell's row in a distinct color.<br><br>• END – Selects and moves focus to the last cell of the row.<br><br>• HOME – Selects and moves focus to the first cell of the row.<br><br>• CTRL-HOME – Selects and moves focus to the first cell in the grid.<br><br>• CTRL-END – Selects and moves focus to the lower right, bottommost cell in the grid.<br><br>• CTRL-Left Arrow – Selects and moves focus to the first cell of the row.<br><br>• CTRL-Right Arrow – Selects and moves focus to the first cell of the row. |
| Hot Keys – Edit Mode | Edit mode | The following hot keys help users when they edit the contents of a grid control. The select mode is the default mode in a grid control. When users press F2 or begin to enter information in a cell, the mode switches to edit mode.<br>The following hot keys help users move around in a grid in edit mode.<br><br>• F2 – Changes the mode from select to edit mode.<br><br>• ESC – Cancels any user modifications and switches to select mode in the current cell.<br><br>• TAB – Accepts and validates the entered value and switches to select mode in the next cell (to the right).<br><br>• ENTER – Accepts and validates the entered value and switches to select |

| Grid Component | Condition | Description |
|---|---|---|
| | | mode in the current cell.<br>• CTRL + Q – Displays a query if the cell contains a query control, or a calendar if the cell contains a calendar control.<br>• Left arrow – Moves one character space to the left within the current cell.<br>• Right arrow – Moves one character space to the right within the current cell. |
| Entire Grid | First grid column | The first column of a grid is a status/number column that indicates the status of the row as well as the number of rows in the grid. For example, if the first row in the grid has been deleted, the status/number cell in the status/number column displays X 1.<br>The status indicators display as follows in each row:<br>• Plus sign (+) – The row has been added.<br>• Checkmark – The row has been edited.<br>    • Mouse down – The cells that have been modified in the selected row are highlighted with a red background color.<br>    • Mouse up – The cells and the selected row return to their original color.<br>• X – The row has been deleted. |

| Grid Component | Condition | Description |
|---|---|---|
| | Sorting | The key columns that reorder a grid are visually indicated to users. If users select the designated reorder/sort column header, the control display is refreshed to show the new sort and whether it is in descending or ascending order. Users access the Sort option by right-clicking the column header corresponding to the sortable grid column. The following options are available:<br><br>• Sort – Sorts the grid in ascending order by the subject column. The sorted column is then indicated with an up arrow. If users sort a particular column again, the grid is re-sorted in descending order, indicated with a down arrow.<br><br>• Sort Within – Sorts the grid by the selected column within the existing sort.<br><br>• Default Sort – Restores the grid to the sorting prior to any user-initiated sorts. All rows added by users display at the bottom of the grid.<br><br>For result grids, after users request that the system re-sort the grid, the first row/page of the newly sorted grid is highlighted. |
| | Resize grid columns and rows | If users select and drag any one border of an inner column/row, the grid control is refreshed to display the new width or height of the column or row. If users resize a column or row, the control is constrained by the width/height of the grid display. |
| | Hide columns | If users select and hide one or more consecutive columns of a grid, the grid is refreshed to hide the selected columns and indicate the columns are hidden. If users restore hidden columns, the grid is refreshed to display the selected columns.<br>When users right-click a column or columns, a drop-down list with an option to hide the selected column(s) displays. Users can hide multiple columns by pressing SHIFT and |

| Grid Component | Condition | Description |
|---|---|---|
| | | selecting the columns prior to right-clicking. |
| | Freeze columns | If users freeze a pane (via a right-mouse-click action), the rows above and the columns to the left of the selected cell are frozen: that is, all scrolling of the grid uses the selected cell as the anchor. As users scroll across and down the results grid, the frozen columns/rows remain in place . |
| | Right-mouse-click options | When users right-mouse-click over the display area of a grid control, the following options display in a drop-down control:<br><br>• Copy – Copies all the values displayed in a grid to the clipboard in a format that represents the display in the grid. The application focus returns to the subject process page.<br><br>• Save To File – Opens the client system's file browsing mechanism and allows users to select the location to store the values displayed in the grid. When users designate a location, the values are saved to the specified file format. The default format is a text file. The contents are formatted to represent the display on the grid. The application focus returns to the subject process page.<br><br>• Print Grid – Opens the client system's print options prompts, allowing users to designate the print location. When users select a print location, the grid contents are printed in a format that represents the display in the grid.<br><br>• Remember Preferences – Retains the user preference for this grid. Whenever users access this grid, preferences |

| Grid Component | Condition | Description |
|---|---|---|
| | | including grid sorting, column order, and column size are retained.<br><br>• Set Max Rows – Displays a dialog box that prompts users for the maximum number of rows to display in the subject grid. If users enter a number, the page is refreshed to display the specified number of rows in the current sort order. If users cancel the action, the grid display remains unchanged. |
| | Child form title bar | Refer to Form Display Controls (Child-Level Form). |
| Effective Dated Grids | Security determines display | Effective Dated grids are specialized grid controls that must always contain a start and end date column. They are always sorted in a reverse date order. If users add a new row to an Effective Dated grid, the row is always inserted at the top of the grid. Users without security permissions can only edit the effective and future dated rows; all out-of-date-scope items display as read-only rows. If users have edit security permissions, all items/rows in the grid can be edited. |
| QueryResultsGrid | | The QueryResultGrid is a grid that displays the results from executing a query. The fields it displays by default are determined by its associated archetype definition. It only displays additional fields/columns if users provided a criteria for a field/column that is not defined to display in the QueryResultGrid by default. The additional column displays at the end of the |

| Grid Component | Condition | Description |
|---|---|---|
| | | grid. |

10.3 Page Display Controls (Parent-Level Page)

Exemplary pages are composed of individual, reusable forms. Pages are the fundamental mechanisms for displaying information to and capturing information from the user. Each page has distinct features and functionality.

10.3.1 Page Properties Elements

| Component | Description | Required? | Contingent Display? |
|---|---|---|---|
| Page | A page is the top level or parent level of a collection of forms. Its unique feature is that it can only have form-type views; its grid-type view is its associated worklist page.<br>All pages are built as scrollable pages with collapsible child level forms.<br>An anchor is created and displays in the TOC/Tabs area of the left navigation bar for each first-level child form contained in the page. | | |
| Page-Border | A border outlines every page to clarify the page border to users. | Y | N |
| Page-TitleBar | The page's title bar provides context within the application, and if multiple views of the page are defined, allows users to change the layout/view of the page.<br>Each parent form/page has a Title Bar control that is composed of the following components:<br><br>• Page-TitleBarHeader<br>• Page-View | Y | N |
| Page-TitleBarHeader | The Page-TitleBarHeader control on the page's title bar provides users with context within the application. It is an alphanumeric string that cannot be longer than 64 characters. | Y | N |
| Page-View | The Page-View control on parent-level forms is a small list/drop-down list that includes all the configured form-type views for the subject parent form.<br>Only single form-type views display as valid options for parent-level forms. Parent-level forms always display in the single-form-type display mode. | Y | N |

| Component | Description | Required? | Contingent Display? |
|---|---|---|---|
| | Selecting the Parent-View control displays a drop-down list of the subject parent form's configured and available form-type views. If users select a different view, the page is refreshed, and the control is updated to display the current selected form-type view. | | |
| Page-Actions | A parent-level form's (i.e., a page's) available action options, such as Save, Hold and Delete, display in the Action menu bar to the left of the Process Actions menu in the application area. If there is not enough space in the Action menu bar for all the actions available for the subject form, then a More control displays the additional form actions. A page's actions are contingent upon the needs of the application; therefore, actions can differ on pages. | Y | Y |

10.4 Form Display Controls (Child-Level Form)

Unlike a page with few components in its title bar and its actions located in a specific location in the Exemplary windows, a child-level form's associated controls are contained in a defined area within its title bar. A form's title bar can have cross-control dependencies and contingent behavior.

Note: The Exemplary framework automatically supports one display mode (Exploded/Expanded mode) on all child-level forms that have at least one single-form-type view defined. When any single-form-type view/layout is selected in the child-level form's Form-View control, the FormNav-Expand/Collapse control displays to allow users to view the selected single-form-type view as a list of single-form-type forms. If the form is associated with a data set that has many types, each record displays in the last single-type-form view of its respective type; otherwise, display each record displays using its type's defined default single-form-type view. .

Note: Users' security clearance determines their ability to take actions to all pages and forms. Therefore users must only have access to the actions for which they have security clearance, and all other available options are disabled.

10.4.1 Page Properties Elements

| Component | Description | Required? | Contingent Display? | Contingent Upon... |
|---|---|---|---|---|
| Form-Border | A form border outlines each form within a page and clarifies the boundaries of the form. | Y | N | |
| Form-TitleBar | A form's title bar provides context within the page, and allows users to change the view of the form and take specific actions to the subject data displayed.<br>Each form has a Title Bar control that includes the following components:<br><br>• Form-Collapse/Expand<br>• Form-TitleBarHeader<br>• Form-View<br>• Form-Actions<br><br>Optionally, the Title Bar control can include the following components:<br><br>• Form-Type<br>• Form-Navigation<br><br>If the child-level form is collapsed, its Form-TitleBar control displays the Form-Collapse/Expand and Form-TitleBarHeader controls. Users can only expand the collapsed child-level form. | Y | N | |

| Component | Description | Required? | Contingent Display? | Contingent Upon... |
|---|---|---|---|---|
| Form-TitleBarHeader | The Form-TitleBarHeader control provides users with context within the page. It is an alphanumeric string that cannot be longer than 64 characters. | Y | N | |
| Form-Type | The Form-Type control allows users to view all the sub-classed data separately or collectively. It is required only in title bars for forms that display sub-classed data. The option All and all subclass/types contained within the subject data set are included in the control. For example, for a form that displays people and organizations, the Form-Type control's options could be All, People and Organizations. The value selected in the Form-Type control limits the options available in the Form-View control. For example, if users select a specific subclass type in the Form-Type control, the Form-View control is limited to only list views defined for the selected type. If users select the All option in the Form-Type control, the options available in the Form-View control are limited to any grid view(s) defined to display the different subclasses' common attributes and the Framework option Default Forms. | N | Y | Data set |

| Component | Description | Required? | Contingent Display? | Contingent Upon... |
|---|---|---|---|---|
| Form-View | The Form-View control is a drop-down control that displays and allows users to select a form-type or grid-type view for the subject form. If the form's data set is multi-typed/subclasses, the available views in the Form-View control are contingent on the type selected in the Form-Type control; otherwise the Form-View control displays all available views for the subject If All is selected in the Form-Type control, the Form-View control's available views are all grid-type views defined to display the common elements of all the sub-classed records, and a Framework support view that handles and displays multi-typed data sets (the Default Form view). If users select the Default Form view in the Form-View control, each form displays in its type's defaulted single form-type view or the type's last selected single-form view in the current session. Also, if All is selected in the Form-Type control and Default Form is selected in the Form-View control, the Form-Navigation control displays in each form to allow users to "explode" the form to display each record in the data set as a list of single form-type views, each displayed either in its default single-form-type view or its last selected single-form-type view in the current | Y | Y | Form-Type |

| Component | Description | Required? | Contingent Display? | Contingent Upon... |
|---|---|---|---|---|
| | session. If users "explode" the Default Form view, the form is refreshed to display each record in its defined default single-form-type view or each record's last selected single-form-type view in a list of forms. Otherwise, the available views in the Form-View control are any grid-type views defined for the selected subclass/type. | | | |
| Form-Navigation | The Form-Navigation control allows users to navigate through a collection of data displayed in the single- form-type display mode. It also provides context within the data collection by indicating the ordinal of the current record in reference to all the records in the collection. Each Form-Navigation control includes the following controls:<br><br>• FormNav-FirstRecord<br>• FormNav-Previou Record<br>• FormNav-CurrentRecord<br>• FormNav-NextRecord<br>• FormNav-LastRecord<br>• FormNav-Expand/Collapse<br><br>Any time a form displays a record in a single-form-type view, the Form-Navigation control displays. The following navigation controls can be selected: | | | |

| Component | Description | Required? | Contingent Display? | Contingent Upon... |
|---|---|---|---|---|
| | • FormNav-FirstRecord – Refreshes the form to display the first record in the collection in its default form-type view or its type's last selected form-type view, and updates the FormNav-CurrentRecord indicator to indicate 1 or X, where X is the total number of records in the collection. | | | |
| | • FormNav-PreviousRecord – Refreshes the form to display the previous record in the collection in its default form-type view or its type's last selected form-type view, and updates the FormNav-CurrentRecord indicator to indicate the order of the current record in reference to the collection. | | | |
| | • FormNav-CurrentRecord – Refreshes the form any time a form navigation control is selected. | | | |
| | • FormNav-NextRecord – Refreshes the form to display the next record in the collection in its default form-type view or its type's last selected form-type | | | |

| Component | Description | Required? | Contingent Display? | Contingent Upon... |
|---|---|---|---|---|
| | view, and updates the FormNav-CurrentRecord indicator to indicate the order of the current record in reference to the collection. | | | |
| | • FormNav-LastRecord – Refreshes the form to display the last record in the collection in its default form-type view or its type's last selected form-type view, and updates the FormNav-CurrentRecord indicator to X of X, where X is the total number of records in the collection. | | | |
| | • FormNav-Expand/Collapse – By default this toggle control displays the Expand option. Displays each record in its default form-type view or its type's last selected form-type view in a list. Selecting the Expand option also refreshes the Form-Navigation control to only display the FormNave-Expand/Collapse control (the FormNav-FirstRecord, FormNave-NextRecord, etc. are not displayed), and the toggle control displays | | | |

| Component | Description | Required? | Contingent Display? | Contingent Upon... |
|---|---|---|---|---|
| | the Collapse option, allowing users to return to the single form-type display mode. The container form expands and collapses to fit display mode (repeated/listed or single forms). If the form is in repeated/list mode, the parent page displays a vertical scroll bar. | | | |
| Form-Actions | A child level form's available actions, such as Add and Delete, allow users to take actions on the records contained and displayed in the subject form. The scope of the actions are within the form. Any form-level action displays at the right corner of the title bar. A child-level form's actions are only effective in the scope of the subject form and are specific to the needs of the subject form.<br>The default actions on a child-level form are Add and Delete:<br><br>• Add – Inserts a new blank record into the collection, ready for user input.<br><br>• Delete - Stages the subject record for deletion. The record is deleted when the process is approved or completed.<br><br>The Add or Delete action buttons are only available to | Y | Y | Data set |

| Component | Description | Required? | Contingent Display? | Contingent Upon... |
|---|---|---|---|---|
| | users with security access to take these actions. If users do not have security clearance, the corresponding action is disabled. | | | |

What is claimed is:

1. A system to implement business process applications, the system comprising:
 a database to store business data; and
 a processing device including one or more processors to execute:
  a design interface configured to design a business process application, the business process application including at least one object associated with the business data and an individual workflow for each of the at least one object, wherein the design interface includes:
   an archetype designer configured to define one or more archetypes, wherein each of the archetypes include at least one data-table having columns and storage attributes with object-relational mapping information for the at least one object,
   a data-object designer configured to define the at least one object according to the one or more archetypes, and
   a process designer configured to design one or more processes of the individual workflow for each of the at least one object, wherein the individual workflow includes at least one step, the at least one step including a business rule and a designated output; and
  an object query language interface configured to process each of the at least one object of the business process application to execute the business rule of the individual workflow for each of the at least one object against the business data of the database to generate the designated output according to the executed business rule.

2. The system of claim 1, wherein the design interface further includes one or more of:
 a form designer configured to design one or more object forms using the at least one object defined by the data-object designer;
 a page designer configured to define pages by associating the plurality of objects with a page definition and the one or more object forms;
 a business object designer configured to develop code for an object of the at least one object capable of being reused by at least one other object of the at least one object; and
 a message designer.

3. The system of claim 2, wherein the at least one object include metadata for table relationships, validation, and event driven logic.

4. The system of claim 2, wherein the at least one object are configured to be mapped to associated at least one data table and columns.

5. The system of claim 1, wherein the object query language interface includes an object layer.

6. The system of claim 1, wherein the object query language interface is configured to execute one or more queries against the database using one or more of the at least one object.

7. A method of implementing a business process application, the method comprising:
 designing via a design interface of a processing device a business process application, the business process application including at least one object associated with business data of a database and an individual workflow for each of the at least one object, wherein designing the business process application includes:
  defining one or more archetypes, wherein each of the archetypes include at least one data-table having columns and storage attributes with object-relational mapping information for the at least one object,
  defining the at least one object according to the one or more archetypes, and
  designing one or more processes of the individual workflow for each of the at least one object, wherein the individual workflow includes at least one step, the at least one step including a business rule and a designated output; and
 processing via an object query language interface of the processing device each of the at least one object of the business process application that executes the business rule of the individual workflow for each of the at least one object against the business data of the database and generates the designated output according to the executed business rule.

8. The method of claim 7, further comprising:
 adding an object to the business process application based on an archetype; and
 designing an individual workflow for the added object that includes at least one step, the at least one step including a rule and an output.

9. The method of claim 7, further comprising creating the archetype.

10. The method of claim 7, wherein the method further comprises executing one or more queries against the database using one or more of the at least one object.

11. A non-transitory machine-readable storage medium comprising instructions that, when executed by a processing device, cause the processing device to:
 design via a design interface a business process application, the business process application including at least one object associated with business data of a database and an individual workflow for each of the at least one object, wherein the instructions to design the business process application cause the processing device to:
  define one or more archetypes, wherein each of the archetypes include at least one data-table having columns and storage attributes with object-relational mapping information for the at least one object,
  define the at least one object according to the one or more archetypes, and
  design one or more processes of the individual workflow for each of the at least one object, wherein the individual workflow includes at least one step, the at least one step including a business rule and a designated output; and
 process via an object query language interface each of the at least one object of the business process application that executes the business rule of the individual workflow for each of the at least one object against the business data of the database and generates the designated output according to the executed business rule.

12. The non-transitory machine-readable storage medium of claim 11, further comprising instructions that, when executed by the processing device, cause the processing device to:
 add an object to the business process application based on an archetype; and
 design an individual workflow for the added object that includes at least one step, the at least one step including a rule and an output.

13. The non-transitory machine-readable storage medium of claim 11, further comprising instructions that, when executed by the processing device, cause the processing device to execute one or more queries against the database using one or more of the at least one object.

* * * * *